US010586084B2

(12) United States Patent
Burch, V et al.

(10) Patent No.: US 10,586,084 B2
(45) Date of Patent: Mar. 10, 2020

(54) SYSTEMS, APPARATUS, AND METHODS FOR DYNAMICALLY TRANSFORMING DIMENSIONAL DATA REPRESENTING A SHIPPING ITEM BEING LOADED WITHIN A CONTAINER USING A SCANNING SENSOR NODE

(71) Applicant: FEDEX CORPORATE SERVICES, INC., Collierville, TN (US)

(72) Inventors: Reuben F. Burch, V, Rossville, TN (US); William Cawein, Germantown, TN (US)

(73) Assignee: FEDEX CORPORATE SERVICES, INC., Collierville, TN (US)

( * ) Notice: Subject to any disclaimer, the term of this patent is extended or adjusted under 35 U.S.C. 154(b) by 895 days.

(21) Appl. No.: 14/993,222

(22) Filed: Jan. 12, 2016

(65) Prior Publication Data
US 2016/0239792 A1    Aug. 18, 2016

Related U.S. Application Data

(60) Provisional application No. 62/117,590, filed on Feb. 18, 2015.

(51) Int. Cl.
*G06K 7/10*    (2006.01)
*G01F 17/00*    (2006.01)
(Continued)

(52) U.S. Cl.
CPC .......... *G06K 7/10297* (2013.01); *G01B 11/00* (2013.01); *G01B 21/18* (2013.01);
(Continued)

(58) Field of Classification Search
CPC ............................ G06K 7/10297; G01B 11/00
(Continued)

(56) References Cited

U.S. PATENT DOCUMENTS 6,192,400 B1   2/2001   Hanson et al.
6,437,702 B1   8/2002   Ragland et al.
(Continued)

FOREIGN PATENT DOCUMENTS

CN   101140639 A   3/2008
CN   201198441 Y   2/2009
(Continued)

OTHER PUBLICATIONS

An Approach for Maximizing Container Loading and Minimizing the Waste of Space Using Q-Learning Published by Computer Engineering Department, Mevlana University (Year: 2013).*
(Continued)

*Primary Examiner* — Jeff Zimmerman
*Assistant Examiner* — Zeina Elchanti
(74) *Attorney, Agent, or Firm* — Withers & Keys, LLC

(57) ABSTRACT

Methods, apparatus, and systems are described for dynamically transforming dimensional data representing a shipping item being loaded within a container using a scanning sensor node mounted above a space within the container. Generally, the scanning sensor node has a memory, a depth sensor oriented to scan the space from above, and a communications interface to an external managing node. For example, the method uses the scanning sensor node to access the onboard memory for available material dimension data related to the shipping item. The method uses the depth sensor to generate scan data on the shipping item once the shipping item is placed within the container, compare the generated scan data to the available material dimension data, and dynamically transform the available material dimension data into the current dimensional data representing the shipping item based upon the comparison of the generated scan data to the available material dimension data.

25 Claims, 20 Drawing Sheets

(51) Int. Cl.
  *G06Q 10/08* (2012.01)
  *G06F 16/25* (2019.01)
  *G01B 11/00* (2006.01)
  *G01B 21/18* (2006.01)
  *G06Q 50/28* (2012.01)
  *G06K 19/07* (2006.01)

(52) U.S. Cl.
  CPC ............ *G01F 17/00* (2013.01); *G06F 16/254* (2019.01); *G06K 7/10415* (2013.01); *G06K 7/10732* (2013.01); *G06K 7/10821* (2013.01); *G06K 19/0723* (2013.01); *G06Q 10/083* (2013.01); *G06Q 10/087* (2013.01); *G06Q 50/28* (2013.01); *G06K 2007/10504* (2013.01)

(58) Field of Classification Search
  USPC ........................................................ 705/337
  See application file for complete search history.

(56) References Cited

U.S. PATENT DOCUMENTS

| | | | |
|---|---|---|---|
| 7,339,460 B2 * | 3/2008 | Lane .................... | G06Q 10/08 180/290 |
| 7,382,253 B2 | 6/2008 | Oliveras | |
| 7,421,112 B2 | 9/2008 | Calver et al. | |
| 7,468,660 B2 | 12/2008 | Griffin et al. | |
| 7,499,802 B2 | 3/2009 | Mishima et al. | |
| 7,696,870 B2 | 4/2010 | Zajac et al. | |
| 7,933,733 B2 | 4/2011 | Ashrafzadeh et al. | |
| 8,047,432 B2 | 11/2011 | Breed | |
| 8,317,084 B2 | 11/2012 | Bagi | |
| 9,129,248 B2 | 9/2015 | Reynolds et al. | |
| 9,576,166 B2 | 2/2017 | Burch, V et al. | |
| 10,089,503 B2 | 10/2018 | Burch, V et al. | |
| 2002/0080014 A1 | 6/2002 | McCarthy et al. | |
| 2004/0041706 A1 | 3/2004 | Stratmoen et al. | |
| 2004/0066500 A1 | 4/2004 | Gokturk et al. | |
| 2004/0113783 A1 | 6/2004 | Yayesh | |
| 2004/0178880 A1 | 9/2004 | Meyer et al. | |
| 2005/0131578 A1 | 6/2005 | Weaver | |
| 2005/0179545 A1 | 8/2005 | Bergman et al. | |
| 2005/0217904 A1 | 10/2005 | Hughes | |
| 2006/0164231 A1 | 7/2006 | Salisbury et al. | |
| 2006/0218001 A1 | 9/2006 | Mallet et al. | |
| 2007/0115859 A1 | 5/2007 | Meyers | |
| 2007/0124020 A1 | 5/2007 | Staples | |
| 2007/0143188 A1 | 6/2007 | Kelley et al. | |
| 2008/0249869 A1 | 10/2008 | Angell et al. | |
| 2008/0262646 A1 | 10/2008 | Breed | |
| 2008/0291033 A1 | 11/2008 | Aghassipour | |
| 2009/0014537 A1 | 1/2009 | Gelbman | |
| 2009/0015400 A1 | 1/2009 | Breed | |
| 2009/0184826 A1 | 7/2009 | Kim | |
| 2009/0189788 A1 | 7/2009 | Faus et al. | |
| 2010/0042285 A1 | 2/2010 | Abernethy, Jr. et al. | |
| 2010/0106446 A1 | 4/2010 | Ashrafzadeh et al. | |
| 2011/0173092 A1 | 7/2011 | Werbitt | |
| 2011/0227722 A1 | 9/2011 | Salvat, Jr. | |
| 2011/0231158 A1 | 9/2011 | Carpenter et al. | |
| 2012/0059769 A1 | 3/2012 | Carpenter | |
| 2012/0119935 A1 | 5/2012 | Mohamadi et al. | |
| 2012/0130534 A1 | 5/2012 | Wurm | |
| 2012/0316458 A1 | 12/2012 | Rahman et al. | |
| 2013/0243311 A1 * | 9/2013 | van de Vrande ..... | G06T 7/0004 382/164 |
| 2013/0245991 A1 | 9/2013 | Kriss | |
| 2013/0325727 A1 | 12/2013 | MacDonell et al. | |
| 2014/0188749 A1 | 7/2014 | Lanigan, Sr. et al. | |
| 2014/0209676 A1 | 7/2014 | Reynolds et al. | |
| 2014/0269272 A1 | 9/2014 | Shuey et al. | |
| 2014/0374478 A1 | 12/2014 | Dearing et al. | |
| 2015/0006430 A1 | 1/2015 | Ben-Alexander | |
| 2015/0046361 A1 | 2/2015 | Williams et al. | |
| 2015/0094876 A1 | 4/2015 | Baldwin | |
| 2015/0213705 A1 | 7/2015 | Ehrman et al. | |
| 2016/0047646 A1 * | 2/2016 | Ochsendorf ........... | G01B 11/28 348/148 |
| 2016/0171568 A1 | 6/2016 | Cao et al. | |
| 2017/0367961 A1 | 12/2017 | Lee et al. | |

FOREIGN PATENT DOCUMENTS

| | | |
|---|---|---|
| CN | 101443822 A | 5/2009 |
| CN | 103026214 A | 4/2013 |
| EP | 2178035 A1 | 4/2010 |
| JP | H08244981 A | 9/1996 |
| JP | 2001092909 A | 4/2001 |
| JP | 2001206515 A | 7/2001 |
| JP | 2002347936 A | 12/2002 |
| JP | 2005320695 A | 11/2005 |
| JP | 2006273492 A | 10/2006 |
| JP | 2007076768 A | 3/2007 |
| JP | 2007153577 A | 6/2007 |
| JP | 2009220922 A | 10/2009 |
| WO | 2002071184 A2 | 9/2002 |
| WO | 2011038018 A1 | 3/2011 |
| WO | 2014204698 A2 | 12/2014 |
| WO | 2016133608 A1 | 8/2016 |
| WO | 2016133609 A1 | 8/2016 |

OTHER PUBLICATIONS

PCT Application No. PCT/US16/12963 International Search Report and Written Opinion, dated Mar. 28, 2016.
Craddock et al., Sensor Fusion for Smart Containers, 2005, expert from IET Digital Library, 2 pages.
EP 16752756 Search Report and Written Opinion dated Jul. 13, 2018.
EP 16752757 Search Report and Written Opinion dated Jul. 19, 2018.
U.S. Appl. No. 14/992,261, Notice of Allowance and References Cited, dated Oct. 13, 2016.
Choong et al., "Empty Container Management for Intermodal Transportation networks", Transportation Research Part E, Feb. 19, 2002, Elsevier Science Ltd.

* cited by examiner

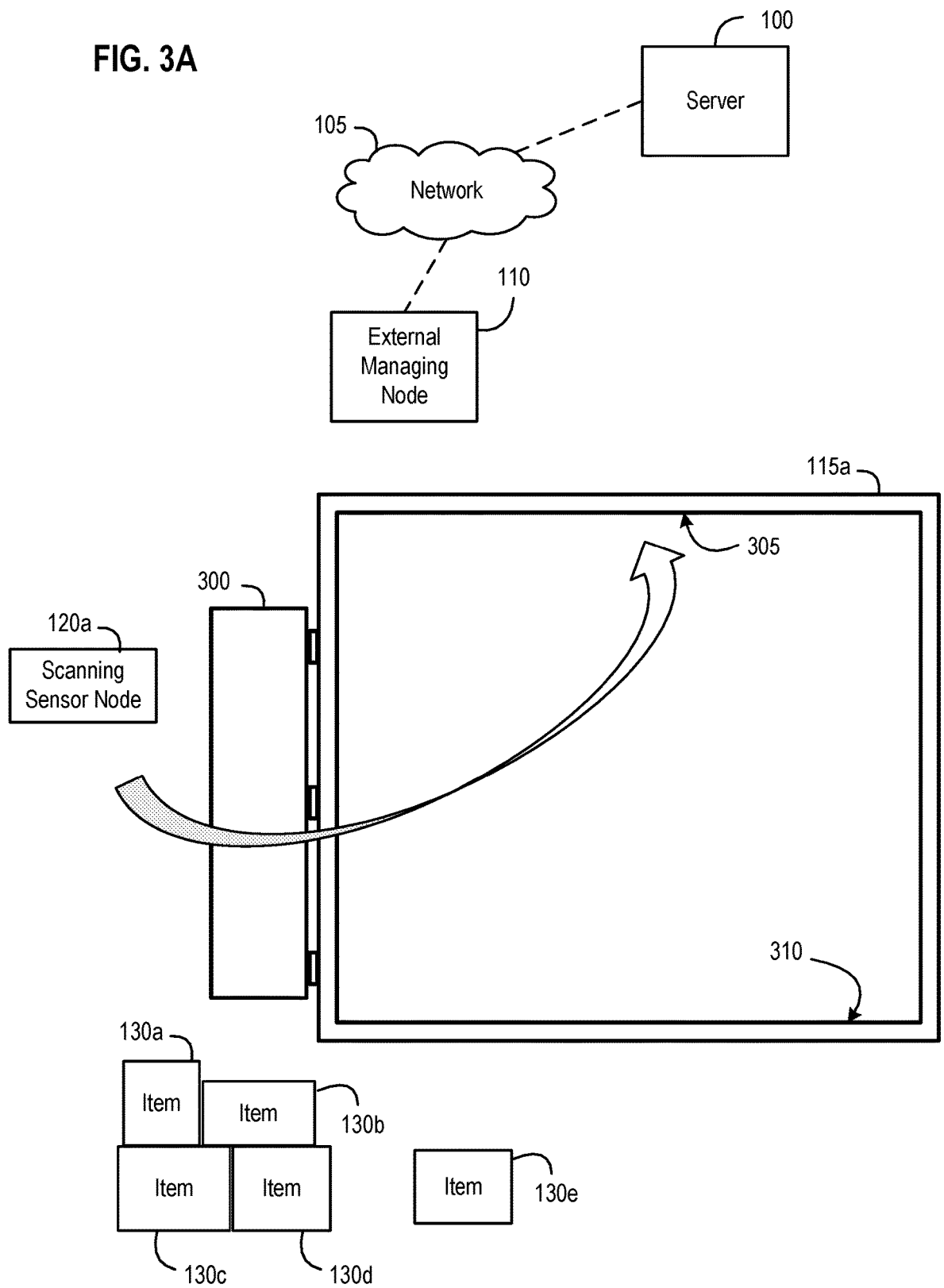

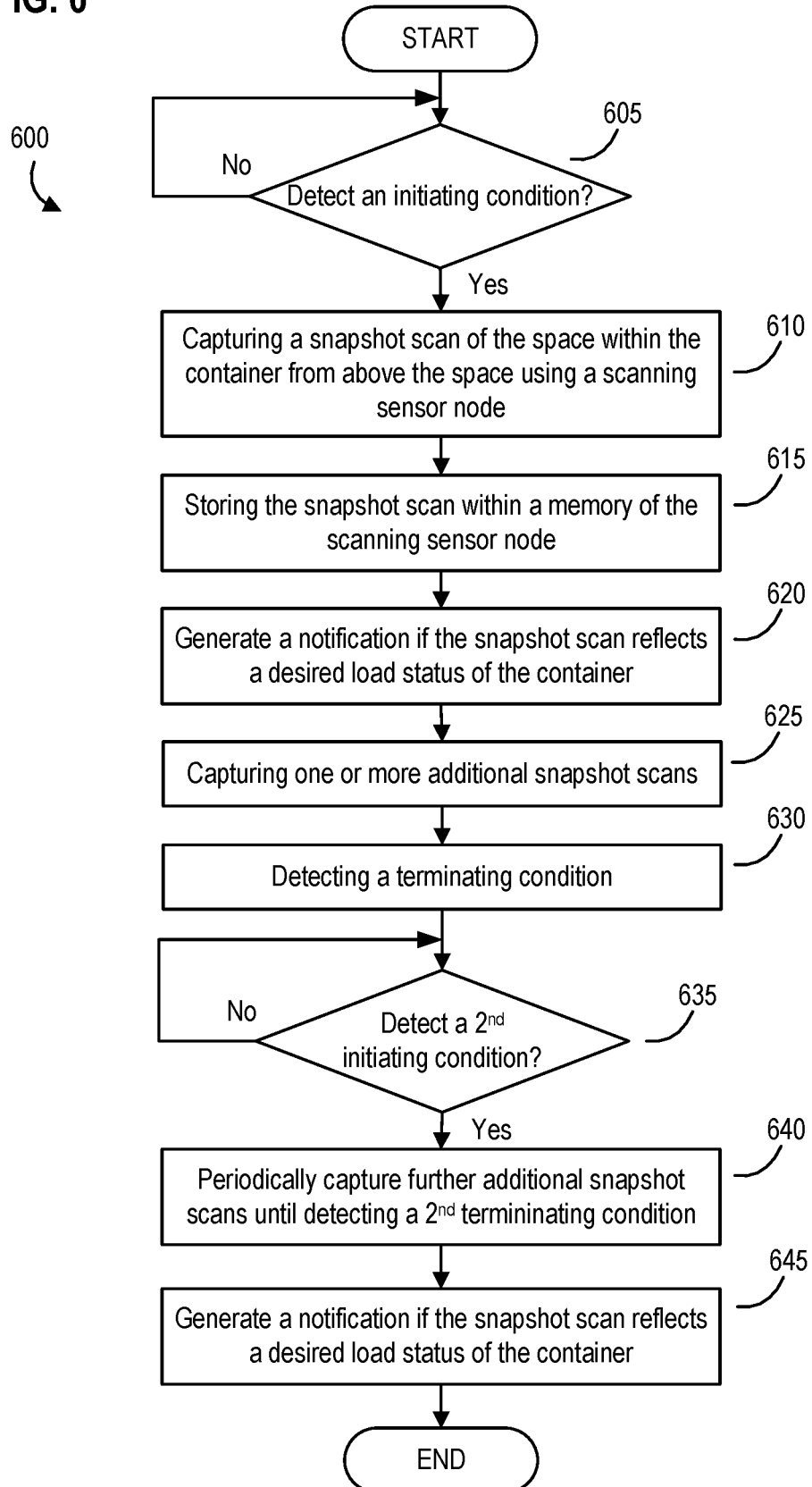

SYSTEMS, APPARATUS, AND METHODS FOR DYNAMICALLY TRANSFORMING DIMENSIONAL DATA REPRESENTING A SHIPPING ITEM BEING LOADED WITHIN A CONTAINER USING A SCANNING SENSOR NODE

PRIORITY AND RELATED APPLICATIONS

The present application hereby claims the benefit of priority to related Provisional Patent Application No. 62/117,590 and entitled "Enhancing Logistics Operations When Loading a Container Using a Scanning Sensor Node."

The present application is also related in subject matter to the following non-provisional patent applications where each also claims the benefit of priority to the same above-referenced provisional patent application: (1) Non-Provisional Patent application Ser. No. 14/992,207, entitled "Systems, Apparatus, and Methods for Quantifying Space within a Container using a Removable Scanning Sensor Node"; (2) Non-Provisional Patent application Ser. No. 14/992,261, entitled "Improved Apparatus, Non-Transient Computer Readable Media, and Methods for Automatically Quantifying Space within a Logistics Container using a Scanning Sensor Node Disposed within the Container"; (3) Non-Provisional Patent application Ser. No. 14/992,425, entitled "Improved Systems, Apparatus, Non-Transient Computer Readable Media, and Methods for Automatically Managing and Monitoring a Load Operation Related to a Logistics Container Using a Scanning Sensor Node"; (4) Non-Provisional Patent Application Ser. No. 14/993,176, entitled "Systems, Apparatus, Non-Transient Computer Readable Media, and Methods for Detecting an Operational Safety Condition within a Logistics Container using a Scanning Sensor Node"; (5) Non-Provisional Patent application Ser. No. 14/993,257, entitled "Systems, Apparatus, and Methods for Dynamically Transforming Scan Data Using a Scanning Sensor Node."

FIELD OF THE DISCLOSURE

The present disclosure generally relates to systems, apparatus, computer-readable media, and methods in the field of shipment management and logistics and, more particularly, to various aspects involving systems, apparatus, computer-readable media, and methods for various enhanced and improved logistics operations using a scanning sensor node for enhanced spatial awareness.

BACKGROUND

A logistics operation that involves shipping one or more items often includes loading a container with the items and transporting the container from an originating point to a destination point. Such a container may include, but is not limited to, a unit load device (ULD) deployed typically with shipments transported on aircraft; shipping containers deployed typically with single mode and/or intermodal freight shipments; a semi-trailer pulled by a truck; or even a designated storage space within a delivery vehicle (such as a delivery van). Items to be shipped are loaded within the container so that the items may be safely shipped with the container to a different location via a mode of transportation (e.g., aircraft, train, automotive vehicle, and the like).

Effective management of such a logistics operation is needed as a measure, for example, of cost control when shipping items in a container. The time it takes to properly and safely load a container has an impact on the cost effective throughput of the logistics operation as well as the safety of those involved in the logistics operation. Indeed, the manner in which the container is loaded can also have an impact on the cost effectiveness of the logistics operation.

In more detail, logistics operations face further problems when loading a container. For example, it may be difficult to efficiently and/or effectively quantify the used or available space left within the container as the container is loaded and manage such quantified information as part of the logistics operation. The existence of multiple different configurations of containers may pose problems when attempting to quantify such space. And while attempting to quantify such space may occur continuously, doing so often puts a strain on the quantifying equipment resources (such as battery power, memory, etc.) resulting in less efficient operations.

Additionally, loading operations of larger containers may present an unsafe and undesired operational safety condition if not properly and efficiently managed. For example, workers that may be loading a container may find they might become unintentionally locked within the container. This may pose a safety issue for the worker. Thus, a need exists to enhance detection of one or more operational safety conditions related to or within a container as a way to improve the logistics operation of loading the container.

Further, there may be times when a shipping item may not yet be scanned for dimensional information related to the item before loading into the container or the prior scanned dimensional information may be inaccurate. As such, there is a need for a way to transform available material dimension data related to the shipped item as a check on a shipped item's dimensional data and to enhance the accuracy of any quantization of space used or left within a container being loaded.

Even further, there may be times when an item being loaded within the storage space of a container may be placed in a portion of the storage space that may not be easily viewed or sensed. For example, an item may be placed into a location within the storage space where another item may at least partially block sensing of what may be loaded into that location. When an item is placed into such a location, an accurate fullness or loaded volume state of the container may be difficult to sense with a depth sensor or scanner. As such, there is a need for an improved way to detect and account for when the item is placed within the container that may not be easily viewed yet still provide for accurate loaded volume measurements for the container as it is being loaded.

To address one or more of these issues, there is a need for a more versatile, intelligent type of equipment used to help manage and track loading operations for a container and do so in a cost effective manner.

SUMMARY

In the following description, certain aspects and embodiments will become evident as being generally directed to technical solutions for logistics operations involving a scanning sensor node that manages and monitors such operations based upon sensor information generated onboard the scanning sensor node. It should be understood that the aspects and embodiments, in their broadest sense, could be practiced without having one or more features of these aspects and embodiments. It should be understood that these aspects and embodiments are merely exemplary.

In one particular aspect of the disclosure, a system is described to quantify space within a container as the container is loaded. In general, the system comprises a scanning sensor apparatus disposed within the container and an external managing node disposed outside the container. The system's scanning sensor apparatus includes at least a housing configured to be mounted to an interior roof surface within the container, a processing unit and memory disposed within the housing, a depth sensor, and a wireless communication unit. The depth sensor is operatively coupled to the processing unit, disposed below the interior roof surface, and oriented to scan the space within the container below the interior roof surface. The wireless communication interface is disposed within the housing and also operatively coupled to the processing unit. The memory is also operatively coupled to the processing unit and maintains at least a scanning program code section for execution by the processing unit and an available material dimension data related to a shipping item.

When the processing unit of the scanning sensor apparatus executes the scanning program code section, the processing unit of the system's scanning sensor apparatus is programmatically altered to become unconventionally operative to access the available material dimension data in the memory related to the shipping item; cause the depth sensor to scan the space within the container below the interior roof surface once the shipping item is loaded in the space within the container; receive, from the depth sensor, scan data generated during the scan; compare the scan data to the available material dimension data; dynamically transform the available material dimension data into the current dimensional data representing the shipping item based upon the comparison of the generated scan data to the available material dimension data; and cause the wireless communication interface to transmit a dimensional data update message to the external managing node, wherein the dimensional data update message reflects the current dimensional data representing the shipping item.

As part of the system, the external managing node is disposed in operative communication with the scanning sensor apparatus via the wireless communication interface. In this configuration, the the external managing node is operative to receive the dimensional data update message from the wireless communication interface of the scanning sensor apparatus and store the transformed current dimensional data as communicated in the dimensional data update message.

In another aspect of the disclosure, a scanning sensor apparatus disposed within a container is described that dynamically transforms dimensional data representing a shipping item being loaded within the container. In general, the apparatus comprises a housing configured to mount to an interior roof surface within the container; a processing unit disposed within the housing; a memory disposed within the housing and operatively coupled to the processing unit; a depth sensor operatively coupled to the processing unit and physically disposed and oriented to scan the space within the container below the interior roof surface; and a wireless communication interface disposed within the housing and operatively coupled to the processing unit. The memory maintains at least a scanning program code section for execution by the processing unit. As such, when the processing unit of the apparatus executes the scanning program code section, the processing unit is programmatically configured to become unconventionally operative to access available material dimension data in the memory related to the shipping item; cause the depth sensor to scan the space within the container below the interior roof surface once the shipping item is loaded in the space within the container; receive, from the depth sensor, scan data generated during the scan; compare the scan data to the available material dimension data; and dynamically transform the available material dimension data into the current dimensional data representing the shipping item based upon the comparison of the generated scan data to the available material dimension data.

In a further aspect of the disclosure, a method is described for dynamically transforming dimensional data representing a shipping item being loaded within a container using a scanning sensor node having at least a memory, a depth sensor, and a communications interface to an external managing node. In general, the method begins by accessing available material dimension data in the memory within the scanning sensor node (where the material dimension data is related to the shipping item) and then using the depth sensor on the scanning sensor node to scan the space within the container to generate scan data related to the shipping item once the shipping item is placed within the container. In doing so, the scanning sensor node is mounted within the container and above the space within the container, and the depth sensor is oriented to scan the space within the container from above the space and within the container. The method then proceeds to compare the generated scan data to the available material dimension data and then dynamically transform the available material dimension data into the current dimensional data representing the shipping item based upon the comparison of the generated scan data to the available material dimension data.

Each of these aspects respectively effect improvements to the technology of logistics operations involving loading an item to be shipped within a container. Additional advantages of this and other aspects of the disclosed embodiments and examples will be set forth in part in the description which follows, and in part will be evident from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIGS. 3A-3E are a series of diagrams illustrating an exemplary system and various exemplary operations involving an exemplary scanning sensor node apparatus deployed within a container as items are loaded within the container in accordance with one or more embodiments of the invention;

FIG. 6 is a flow diagram illustrating an improved exemplary method for efficiently quantifying space within a container using a scanning sensor node disposed within the container and exposed to scan the space within the container from above the space in accordance with an embodiment of the invention;

DESCRIPTION OF THE EMBODIMENTS

Figure 1:
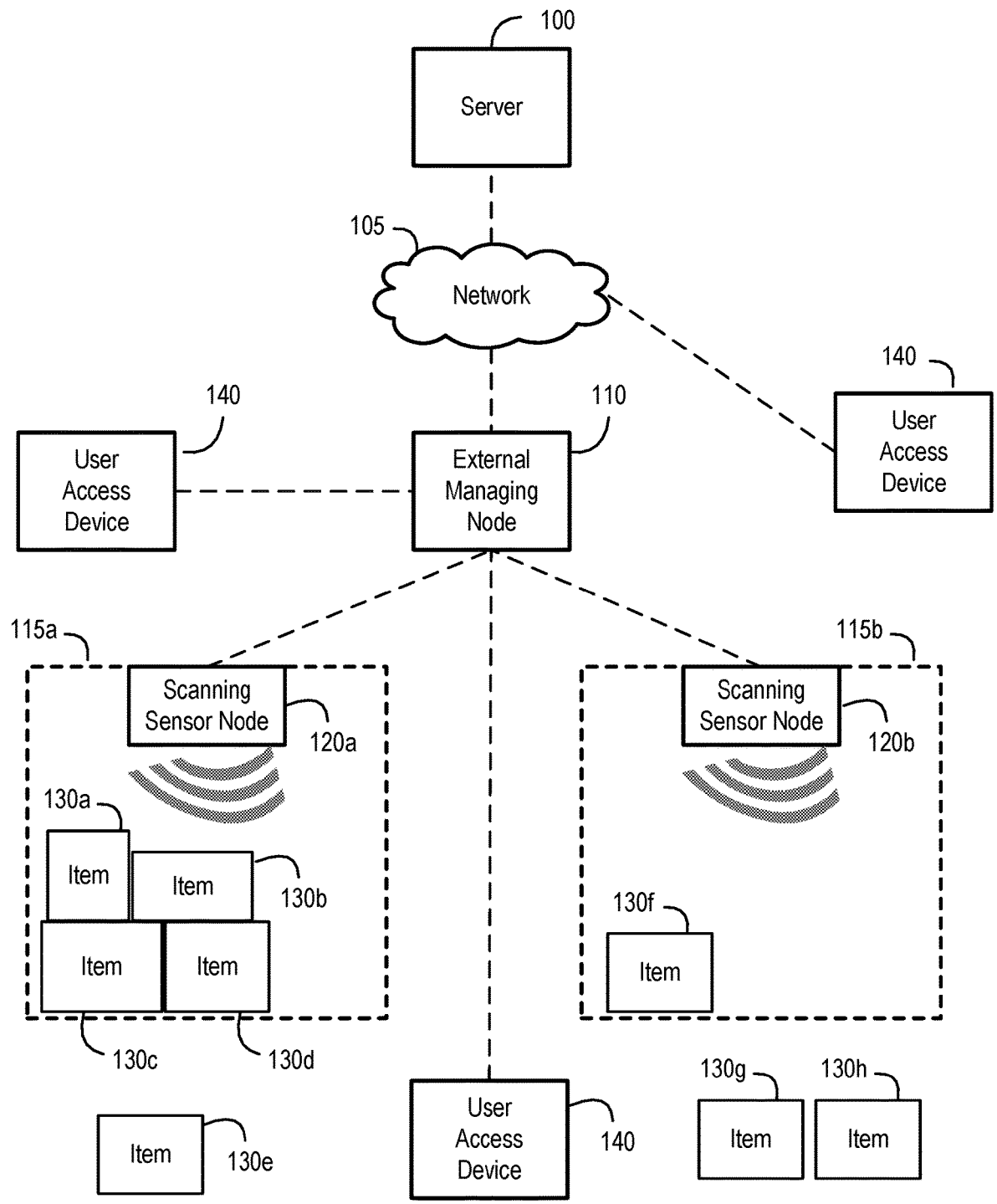
FIG. 1 is a diagram of an exemplary networked system of exemplary interconnected computer systems and node devices, including multiple exemplary scanning sensor nodes in accordance with an embodiment of the invention.

Reference will now be made in detail to various exemplary embodiments. Wherever possible, the same reference numbers are used in the drawings and the description to refer to the same or like parts. However, those skilled in the art will appreciate that different embodiments may implement a particular part in different ways according to the needs of the intended deployment and operating environment for the respective embodiments.

In general, the following describes various embodiments of systems, apparatus, computer-readable media, and methods that employ an exemplary scanning sensor node to facilitate quantifying space within a container as the container is loaded with one or more items being shipped; enhance the efficiency of quantifying such space using the exemplary scanning sensor node; facilitate improved management of load operations; allow for enhanced detection of an operational safety condition within the container; and to dynamically transform dimensional data related to an item being shipped that is loaded into the container. In general, system level embodiments may include one or more lower level devices or nodes (e.g., a scanning sensor node) that rely on shorter-range communication with a higher level device or node (e.g., an external managing node), which is operative to communicate with a server over a network while the lower level node may be unable to communicate directly with the server over the network in some instances. Such system level embodiments may also include one or more user access devices with which a worker or other logistics personnel may interact. Those skilled in the art will appreciate that such a hierarchy of different functional communicating network components (generally referred to as networked system devices) may be characterized as a network of nodes. Those skilled in the art will appreciate that such a network of nodes supporting logistics operations, such as the loading of a container, may include the server as well as different wireless nodes despite the fact that the server may not be a dedicated wireless component. In other embodiments, the network of nodes may include similar types of wireless nodes or different types of wireless nodes that interoperate in an unconventional manner to enhance logistics operations.

Those skilled in the art will also appreciate that each embodiment described herein effects improvements to particular technologies, such as systems that manage shipments, logistics operations and infrastructure supporting and monitoring the loading of a container. Each embodiment describes a specific technological application that leverages and applies a particular embodiment of a scanning sensor node where the specific technological application improves or otherwise enhances such technical fields as explained and supported by the disclosure that follows.

FIG. 1 is a diagram of an exemplary networked system of exemplary interconnected computer systems and node devices, including scanning sensor nodes within different containers in accordance with an embodiment of the invention. Referring now to FIG. 1, the exemplary networked system is shown generally comprising a server 100 connected to a network 105, which is also operatively connected to an access point that is external to the containers and generally referred to as an external managing node 110. Server 100 is also indirectly connected to scanning sensor nodes 120a and 120b through external managing node 110, which operates as the access point or intermediary device that helps manage data and communications related to logistics operations (such as loading of a container) going to and coming from scanning sensor nodes. External managing node 110 is typically connected to scanning sensor nodes 120a and 120b (respectively shown deployed within containers 115a and 115b) via wireless communications.

External managing node 110, in some embodiments, may also be connected to one or more user access devices 140, which may be used by logistics personnel (also referred to as a worker or operator) involved in a loading operation. As described below in more detail, such a user access device 140 may be a display-enabled device that allows logistics personnel to receive messages and/or provide input. In other embodiments, those skilled in the art will appreciate that external managing node 110 may also be implemented as a portable, display-enabled device (similar to what is described herein as suitable for user access device 140), while other embodiments may implement external managing node 110 as a fixed device and/or a device not having a graphic or display-enabled user interface with which to interact with logistics personnel.

In general, an exemplary container (such as container 115a) may be used to maintain one or more items (such as items 130a-130d) to be shipped. Those skilled in the art will appreciate that an example container may include, but is not limited to, a unit load device (ULD), an intermodal shipping container, a semi-trailer pulled by a truck, a storage area in a delivery van, or a portion thereof. Such a container has at least one opening through which it may be loaded with and maintain item(s) to be shipped, such as items 130a-130d shown loaded into container 115a and item 130f loaded into container 115b.

Figure 2:
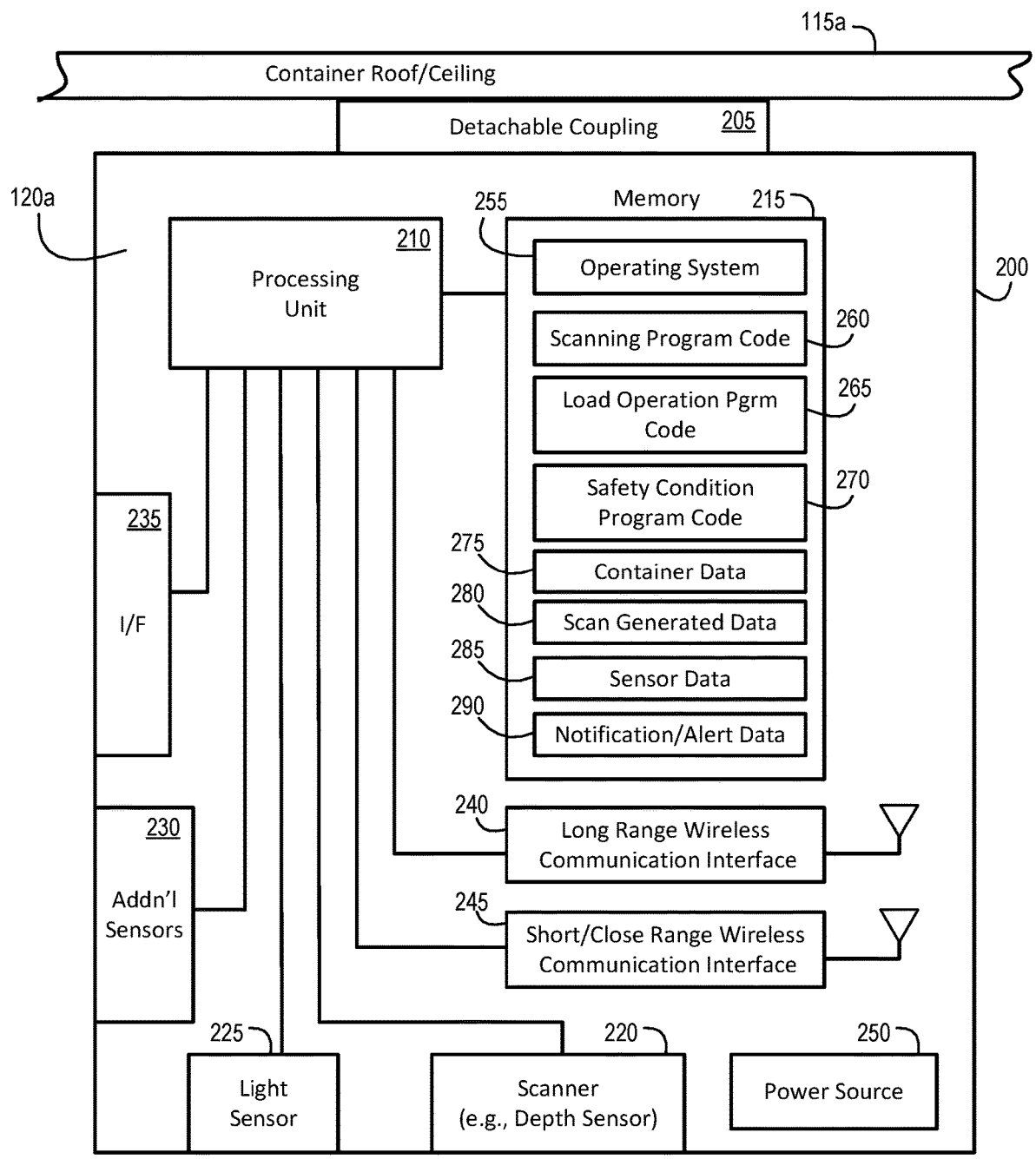
FIG. 2 is a more detailed diagram of an exemplary scanning sensor node apparatus deployed within a container in accordance with an embodiment of the invention.

When loading an item into a container, one or more scanning sensor nodes, such as scanning sensor nodes 120a and 120b, may be deployed within a particular container, such as container 115a, to identify how much unoccupied space remains in the container being loaded as part of an enhanced loading operation. An exemplary scanning sensor node, such as scanning sensor node 120a, is generally a device capable of scanning an area surrounding or near the node once it is deployed within a container. In a general embodiment, an exemplary scanning sensor node is a transceiver-based processing or logic unit having a housing that can be attached to the roof/ceiling of a container, a radio, onboard memory accessible by the processing unit for maintaining programming instructions and data, one or more scanners (more generally referred to as one or more depth sensors), other types of sensors (such as temperature, light, and/or motion sensors), interfacing circuitry that provides a data interface for off board access to data in the memory or input of data and/or new programming instructions, and a power source (e.g., a battery) that provides power for the circuitry of the scanning sensor node. FIG. 2 provides further details of an exemplary scanning sensor node, such as node 120a.

While an exemplary scanning sensor node, such as scanning sensor node 120a, may provide access to onboard data and programming instructions via a physical connection to interface circuitry, the scanning sensor node may also be in operative communication with external managing node 110 (or another scanning sensor node) using a wireless connection through the radio on the scanning sensor node. Exemplary external managing node 110 operates as a type of intelligent intermediary access point or bridge between the server 100 and the scanning sensor node. In an embodiment, external managing node 110 may be connected to server 100 through network 105 via other wireless communications (which, depending on the desired deployment, can be the same or a different format than the wireless communications between a scanning sensor node and an external managing node). However, those skilled in the art will appreciate that in another embodiment, external managing node 110 may be connected to server 100 through network 105 via a cable connection (such as an Ethernet connection or some other wired data communication connection).

In one example embodiment, an exemplary external managing node 110 is a device having a processing or logic unit, a shorter range radio used for communicating with other devices (scanning sensor nodes, other external managing nodes, and/or user access devices), a medium and/or long-range radio for communication with the server 100, memory accessible by the processing unit, and a power source (e.g., a battery or a wired power supply connection) that provides power for the circuitry of the external managing node 100. An exemplary external managing node, such as external managing node 110a, may be positioned in a known fixed location or, alternatively, be a mobile unit that flexibly interacts with one or more scanning sensor nodes as they come within range of the external managing node.

Those skilled in the art will appreciate that the processing unit of the external managing node 110 is logic, such as a microprocessor or microcontroller, which generally performs computations on data and executes operational and application program code and other program modules within the external managing node 110. Those skilled in the art will also appreciate that exemplary master node 110a is a hardware-based component that may implement its processing unit with a single processor or logic unit, a more powerful multi-core processor, or multiple processors depending upon the desired implementation. In one embodiment, the processing unit of the external managing node 110 may be implemented with a low power microprocessor and associated peripheral circuitry that allows for wired and wireless communications on different communication paths via network 105 and wirelessly to a scanning sensor node, such as exemplary scanning sensor node 120a. Less complex microcontrollers or discrete circuitry may be used to implement the processing unit of the external managing node 110 as well as more complex and sophisticated general purpose or dedicated purpose processors. However, while such hardware may be implemented with a general purpose or dedicated purpose processor, the functionality of the external managing node 110 as described herein within an embodiment is not merely convention when the embodiment is viewed as a whole and applied within the field of logistics, such as loading operations.

In yet another embodiment, an exemplary processing unit of the external managing node 110 may be implemented with a low power embedded processor as part of a single-board computer having a system-on-chip (SoC) device operating at its core. In this embodiment, the SoC device may include a removable memory card slot (e.g., a Secure Digital (SD) card slot) as removable memory, and flash memory operating as onboard non-volatile memory storage, RAM memory operating as onboard volatile memory, an operating system (such as Linux) stored on the non-volatile memory storage and running in volatile RAM memory, and peripherals that may implement the communication interfaces to network 105 and to any scanning sensor nodes, such as scanning sensor nodes 120a and 120b.

In more detail, examples of such a communication interface may include specific communication circuitry for operatively coupling the external managing node 110 to a specific short-range communication path (e.g., a Bluetooth® Low Energy (BLE) connection path communicating at 2.4 GHz) that may be used for wireless communications with a scanning sensor node. While BLE may be used in one embodiment to enable a short-range communication protocol, other embodiments may be implemented with other low power, short-range communication protocols, such as ultra-low power communication protocols used with ultra-wideband impulse radio communications, ZigBee protocols, IEEE 802.15.4 standard communication protocols, and the like.

Exemplary managing node 110 may further implement the communication interface with other communication circuitry that provides a medium and/or long-range communication interface portion to provide a communication path to server 100 via network 105. In one embodiment, such a longer range communication interface portion may be implemented with a medium range radio in the form of an IEEE 802.11g compliant Wi-Fi transceiver or a cellular radio. In yet another embodiment, both a Wi-Fi transceiver and a cellular radio may be used when best available or according to a priority (e.g., first attempt to use the Wi-Fi transceiver if available due to possible lower costs; and if not, then rely on the cellular radio). In other words, an embodiment may rely upon the longer range cellular radio part of such a communication interface as an alternative to the medium range Wi-Fi transceiver radio, or when the medium range radio is out of reach from a connecting infrastructure radio within network 105.

Additionally, an embodiment of external managing node 110 may provide a user interface to indicate status and allow basic interaction for review of data and relevant interactions with any scanning sensor nodes, such as nodes 120a and 120b, and server 100. In one embodiment, such a user interface may provide a display, interactive buttons or soft keys, and/or a pointing device to facilitate interaction with the display. In a further embodiment, a data entry device may also be used as part of the user interface. In still other embodiments, the user interface may take the form of one or more lights (e.g., status lights), audible input and output devices (e.g., a microphone and speaker), or touchscreen that may provide feedback to logistics personnel involved in loading operations.

While the embodiment illustrated in FIG. 1 shows only a single external managing node 110, those skilled in the art will appreciate that a networked system consistent with an embodiment of the invention may include a wide array of similar or different external managing nodes that each communicate with the server 100 and/or other external managing nodes, and a wide variety of similar or differently configured scanning sensor nodes and in some embodiments one or more user access devices. Thus, the exemplary networked system shown in FIG. 1 is a basic embodiment and those skilled in the art will appreciate that the system may further include such additional nodes and devices in further embodiments.

Exemplary network 105 in the system provides a type of interconnection and may be a general data communication network involving a variety of communication networks or paths. Those skilled in the art will appreciate that such exemplary networks or paths may be implemented with hard wired structures (e.g., LAN, WAN, telecommunication lines, telecommunication support structures and telecommunication processing equipment, etc.), wireless structures (e.g., antennas, receivers, modems, routers, repeaters, etc.) and/or a combination of both depending upon the desired implementation of a network that interconnects server 100 and other components shown in FIG. 1 and described above in one or more embodiments.

While exemplary server 100 is shown connecting through network 105, those skilled in the art will appreciate that server 100 may have more direct or dedicated connections to other components illustrated in FIG. 1, such as external managing node 110, depending upon implementation details and desired communication paths. Furthermore, those skilled in the art will appreciate that an exemplary server, such as server 100, may contain a collection of information in a database (not shown in FIG. 1), while multiple databases maintained on multiple server platforms or distinct network storage servers may be used in other embodiments to maintain such a collection of information. Furthermore, those skilled in the art will appreciate that a database may be implemented with cloud technology that essentially provides networked storage of collections of information that may be directly accessible to devices, such as external managing node 110.

In general, an embodiment of exemplary server 100 operates as a back-end type of platform that helps to manage the nodes (e.g., external managing node 110 and scanning sensor nodes 120a and 120b), collect information from the nodes (e.g., loading state of containers being loaded, transformed dimensional information related to an item loaded into a container), stores the collected information from the nodes or other information useful for the nodes in loading operations (e.g., baseline dimensional information associated with a particular type of container), and may provide information about the nodes (e.g., node status, container status, container type information, sensor information, etc.) to requesting entities. Further details on various embodiments that take deploy an exemplary server and take advantage of this functionality are explained in more detail below.

Those skilled in the art will appreciate that exemplary server 100 is a hardware-based component that may be implemented in a wide variety of ways. For example, server 100 may use a single processor or may be implemented as one or more part of a multi-processor component that communicates with devices (such as user access device 140) and wireless nodes (such as external managing node 110). An embodiment of server 100 may be implemented as a single computing system, a distributed server (e.g., separate servers for separate server related tasks), a hierarchical server (e.g., a server implemented with multiple levels where information may be maintained at different levels and tasks performed at different levels depending on implementation), or a server farm that logically allows multiple distinct components to function as one server computing platform device from the perspective of a client device (e.g., devices 200, 205 or master node 110a). And exemplary server 100 may deploy more than one memory storage media, and may include memory storage media in differing non-transitory forms (e.g., conventional hard disk drives, solid state memory such as flash memory, optical drives, RAID systems, cloud storage configured memory, network storage appliances, etc.).

At its core, exemplary server 100 comprises at least a processing or logic unit coupled to a network interface, which facilitates and enables operative connections and communications through network 105 with at least one or more external managing nodes and, in some embodiments, user access devices, such as device 140. In one embodiment, server 100 may include a medium and/or long-range radio communication interface with which to more directly communicate with one or more external managing nodes, such as node 110. Using these communication paths as well as programming instructions stored in the server's memory and executed by the server's processing unit to collectively provide the described unconventional functionality, the server 100 generally operates to coordinate and manage information related to a scanning sensor node as it facilitates a loading operation with respect to a container.

In some embodiments, server 100 may include a database or other data storage media that provides available material dimension data related to a shipping item. Such data, if available, provides dimensional information on the item and may have been generated prior to a loading operation (e.g., during sorting or other logistics operations where the shipping item is processed) and stored within memory accessible by server 100. In another embodiment, server 100 may distribute the responsibility of maintaining any available material dimension data related to a shipping item to a separate computing device, generally referred to as an external shipment processing system (not shown in FIG. 1). Such an external shipment processing system may be a device connected to network 105 and capable of providing access to or transmitting relevant available material dimension data to requesting devices, such as external managing node 110.

As noted above and shown in the embodiment of FIG. 1, user access device 140 may connect with and/or through external managing node 110 to interact with a scanning sensor node or server 100. In some embodiments, user access device 140 may connect and communicate with server 100 through network 105. In general, an exemplary user access device, such as device 140, allows a user (such as a logistics worker or operator participating in a load operation) to interact with one or more components of the networked system of FIG. 1. More specifically, exemplary user access device 140 may operate as a type of node element within the networked system of FIG. 1 and may be used by logistics personnel involved in a loading operation to receive input from and/or to provide user feedback to the logistics personnel relative to the loading operation (e.g., displaying information related to the current loading state of the container, the occupied capacity within the container, the updated current dimensional data representing the shipping item, and the like).

In various embodiments, exemplary user access device 140 may be implemented using a desktop computer, a laptop computer, a tablet (such as an Apple iPad® touchscreen tablet), a personal area network device (such as a Bluetooth® device), a smartphone (such as an Apple iPhone®), a smart wearable device (such as a Samsung Galaxy Gear™ smartwatch device, or a Google Glass™ wearable smart optics) or other such devices capable of communicating with external managing node 105 and/or over network 105 with server 100, over a wired or wireless communication path to such networked system elements. An exemplary user access device, such as device 140, may include sufficient hardware and code (e.g., an app or other program code section or sections) to operate as a node element in various embodiments as discussed in more detail below. For example, device 140 may be implemented as a mobile smartphone or ruggedized tablet device and functionally may operate to receive loading operation notifications and information related to the loading operation, such as a load state message or safety alert.

Thus, as shown in FIG. 1, an exemplary scanning sensor node (such as scanning sensor node 120a) may operate as a node element within a networked system that operates to improve and enhance the efficiency of a logistics operation, such as when an item being shipped is loaded into a container (such as container 115a). And while FIG. 1 shows a single scanning sensor node within a container, those skilled in the art will appreciate that leveraging such an exemplary scanning sensor node may be scalable to larger applications and containers. For example, further embodiments may involve a physically large container that may use multiple scanning sensor nodes deployed within the same large container as needed to appropriately scan and monitor storage space and loading of items into such a large or spread out storage space.

Further details of the architecture and components an exemplary scanning sensor node are described in more detail below. In particular, FIG. 2 is a more detailed diagram of an exemplary scanning sensor node apparatus as deployed within a container in accordance with an embodiment of the invention. Referring now to FIG. 2, exemplary scanning sensor node 120a is generally a device operative to scan a storage space within container 115a once the node 120a is deployed above the space within the container 115a (e.g., coupled to the container's ceiling, along an upper part of an interior wall of the container, or coupled to structure hanging down from the ceiling or extending from the upper part of a wall). The scanning sensor node 120a may be used to help identify unused or unoccupied portions of the storage space as advantageously scanned from above the space in order to enhance the accuracy of such scanning operations. Those skilled in the art will appreciate that being disposed above the space generally has the scanning sensor node (or more specifically, relevant scanning elements of the scanning sensor node) at a higher elevation than the storage space.

As illustrated in FIG. 2, exemplary scanning sensor node 120a may be implemented as a device having a housing 200, which is configured to mount above an interior storage space within the container, such as mounted to an interior roof surface of a ceiling within container 115a. In the illustrated embodiment, housing 200 is attached to the ceiling above a storage space within container 115a by means of a detachable coupling 205. Housing 200 may be implemented, for example, with rugged structure and material to allow scanning sensor node 120a to operatively survive a harsh environment, such as moisture, temperature, and/or physical drops of the node 120a should the node 120a unintentionally detach from the ceiling or otherwise be dropped during a loading operation.

In the illustrated embodiment of FIG. 2, the exemplary coupling 205 of the housing 200 and the ceiling of container 115a is temporary in order to allow exemplary scanning sensor node 120a to be easily installed within container 115a above a storage space area within the container 115a but also be easily removed if/when desired. Coupling 205 may, for example, be removable or temporarily attached to the ceiling by means of a magnetic connection or a pressure sealing adhesive that allows for placement and later detachment of the housing 200. As such, an embodiment may implement exemplary coupling 205 with temporary attachment structure (e.g., one or more magnets, adhesive, one or more physical clips, one or more quick connect thumbscrews and threaded mating holes). Such temporary attachment structure may be engaged and disengaged to allow for a quick connect and disconnect of the housing 200 and the ceiling of the container 115a. For example, in an embodiment, a connection base portion (not shown) of the coupling 205 may be temporarily or permanently mounted to or formed into the ceiling of the container 115a while a second portion of the coupling 205 may be mounted to or formed into housing 200 so that it may mate with the connection base portion.

In more detail, detachable coupling 205 may use fitted or mated structure (such as keyseated mating parts of coupling 205). In this manner, one part may be fixed or attached to the housing 200 while the other part may be fixed or otherwise attached to the ceiling of container 115a in such a way to ensure the scanning sensor node 120 is placed and oriented in a desired physical attitude and orientation when the coupling's mated parts are seated to each other.

And while shown in FIG. 2 as a detachable coupling, an alternative embodiment may have coupling 205 not necessarily detachable and, instead, have coupling 205 as part of a more permanent connection or attachment mechanism. For example, coupling 205 may fix housing 200 to the ceiling of container 115a such that scanning sensor node 120a thereon remains fixed to the container 115a. As such, scanning sensor node 120a may operate within container 115a as described herein albeit in a configuration where the scanning sensor node 120a becomes associated with container 115a as the container 115a is moved, transported, and shipped in its intended manner (e.g., via aircraft or other modes of transportation).

As illustrated in FIG. 2, an embodiment of exemplary scanning sensor node 120a is a hardware-based component implemented with a processor or logic unit, such as processing unit 210, coupled to onboard memory 215. Exemplary scanning sensor node 120a further comprises one or more wireless interfaces 240 and 245, scanner 220, light sensor 225, additional sensors 230, interface circuitry 235, and a power source 250.

In more detail, exemplary wireless interfaces 240 and 245 are each coupled to the processing unit 210 and allow for longer range wireless communications (via interface 240) and for shorter range wireless communications (via interface 245). Each of these wireless interfaces may generally be implemented as a programmable radio and an omni-directional antenna coupled to the processing unit 210 where the radio communicates through the antenna with other devices. In an embodiment, interfaces 240 and 245 may use an antenna with a different antenna profile when directionality may be desired or particular communication frequencies call for a different antenna configuration. Exemplary wireless interfaces 240 and 245 may communicate using various different types of radio transceivers for different types of communications, such as a Bluetooth® interface or wireless network interface (Wi-Fi) for the short/close range wireless communications interface 245 or a cellular interface for the longer range wireless communications interface 240. Those skilled in the art will appreciate that in further embodiments, interfaces 240 and 245 may implement an RFID reader and/or NFC communications, or other data communications interface that allows for wireless communication. In other embodiments, a single interface may be used as both interfaces 240, 245 when desired communications may be accomplished with a range of a single interface.

As noted above, an embodiment may have multiple scanning sensor nodes mounted within a single container. Those skilled in the art will appreciate that the wireless interfaces 240 and 245 deployed within each of the scanning sensor nodes may allow for node-to-node communications between two scanning sensor nodes. For example, one scanning sensor node may operate as a managing node in that it may receive messages and/or data from another scanning sensor node and pass the received messages and/or data along to an external managing node, such as external managing node 110. This may be helpful when only one of the scanning sensor nodes is within communication range of the external managing node, but the other scanning sensor node is unable to directly communicate with the external managing node.

Scanner 220, as shown in FIG. 2, may be operatively connected to the processing unit 210 and operate as one or more dimensioning scanners (more generally referred to as one or more depth sensors) to scan a space exposed to the scanner 220 (such as a depth of space below a container ceiling/roof of container 115a relative to the location of scanner 220). Scanner 220 may operate as a camera or sensor type of device that senses distances and motion. Scanner 220 may be implemented as a simple dimension scanning device (depth sensing camera) or a device/array with multiple scanning elements that are each respectively aimed at different parts of the space below a container's ceiling (once the scanning sensor node has been installed). For example, scanner 220 may be an array having multiple scanning elements physically close to one another, yet each are respectively oriented and aimed to scan and capture information on dimensions and depth in a different part of the space below a container's ceiling. In another example, scanner 220 may be implemented with separate scanning elements that are each, respectively, deployed along the container's ceiling in a physically separated configuration of scanning elements that can be mounted along different points of the container's ceiling or upper parts of the container's walls so that the elements of scanner 220 each scan and capture information on dimensions and depth in a different part of the storage space below a container's ceiling or, more generally, from above the storage space.

Light sensor 225 may be operatively connected to the processing unit 210 and operate to detect light near node 120a, such as light external to housing 200 and within the container 115a. Light sensor 225 may be used to help detect if container 115a is in an open or closed state, and as explained in more detail below, such information made available to the specially programmed processing unit 210, may help to improve and/or enhance loading of container 115a.

Additional sensor(s) 230 are also operatively connected to the processing unit 210 and may operate as one or more environmental sensors to separately detect environmental conditions within the container. Such detected conditions may include conditions about the container itself, the interior space within the container, or contents within the container. In various embodiments, such an additional sensor 230 may be implemented as a motion sensor that detects movement within the container as the environmental condition; a light sensor that detects a threshold level of light within the container as the environmental condition; a temperature sensor that detects a threshold level of temperature within the container as the environmental condition; a humidity sensor that detects a threshold level of humidity within the container as the environmental condition; a kinetic force sensor that detects a concussive force related to the container as the environmental condition; a chemical sensor that detects an atmospheric chemical composition change within the container as the environmental change; a microphone that detects an auditory level change related to the container as the environmental change; a pressure sensor that detects a barometric pressure within the container as the environmental change; and a smoke sensor that detects a smoke particle concentration within the container as the environmental change.

Additional sensors 230 may also include one or more other types of sensors or scanning elements that may operate to read or receive identification information related to an identification element. Such scanning elements may, for example, perform scanning with electrical signals (e.g., radio waves), lasers, and other optical, electro-optic, magnetic, or electro-magnetic signals. For example, such a scanning element may include, but is not limited to, a barcode scanner, a radio frequency identification (RFID) reader, a near field communications (NFC) interface, Bluetooth® radio, or other wireless network data communications device, and the like that may operate to read or receive identification information related to an identification element. Such a scanning element may be implemented with other low power, short-range communication devices that may use communication protocols, such as ultra-low power communication protocols used with ultra-wideband impulse radio communications, ZigBee protocols, IEEE 802.15.4 standard communication protocols, and the like. An exemplary identification element may include, for example a barcode label that may be a read by a barcode scanner. Other exemplary wireless identification elements may be implemented as, for example, an RFID tag, an NFC device, another Bluetooth® device, a ZigBee device, or another wireless network data communications device operating under a similar communications format as the scanning element. Thus, an exemplary sensor 230 may be implemented as a type of identification scanning or listening device that conducts a scan (e.g., sends out a signal or beam, or listens for a signal or reflected beam) to receive information from an identification element related to the item being shipped.

The additional sensors 230 may be implemented as modular or detachable sensors that may connect to a plug type outlet (not shown) deployed on housing 200. Such a plug outlet may provide a detachable connection for the modular sensor to processing unit 210, and may allow for additional sensors that may be physically deployed physically outside the housing 200 in a variety of configurations (e.g., disposed along a length of a ceiling within a container, disposed at the top of a vertical wall at a point above the storage space of the container). Those skilled in the art will also recognize that such a connection for modular external additional sensors 230 may be provided through interfacing circuitry 235, as described below.

Interfacing circuitry 235 may be operatively connected to the processing unit 210 to generally provide an external interface to elements onboard scanning sensor node 120a. Such interfacing circuitry 235 may, for example, comprise various peripherals (e.g., timer circuitry, USB, USART, general-purpose I/O pins, IR interface circuitry, DMA circuitry) that implement an interface (e.g., a plug type or connectorized interface) with different external sensors or other circuitry/devices external to scanning sensor node 120a. As such, interfacing circuitry 235 may operate to provide a data interface (such as a micro USB interface) that gives an external device access to data and code kept in the memory 215 or allows the external device to provide other data and/or code to be stored within the memory 215 of scanning sensor node 120a. In another example, interfacing circuitry 235 may be implemented to include a memory card interface, such as a micro SecureDigital (SD™) memory card slot and supporting circuitry, so that non-transitory removable memory media storage in the form of a memory card may be accessible to processing unit 210.

In yet a further embodiment, those skilled in the art will appreciate that interfacing circuitry 235 may implement a simple or complex display or user interface for logistics personnel. For example, such a display or user interface may indicate a status of scanning sensor node 120a and allowing basic interactions by logistics personnel with scanning sensor node, like depressing a switch or switches (not shown) to activation the node 120a or turn it off. In one embodiment, a portion of the interfacing circuitry 235 providing such a display or user interface may be implemented with status lights, such as multi-mode LEDs. Different colors of the lights may indicate a different status or mode for the scanning sensor node 120a (e.g., a current power status, a battery level status, an error, a sensed condition (e.g., exceeding a temperature threshold, exceeding a moisture threshold, detecting a desired load status regarding the storage space of the container)). Other embodiments may include an auditory interface, such as a speaker for output and/or microphone for input. Such an auditory interface may provide or receive auditory feedback to or from logistics personnel involved in the loading operation. Still other embodiments may implement such a display or user interface in a more sophisticated manner with a graphics display or the like where information or a notification may be displayed to logistics personnel involved in the loading operation.

As shown in FIG. 2, power source 250 is a component of scanning sensor node 120a that provides power for the various active circuitries deployed within the scanning sensor node 120. An embodiment of power source 250 may be a rechargeable or replacement power element (e.g., a replaceable battery unit or cell, a chargeable battery unit or cell, or a chargeable battery coupled to a solar cell that may operatively charge the battery). In some embodiments, the solar cell may be disposed on an exterior of housing 200 so that when scanning sensor node 120a is removed, it may be recharged via sunlight. However, in other embodiments, the solar cell may be deployed on an exterior surface of container 115 and include a power connection through housing 200 (e.g., via interface circuitry 235) to power source 250 within housing 200.

In another embodiment, power source 250 may be charged wirelessly via proximity to a charging station, such as a charging pad, that may provide power to a charging device (not shown) connected to interface circuitry 235 or integrated as part of power source 250. In more detail, power source 250 may be wirelessly charged using a charge-transmitting unit that broadcasts a targeted RF signal to a charge-receiving device connected to interface circuitry 235 (or to a wireless charge-receiving circuitry integrated as part of power source 250). Such an exemplary charge-transmitting unit may be deployed as part of a container, a vehicle (e.g., aircraft, truck, delivery van), or logistics facility that processes a container in order to facilitate charging power source 250 in a wireless, efficient, and timely manner without relying on corded charging of power source 250. In yet another embodiment, power source 250 may be implemented as an exemplary wireless charge-receiving device when the power demands of node 120 can be sufficiently supplied by such a wireless charge-receiving device. Examples of such wireless charging circuitry and systems that may be deployed to help charge power source 250 include WattUp™ power router and enabled receivers from Energous Corporation of San Jose, Calif.; Cota® wireless power solutions from Ossia, Inc. of Redmond, Wash.; and Powermat® wireless charging technology from Powermat Technologies Ltd. of Neve Ilan, Isreal.

Relative to processing unit 210, those skilled in the art will appreciate that exemplary processing unit 210 is essentially logic that generally performs computations on data (such as exemplary data 275-290) and executes operational and application program code (such as operating system 255 and application program code modules 260-270) within the scanning sensor node 120a. As such, exemplary processing unit 210 operates as the processing core of scanning sensor node 120a. In one embodiment, processing unit 210 may be implemented with processing and associated peripheral circuitry as dictated by the needs of the particular applied embodiment, such as a low power consumption microcontroller. Less complex microcontrollers or discrete circuitry may also be used to implement processing unit 210, as well as more complex and sophisticated microprocessors.

Those skilled in the art will appreciate that exemplary processing unit 210 may be integrated into a single chip transceiver or SoC used as a core of scanning sensor node 120a. Those skilled in the art will also appreciate that scanning sensor node 120a may be implemented with specially optimized hardware (e.g., a particular application specific integrated circuit (ASIC) having the same operational control and functionality as the application program code modules 260-270, as described below), discrete logic, or a combination of hardware and firmware depending upon requirements of the scanning sensor node, such as power, processing speed, size of the container space to be scanned, etc.

In a general embodiment, the onboard memory 215 on scanning sensor node 120a is accessible by processing unit 210 for maintaining program code and data. A part of memory 215 may be implemented as a tangible, non-transient computer readable medium on which information (e.g., executable code/modules and data) may be kept in a non-volatile and non-transitory manner. Examples of such memory storage may include a hard disk drive, ROM, flash memory, or other media structure that allows long term, non-volatile storage of information. Such memory storage maintains a variety of program code (e.g., operating system 255, scanning program code 260, load operation program code 265, safety condition program code 270) and other data elements (e.g., container data 275, scan generated data 280, sensor data 285, notification/alert data 290, and the like).

Another part of memory 215 may be implemented as random access memory (RAM) structure used by processing unit 210 during operation of the scanning sensor node 120a. Upon power up of node 120a, the volatile memory part of memory 215 may be populated with operating system 255 and then with one or more operational programs (such as scanning program code 260) or specific program modules that help facilitate particular specially adapted and unconventional operations of scanning sensor node 120a. And during operation of scanning sensor node 120a, the volatile memory may also include certain data (e.g., item content data 275, scan generated data 280, sensor data 285, notification/alert data 290, and the like) generated as the scanning sensor node 120a executes instructions as programmed or loaded from the non-volatile memory storage part of memory 215. However, those skilled in the art will appreciate that not all data elements illustrated in FIG. 2 must appear in memory 215 at the same time.

In an embodiment, exemplary program code (e.g., scanning program code 260, load operation program code 265, safety condition program code 270) are executable instructions in the form of program code modules or applications. Each of these program code modules may be loaded and executed by processing unit 210 to adapt the processing unit 210 into a specially adapted and configured computing-based apparatus. This specially configured processing unit 210, as described in more detail herein as a part of an embodiment, implements operative process steps and provides functionality that is unconventional, especially when the process steps are considered collectively as a whole. And such a specially adapted and configured processing unit 210 helps, as a part of an embodiment, to address and improve targeted and technical problems faced in logistics operations when loading a container as described in more detail below.

Figure 5:
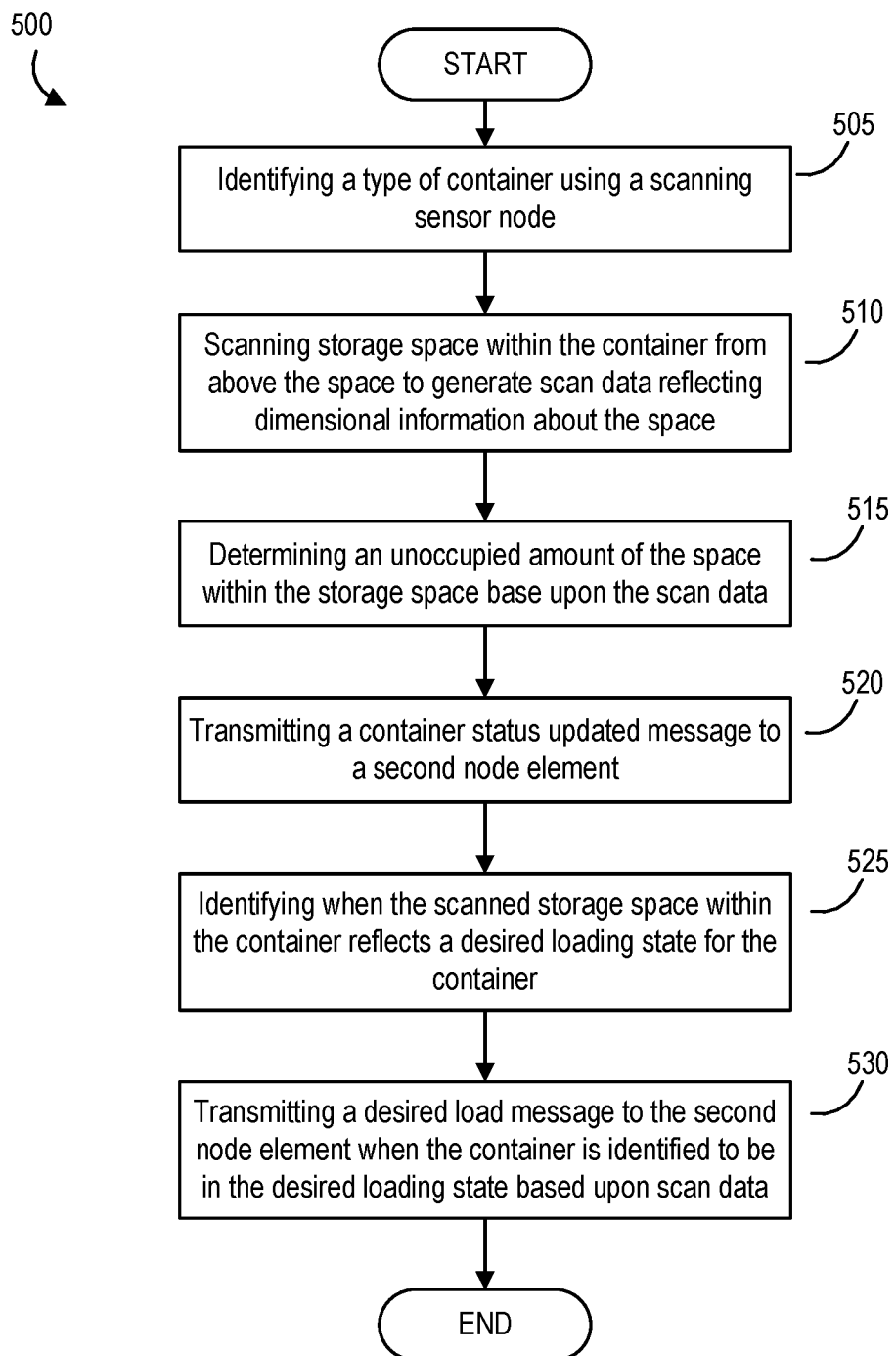
FIG. 5 is a flow diagram illustrating an exemplary method for quantifying space within a container using a removable scanning sensor node in accordance with an embodiment of the invention.

In particular, exemplary scanning program code 260 provides executable instructions that generally enable the scanning sensor node 120a to improve how space within a container may be quantified when determining an unoccupied amount of the space using scan data, as described in more detail below with respect to FIG. 5. Another embodiment of scanning program code 260 may provide executable instructions that help improve the efficiency of quantifying space within a container using a scanning sensor node disposed within the container and exposed to scan the space within the container from above the space, as described in more detail below with respect to FIG. 6. Still another embodiment of scanning program code 260 may provide executable instructions that dynamically transform dimensional data representing a shipping item being loaded within a container, as described in more detail below with respect to FIG. 9. And yet a further embodiment of scanning program code 260 may provide executable instructions that dynamically transform scan data into refined scan data more accurately representing a loaded volume of a container, as described in more detail below with respect to FIG. 12.

Exemplary load operation program code 265 provides executable instructions that generally enable the scanning sensor node 120a to interact with other network system elements (such as external managing node 110) and improve how to use a removable scanning sensor node as part of managing a load operation related to a container, as described in more detail below with respect to FIG. 7. As such, load operation program code 265 may be used to generally provide distinct and unconventional interactions with higher level networked system elements based upon mapped data of unoccupied space within the container. In some embodiments, code 265 may operation in conjunction with scanning program code 260 as described in more detail below.

Exemplary safety condition program code 270 provides executable instructions that generally enable the scanning sensor node 120a to improve how to detect an operational safety condition within a container using a scanning sensor node, such as scanning sensor node 120a, deployed within the container and above a storage space defined within the container, as described in more detail below with respect to FIG. 8. In some embodiments, code 270 may operation in conjunction with scanning program code 260 as described in more detail below.

As previously noted, in addition to program code 260-270 and operating system 255, memory 215 may maintain different types of data and data structures during operations of an exemplary scanning sensor node 120a. Data in memory 215 may be generated by scanning sensor node 120a or may be received from other devices (such as external managing node 110 or a memory card accessed through interface circuitry 235). In more detail, such exemplary data generated and/or maintained in memory 215 may comprise at least container data 275, scan generated data 280, sensor data 285, and notification/alert data 290.

In an embodiment, container data 275 is generally a type of data about the container to be loaded and/or one or more items to be shipped within the container. For example, container data 275 may include container type information that identifies the type of the container and provides baseline dimensional information related to the space within the container; data on the current status of space within the container or determined currently occupied capacity of the container; and data on a desired load status of the container reflecting how full the exemplary container should be when considered to be in a desired load state.

Container data 275 may also include data on items loaded into the container, such as an inventory type of listing provided by an external source (such as external managing node 110) or a list of items to be shipped detected or identified by the scanning sensor node as each of the detected items are loaded into the container.

Container data 275 may also include previously available material dimension data associated with a shipping item loaded into the space within the container where, if available, such data comes from an external source, such as the external managing node 110. Such previously available material dimension data may be generated, for example, by a prior logistics operation (e.g., a prior scanning operation that determines the dimensions of the item being shipped). Container data 275 may also include current dimensional data representing the shipping item as transformed by the scanning sensor node 120a based upon scan data for a shipping item as generated by the scanning sensor node 120a.

In one embodiment, scan generated data 280 is generally a type of data generated by scanner 220 that reflects dimensional information. Such scan data may be used in a variety of ways in the various embodiments described herein. For example, the scan data may be initial scan data that includes baseline dimensional information related to dimensions of the storage space within the container. In another embodiment, scan generated data 280 may include mapping data associated with mapped space within the container after the item has been placed within the container. In still other embodiments, scan generated data 280 may reflect one or more snapshot scans of the space within the container from above the space and within the container where the scan indicates an approximate available volume left to be filled within a storage portion of the container.

In one embodiment, sensor data 285 is generally a type of data generated by use of sensors, such as light sensor 225 and additional sensors 230. Such sensor data 285 may include data related to conditions of the container (including conditions about the container itself, the interior space within the container, or contents within the container). In a more specific example, sensor data 285 may include information detected as an environmental change, such as a sensor detected level of light within the container, temperature within the container, humidity within the container, concussive force related to the container, atmospheric chemical composition change within the container, auditory level change related to the container, barometric pressure within the container, and/or smoke particle concentration within the container.

In an embodiment, notification/alert data 290 is generally a type of data used when the scanning sensor node 120a generates and/or transmits a notification or other message to another device, such as the external managing node 110. For example, notification/alert data 290 may include data for a container status update message; data for a desired load message on whether the desired loading state of the container has been identified or met; data related to a time taken to load the container and used as part of a load time message; data related to a requested change to a load operation for the container (e.g., a request for additional personnel to be involved in loading the container); summarized data of what has been loaded into the container; alert data associated with an operational safety condition within the container (e.g., movement within the storage space of the container while the container is in a closed state); and information used in transmitting updated current dimensional data representing the item being shipped.

Those skilled in the art will appreciate that the above identification of particular program code modules 260-270 and data 275-290 are not exhaustive and that embodiments may include further executable program code or modules as well as other data relevant to operations of a specially programmed processing-based device, such as an scanning sensor node.

Figure 3B:
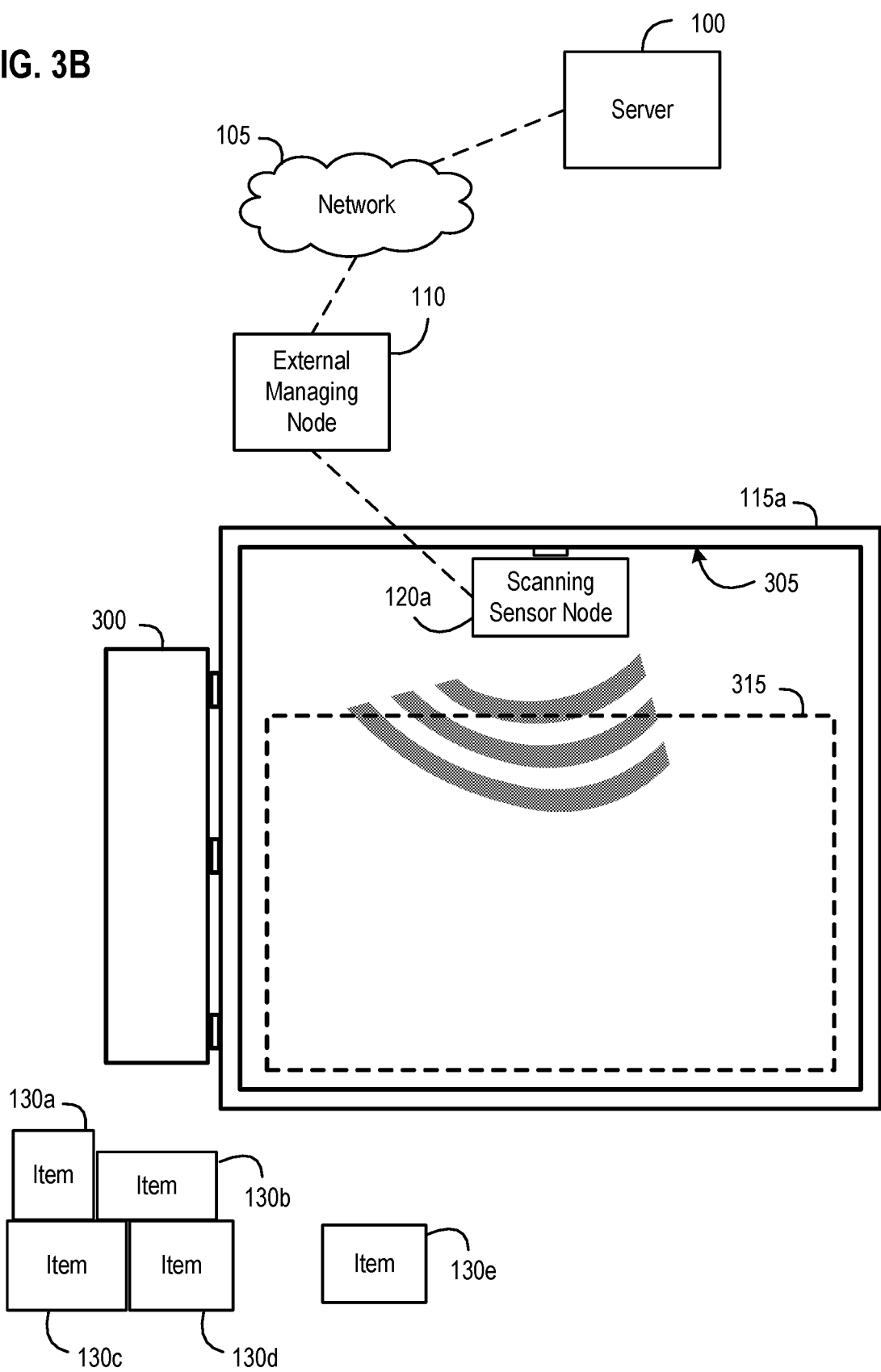

In light of the above description of an exemplary architecture and component parts of exemplary scanning sensor node 120a (as illustrated in FIG. 2) and other elements of a networked system that may use such exemplary scanning sensor node 120a (as illustrated in FIG. 1), the remaining figures illustrate aspects of one or more exemplary logistics operations that are enhanced and improved through advantageous use of exemplary scanning sensor node 120a. Specifically, FIGS. 3A-3E illustrate an exemplary loading operation involving exemplary scanning sensor node 120a while FIGS. 4A and 4B illustrate aspects where exemplary scanning sensor node 120a may be used in a closed container. FIGS. 5-9 are flow diagrams related to various exemplary methods that leverage use of an exemplary scanning sensor node 120a to enhance and improve different types of logistics operations involved in loading and/or shipping an item within a container.

As noted above, FIGS. 3A-3E are a series of diagrams generally illustrating an exemplary installation and various exemplary operations involving an exemplary scanning sensor node apparatus (such as scanning sensor node 120a) deployed within a container as items are loaded within the container in accordance with one or more embodiments of the invention. Referring now to FIG. 3A, exemplary container 115a is shown having door 300 or other closable opening through which logistics personnel may load items 130a-130e into container 115a, a ceiling 305 above the storage space within container 115a, a floor 310 on which items may be placed for shipment within the container 115a. In an embodiment, prior to loading container 115a, scanning sensor node 120a may be mounted to ceiling 305. As explained with reference to FIG. 2, an embodiment of scanning sensor node 120a may be mounted in a manner that may be permanent or not intended to be removed from the container 115a, or may be mounted as a removable, easily detachable device within container 115a. In some applications, logistics personnel may desire to remove the scanning sensor node 120a from ceiling 305 of container 115a once the container 115a has been loaded.

Once installed or mounted to ceiling 305, scanning sensor node 120a may be activated as shown in FIG. 3B. Referring now to the embodiment illustrated in FIG. 3B, exemplary scanning sensor node 120a has been temporarily mounted within the container and above the space within the container, so that scanner 220 (e.g., a depth sensor or group of depth sensing elements) on the scanning sensor node 120a may be advantageously oriented to scan a storage space 315 within the container 115a from within the container 115a and above the space 315. Once activated, scanning sensor node 120a may also communicate with external managing node 110 and may receive information, such as container type information that identifies the type of container 115a and provide baseline dimensional information related to the available storage space 315 for container 115a. In another embodiment, scanning sensor node 120a may identify the type of container by conducting an initial scan of the space 315 within container 115a from the above the storage space 315 in order to determine baseline dimensional information on the storage space 315 from the initial scan.

Figure 3C:
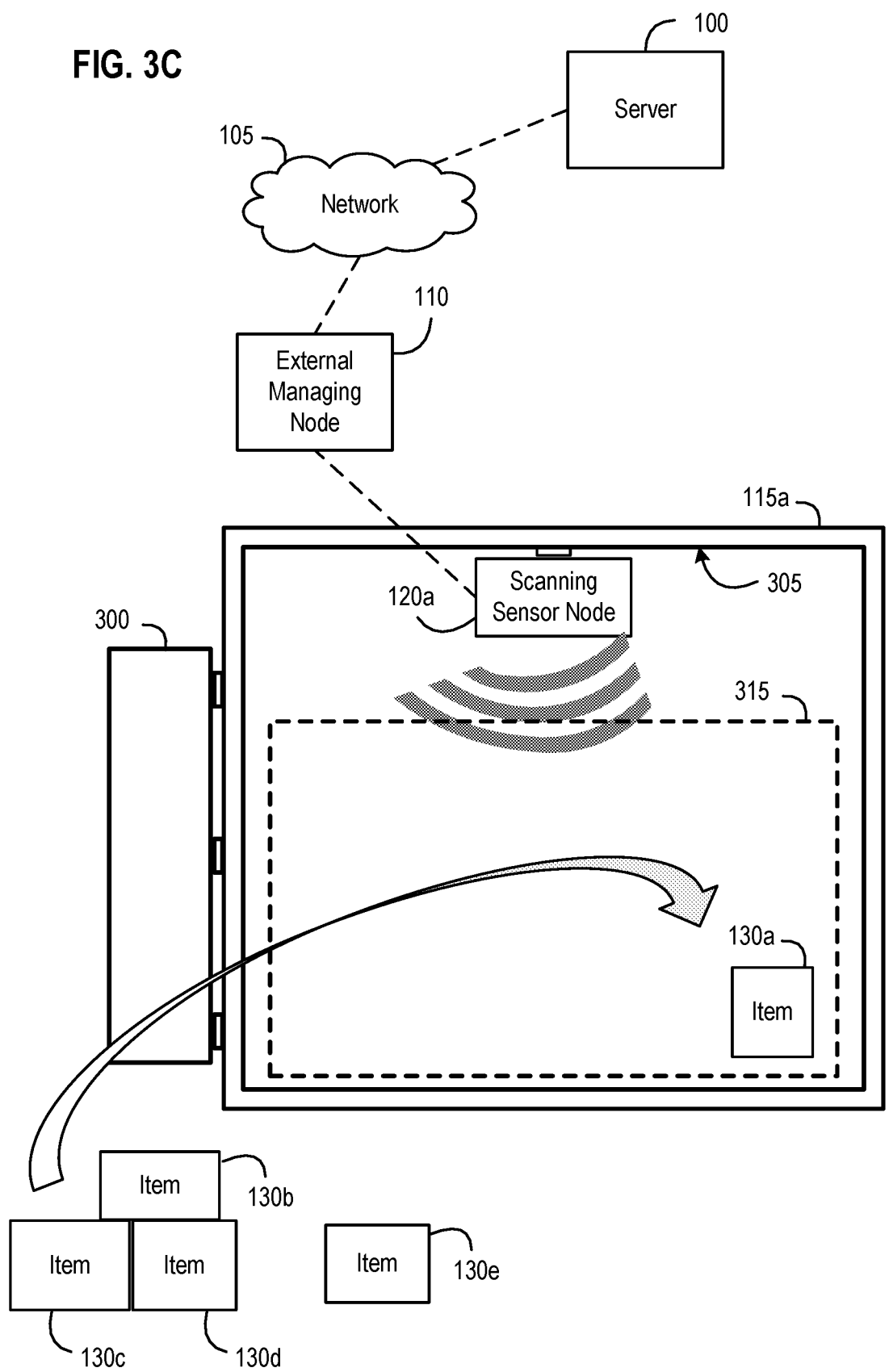
Figure 4A:
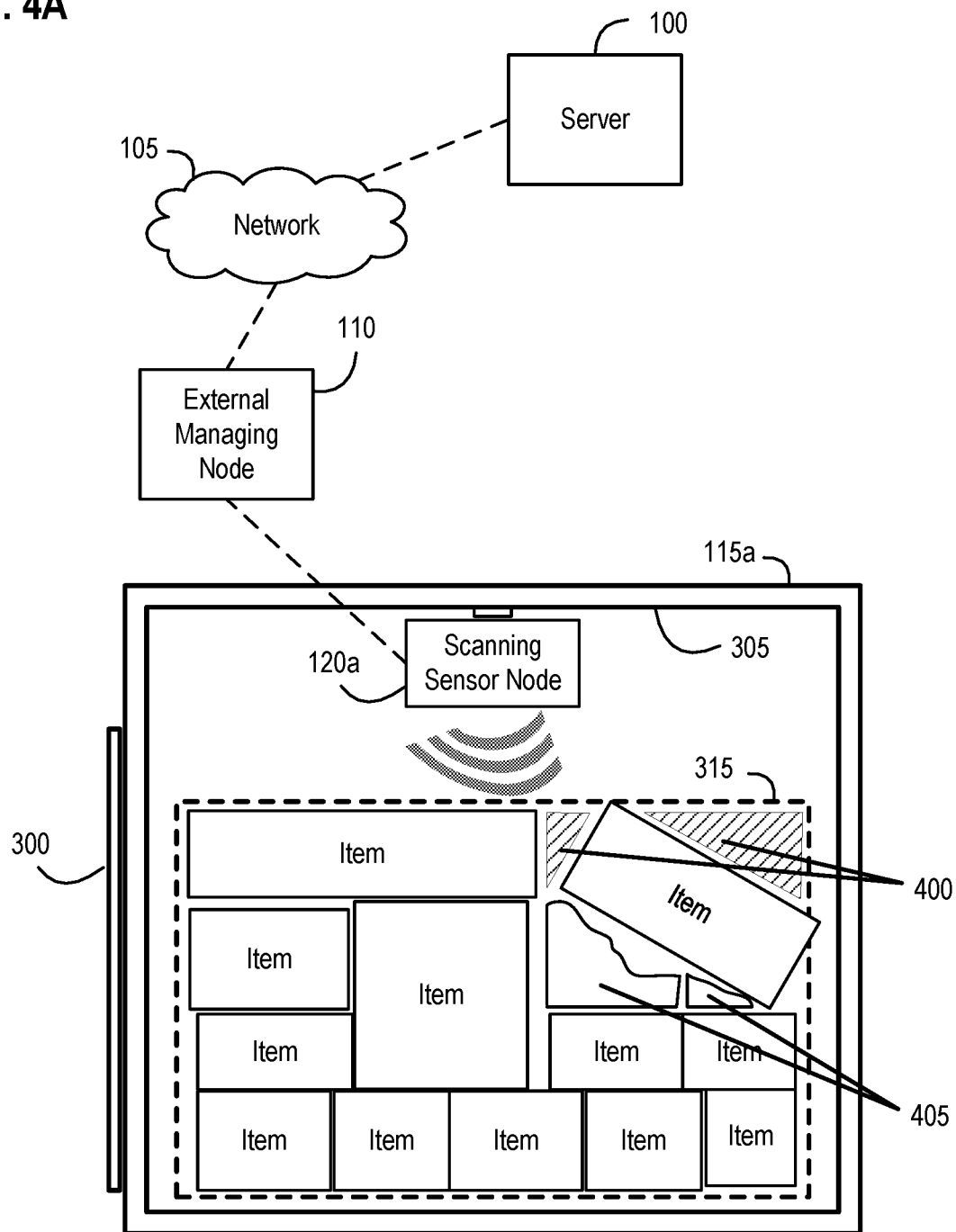
FIGS. 4A-4B are diagrams illustrating various exemplary configurations of elements where an exemplary operational safety condition may be detected within a container using the exemplary scanning sensor node apparatus in accordance with one or more embodiments of the invention.
Figure 4B:
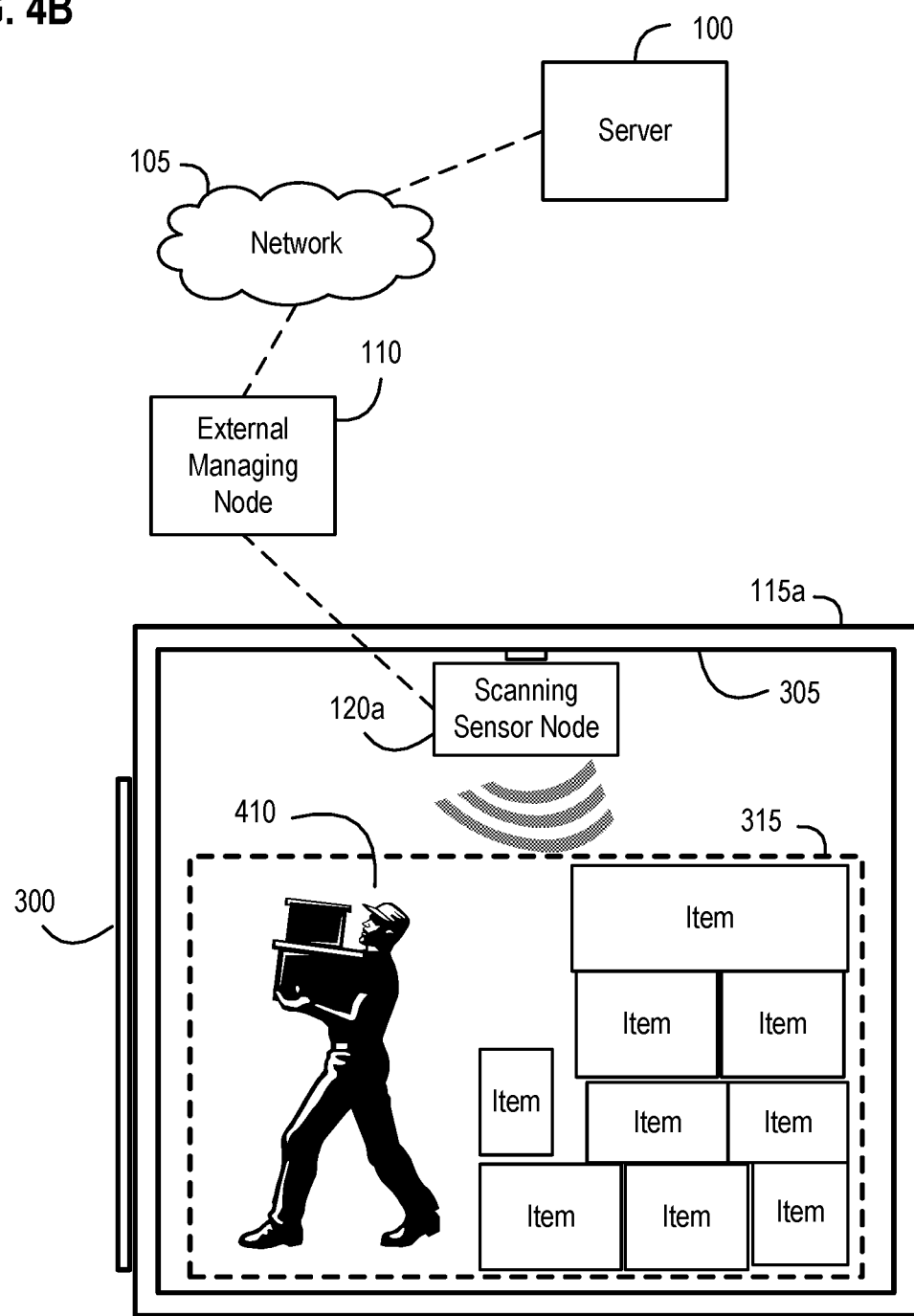

With baseline dimensional information about space 315 stored within memory 215 of the scanning sensor node 120a, exemplary scanning sensor node 120a may track and monitor the space 315 as logistics personnel load container 115a as reflected in FIG. 3C. For example, after item 130a has been brought into and placed within the storage space 315 of container 115a, scanning sensor node 120a is operative to conduct a scan, which generates scan data, and then determines an unoccupied amount of space 315 remaining based upon the generated scan data. In an embodiment, the timing of such a scan may, for example, be based on whether scanning sensor node 120a no longer detects movement (e.g., movement of the logistics personnel involved in loading container 115a) within space 315.

Figure 3D:
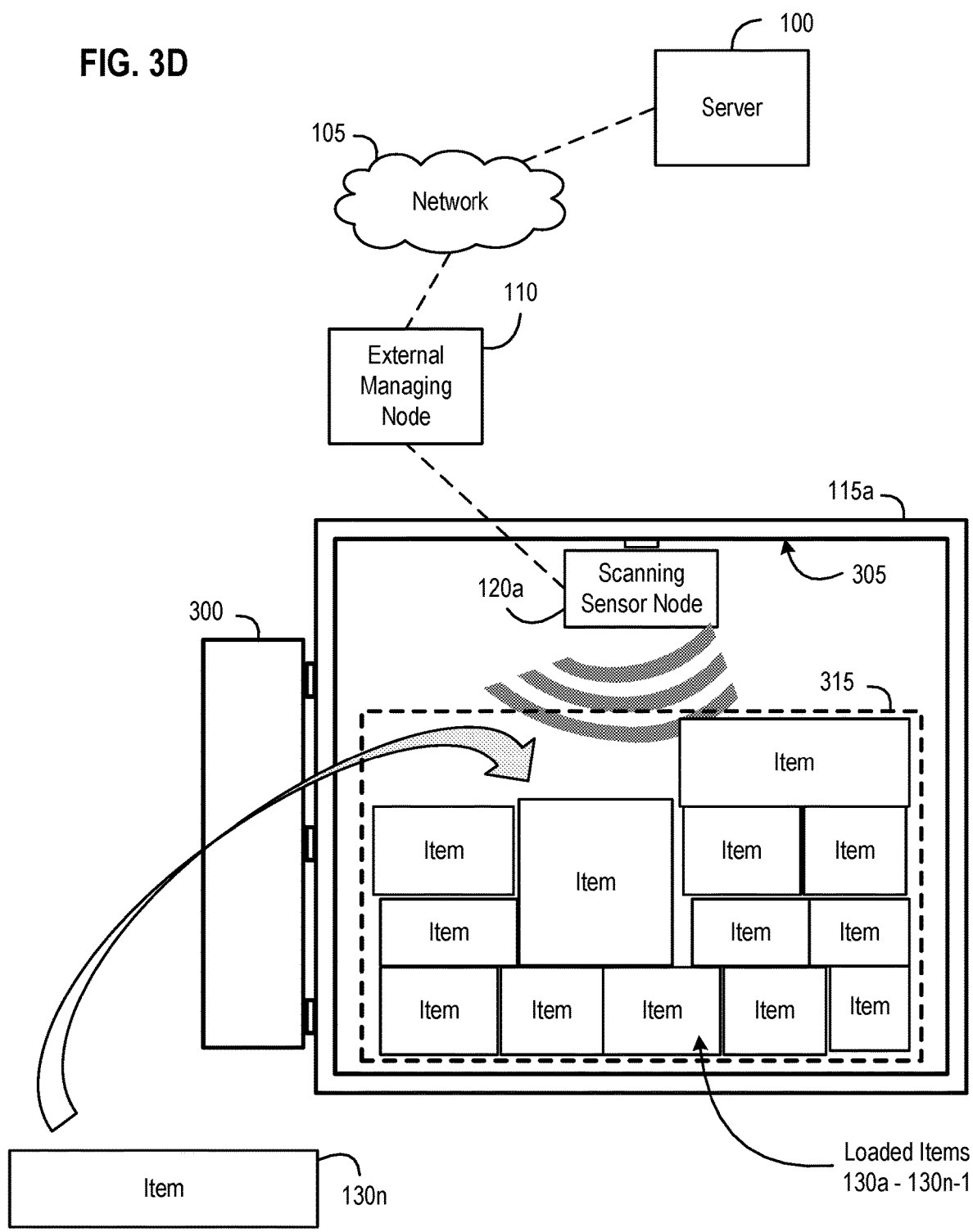
Figure 3E:
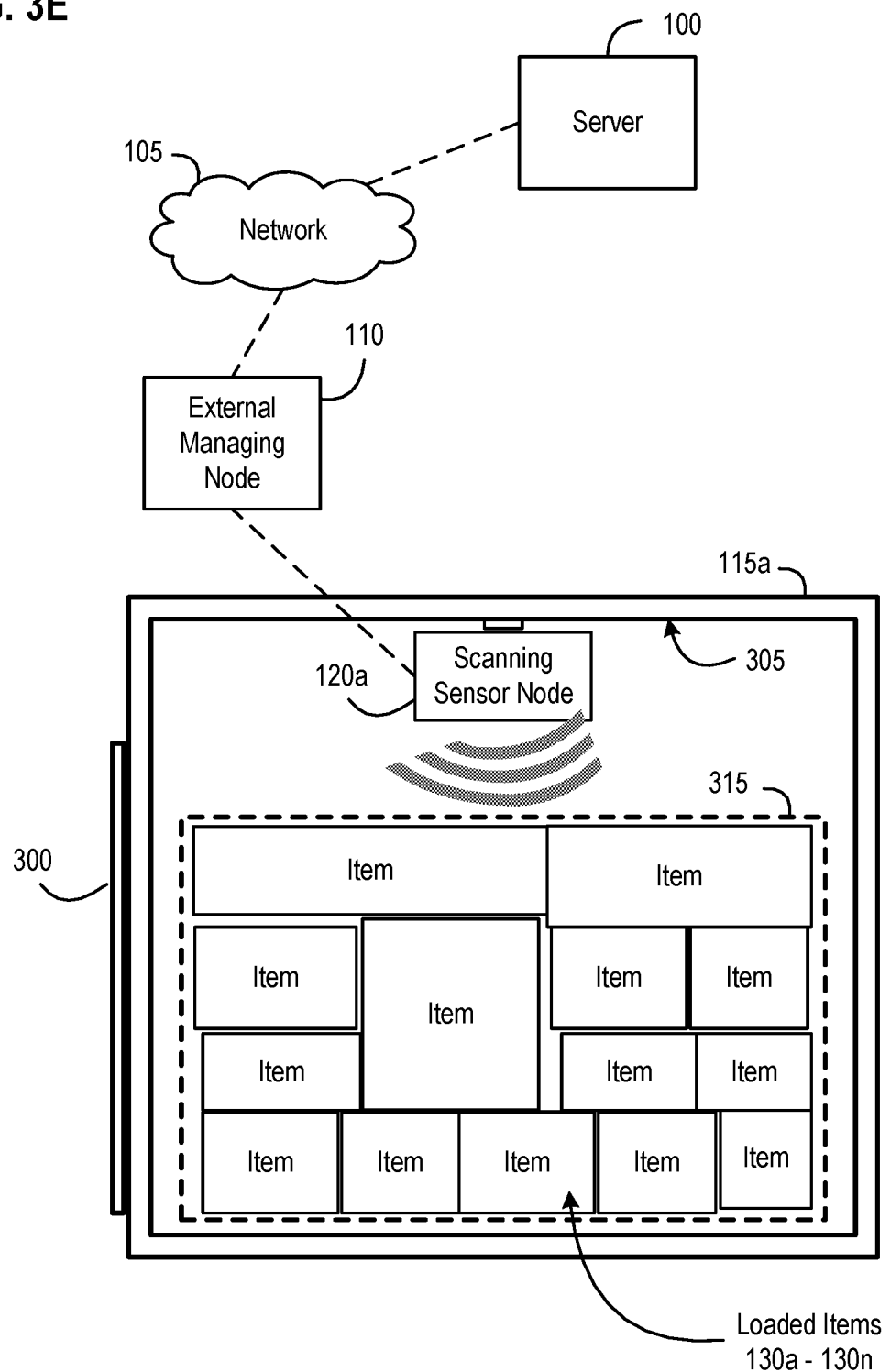

Scanning sensor node 120a may continue to incrementally scan space 315 within container 115a as further items are loaded. For example, as additional items to be shipped within container 115a are placed within space 315, scanning sensor node 120a may scan and determine an updated amount of unoccupied space left within storage space 315 as shown in FIG. 3D. In some embodiments, types of container data 275 may be stored by scanning sensor node 120a to reflect a current status of space 315 within container 115a as well as data related to the items loaded within space 315 (e.g., a listing of items within space 315, transformed dimensional data representing a particular one or more of the items, and the like). In some embodiments, scanning sensor node 120a may transmit a message to another device, such as external managing node 110, with a container status update that reflects a determined unoccupied amount of the storage space 315. And as shown in FIG. 3D, space 315 is nearly to a desired loading state having loaded items 130a-130n-1 now maintained within space 315.

Once item 130n is loaded into space 315 (FIG. 3D), a further scan by scanning sensor node 120a may identify that the loaded items 130a-130n now maintained within space 315 (FIG. 3E) reflect a desired loading state of the container 115a. For example and as explained in more detail below, such a desired loading state may be when the unoccupied portion of storage space 315 reaches a desired threshold percentage of the baseline dimensional information on space 315. Those skilled in the art will also realize that the desired loading state may be relative to how of space 315 is occupied and/or how much of space 315 is unoccupied. Either or both indications of the status of space 315 may be used relative to a threshold when determining if the space 315 has reached the desired loading state.

Once scanning sensor node 120a identifies that the scanned space 315 reflects the desired loading state for this particular container 115a (which may vary per container type and/or particular container based upon what items are to be shipped within the container), scanning sensor node 120a may indicate such on the node 120a (such as with visual or audio feedback to loading personnel) or transmit a desired load message to another node element in the networked system, such as external managing node 110. Such a desired load message may reflect that the desired loading state of the container has been identified, and the container is ready for shipment. In further embodiments, other notifications may be generated by the scanning sensor node 120a once the desired loading state is identified, such as a notification or alert provided through interfacing circuitry 235 and intended to notify or alert logistics personnel of reaching the desired loading state. In another embodiment, external managing node 110 may respond to the desired load message and notify or alert such logistics personnel via, for example, a message to a user access device (such as device 140) associated with such logistics personnel.

In one or more embodiments where exemplary scanning sensor node 120a is left mounted within container 115a after door 300 is closed, exemplary scanning sensor node 120a may further enhance the technical field of logistics operations (e.g., monitored loading and shipment management) by operating to detect an operational safety condition within the container. FIGS. 4A-4B are diagrams illustrating various exemplary configurations of elements where an operational safety condition may be detected within exemplary container 115a using exemplary scanning sensor node apparatus 120a in accordance with one or more embodiments of the invention. Referring now to FIG. 4A, container 115a is shown after having been loaded but when scanning sensor node 120a maps or scans storage space 315 to determine a change in the mapped storage space 315. For example, scanning sensor node 120a may previously have scanned space 315 and determine that spaces 400 were previously occupied but now are unoccupied. This may, in as embodiment, reflect a changed location for one or more items within space 315, which reflects unintended/undesired movement within container 315 and indicate a type of operational safety condition (e.g., items shifted during shipment, some items may no longer be supported and may pose a safety threat to logistics personnel that have to unload container 115a, some items may be crushed and may have spilled contents into the container 315, and the like). As such, scanning sensor node 120a may generate a responsive notification or alert and provide the notification or alert to a managing node, such as external managing node 110, to report such an operational safety condition. In some embodiments, external managing node 110 may then further report this operational safety condition to the back-end server 100 so that server 100 may notify relevant logistics personnel about the particular detected operational safety condition within container 115a and request and/or direct responsive action (e.g., issue a notification to logistics personnel to re-open container 115a, notify logistics personnel of potential hazardous conditions within container 115a based on what is being shipped within container 115a, communicate with external managing node 110 to cause scanning sensor node 120a to monitor environmental conditions within container 115a to detect further changes, such as an increase in temperature, humidity, other changes in unoccupied space, concussive forces detected within or to the container, the existence of smoke particles, the existence of relevant chemicals, and the like).

In another embodiment where exemplary scanning sensor node 120a is left mounted within container 115a after door 300 is closed, exemplary scanning sensor node 120a may further detect an operational safety condition within the container related to another type of detected movement within the closed container. As shown in FIG. 4B, container 115a is shown during a stage of loading container 115a, but when scanning sensor node 120a detects that door 300 is closed and detects multiple or frequency movement within container 115a. Such a situation may indicate a type of operational safety condition where a loader, such as person 410, has been mistakenly left or locked within container 115. In such a detected situation, the operational safety condition may be a safety warning not to ship the container and may indicate that the container 115a should be reopened. As such, scanning sensor node 120a may generate a responsive notification or alert to a managing node, such as external managing node 110, to report such an operational safety condition associated with the detected closed door and movement within the container. In some embodiments, external managing node 110 may then further report this operational safety condition to the back-end server 100 so that server 100 may notify relevant logistics personnel about the particular detected operational safety condition within container 115a and request and/or direct responsive action (e.g., issue a notification to logistics personnel to not ship container 115a and a notification to re-open container 115a) in order to resolve the safety situation relative to any person detected within the closed container 115a.

Enhanced Quantifying of Space within a Container

In the context of the above description related to an exemplary scanning sensor node, such as node 120a, deployed and used within a container to enhance and improve a loading operation for the container, further embodiments are described below in varying degrees of detail. As discussed above, a fundamental functionality of an embodiment of scanning sensor node, such as node 120a, may be to quantify storage space within a container from within the container and from an advantageous position within that container. FIG. 5 is a flow diagram illustrating an exemplary method for quantifying space within a container using a removable scanning sensor node in accordance with an embodiment of the invention. Referring now to FIG. 5, method 500 begins at step 505 with the removable scanning sensor node identifying a type of the container. In a more detailed embodiment of method 500, the removable scanning sensor node (such as scanning sensor node 120a) may identify the type of the container by conducting an initial scan of the space within the container from the perspective of the removable scanning sensor node oriented to look down from the ceiling within the container (where the scanning sensor node is mounted, such as that shown in FIG. 2). The initial scan may provide initial scan data that at least includes baseline dimensional information related to the available storage space (such as space 315) within the container. More specifically, the removable scanning sensor node may identify the type of the container based upon one or more dimensional parameters (e.g., length, width, depth) of the baseline dimensional information from the initial scan data.

In a further embodiment, the removable scanning sensor node may identify the type of the container in step 505 by transmitting a request to a second node, where the request is for container type information related to the container. For example, as shown in FIG. 3B, exemplary scanning sensor node 120a is mounted within container 115a and may, in this embodiment, transmit a request to external managing node 110 for container type information (which may identify the type of the container and provide baseline dimensional information related to the space within that type of container). In response, the second node device (such as external managing node 110) may transmit the requested container type information that is then received by the removable scanning sensor node.

At step 510, method 500 continues with the scanning sensor node scanning the space within the container to generate scan data using at least one depth sensor on the removable scanning sensor node. Here, the removable scanning sensor node is temporarily mounted within the container and above the space within the container (e.g., above the space where a scanner element is aimed directly down, or above but to the side of the space so that the scanner element is aimed in a downward perspective even if not directly down). In this configuration, the depth sensor(s) on the removable scanning sensor node may be oriented to scan the space within the container from above the space and within the container. For example, scanning sensor node 120a may use scanner 220, which may be a single depth sensor, multiple depth sensors, or an array or other group of depth sensing elements, to map out space 315 within container 115a.

In a further embodiment, the removable scanning sensor node may conduct such scanning to generate scan data by taking multiple dimensional measurements related to an interior region of the container (such as storage space 315 of container 115a) using at least one depth sensor on the removable scanning sensor node. Such a depth sensor part of the removable scanning sensor node may be disposed or mounted on or substantially near the ceiling of the container and aligned to scan for the dimensional measurements from above the interior region of the container. For example, detachable coupling 205 may provide a mechanism for mounting the scanning sensor node and its depth sensor (more generally referred to as scanner 220) in an appropriate and desired orientation such that the depth sensor has a field of view and exposure that includes storage space 315 as shown in FIG. 3B. In more detail, the one or more depth sensors making up scanner 220 on removable scanning sensor node 120a may be implemented with a plurality of scanning elements disposed within the container (e.g., physically spaced out depth sensor elements along the ceiling 305 or top of the walls near the ceiling 305 of container 115a) to scan for the dimensional measurements from above the interior region of the container.

In yet a further embodiment, the scanning of step 510 may be performed by the removable scanning sensor node only while the removable scanning sensor node detects there is no movement within the space within the container. Such an enhancement avoids wasting energy and processing associated with conducting a scan and generating scan data when what is physically within the storage space of the container may be moving and not intended to stay within the storage space (e.g., loading personnel entering to place one or more items being shipped)

At step 515, method 500 continues with the removable scanning sensor node determining an unoccupied amount of the space within the container based upon the generated scan data from step 510. In more detail, the unoccupied amount of the space further may be considered an approximate available volume left to be filled in a designated storage portion within the container. Such an approximate available volume left may be filled with items to be shipped, as well as other structure that may not include items to be shipped (e.g., cushioning material, support structure that may be required to support and/or hold the items being shipped securely in place within the storage area of the container, and the like).

In a further embodiment of method 500, step 515 may have the scanning sensor node determining the unoccupied amount of the space within the container by being operative to assess the scanned space within the container relative to baseline dimensional information according to the identified type of the container. For example, if the identified type of container is an intermodal shipping freight container, the container may have baseline dimensional information relative to the freight container's empty storage footprint (e.g., length and width measurements) and height that collectively indicates the available storage space to be used within the particular intermodal shipping freight container.

In another embodiment, determining the unoccupied amount of the space may be accomplished when the removable scanning sensor node determines the unoccupied amount of the space within the container based upon an average of the scan data generated over time when scanning the space within the container from above the space. In more detail, determining the unoccupied amount of the space in still another embodiment may be accomplished when the removable scanning sensor node determines the unoccupied amount of the space within the container based upon an average of scan data generated over time when scanning the space within the container from above the space and while the removable scanning sensor node detects movement within the container.

In a more detailed embodiment, step 505 of method 500 may be accomplished by having the removable scanning sensor node access material dimension data from a source external to the removable scanning sensor node (such as from external managing node 110). The material dimension data is associated with a shipping item loaded into the space within the container. As such, the scanning sensor node may determine the unoccupied amount of the space within the container based upon the scan data and the accessed material dimension data, such that the determined unoccupied amount of the space represents a current status of the space within the container below the interior roof surface. Having access to material dimension data as well as scan data may allow for enhanced accuracy of determining the unoccupied amount of space remaining within a storage area of the container. In even more detail, the determining step 505 may be accomplished by the scanning sensor node determining the unoccupied amount of the space based upon a comparison of the accessed material dimension data and an average of scan data generated by the depth sensor(s) over time when scanning the space within the container from above the space and while the scanning sensor node detects movement within the container.

And as incrementally more items to be shipped are loaded into the container, a further embodiment of method 500 may have step 515 using the removable scanning sensor node (such as node 120*a*) to dynamically determine the unoccupied amount of the space as each of the additional shipping items are loaded into the space within the container.

A further embodiment may include further steps 520-530 involving communications with a second node device, such as external managing node 110. As such, method 500 may continue at step 520 with the removable scanning sensor node transmitting a container status update message to a second node element (such as the external managing node 110). Such a container status update message reflects the determined unoccupied amount of the space within the container, and passes this information back to other elements within the networked system, such as that shown in FIG. 1 and FIGS. 3A-3E.

At step 525, method 500 may continue with the removable scanning sensor node identifying when the scanned space within the container reflects a desired loading state of the container. This identification may be accomplished, for example, when the removable scanning sensor node compares the determined unoccupied amount of the space within the container to parameters associated with the container (a type of container data 275) that reflect and indicate the container is deemed full and that additional loading should cease. Thus, in some embodiments, the desired loading state may be that the determined unoccupied amount of space falls below a threshold level indicative of the full and sufficiently loaded container for that type of container being loaded.

At step 530, method 500 may continue further with the removable scanning sensor node transmitting a desired load message to the second node element (such as the external managing node 110). Such a desired load message may reflect whether the desired loading state of the container has been identified by the scanning sensor node, and is transmitted to inform other logistical elements of the networked system, such as the external managing node 110 and back-end server 100 so that further tracking and managing of shipments within the container as well as the container itself may be updated in a more efficient and timely manner.

Those skilled in the art will appreciate that method 500 as disclosed and explained above in various embodiments may be implemented with an apparatus, such as exemplary scanning sensor node 120*a* illustrated in FIGS. 1, 2, and 3A-3E, running one or more parts of scanning operation program code 260. Such code may be stored on a non-transitory computer-readable medium such as memory storage 215 on scanning sensor node 120*a*. Thus, when executing code 260, the processing unit 210 of scanning sensor node 120*a* may be operative to perform operations or steps from the exemplary methods disclosed above, including method 500 and variations of that method.

In another embodiment, such an exemplary scanning sensor apparatus may be disposed within a container to quantify space within the container. In this embodiment, the structural elements of the apparatus, such as exemplary scanning sensor node 120*a* illustrated in FIG. 2, may include at least a housing, a processing unit, a memory, a depth sensor, a wireless interface, and a power source. The housing of the apparatus is configured to mount to an interior roof surface within the container, such as ceiling 305 of container 115*a*. In a more detailed embodiment, the housing may be configured to be detachably mounted to the interior roof surface within the container, for example, via detachable coupling 205 described above.

The processing unit is disposed within the housing along with the memory (such as memory 215), which is operatively coupled to the processing unit and maintains at least a scanning program code section (such as exemplary scanning program code 260) for execution by the processing unit. The depth sensor is also operatively coupled to the processing unit (such as how scanner 220 is shown connected to processing unit 210 of scanning sensor node 120*a* in FIG. 2). As mounted to the interior roof surface, the depth sensor is disposed and oriented to scan the space within the container below the interior roof surface. In a more detailed embodiment, the depth sensor may be implemented with a plurality of depth sensors that each may be disposed and oriented to scan at least a respective portion of the space within the container below the interior roof surface.

The wireless communication interface is also operatively coupled to the apparatus' processing unit and is disposed within the housing (even if the antenna coupled to the interface has all or a portion extending out of the housing). The power source, such as power source 250 described above, provides electrical power to active circuitry of the apparatus and may be a rechargeable power unit or a replaceable power unit.

The apparatus' processing unit, when executing the scanning program code section, specially adapts the apparatus beyond that of a general computer given the unconventional nature of the collective steps and operative collective functionality as described herein. As such, the processing unit in this embodiment is operative to at least identify a type of the container and baseline dimensional information related to the space within the identified type of the container; store the baseline dimensional information in the memory; cause the depth sensor to scan the space within the container below the interior roof surface; receive, from the depth sensor, scan data generated during the scan; and determine an unoccupied amount of the space within the container as the container is being loaded with material (such as one or more items being shipped) occupying the space within the container, where the determination of the unoccupied space depends on the baseline dimensional information and the scan data representing a current status of the space within the container below the interior roof surface.

In more detail, the processing unit in an embodiment may be operative to identify the type of the container and the baseline dimensional information by being further operative to cause the depth sensor to conduct an initial scan of the space within the container with the depth sensor oriented with a field of view down from the interior roof surface within the container. Such an initial scan may provide the baseline dimensional information related to the space within the container below the interior roof surface (e.g., ceiling 305 of container 115*a*). The processing unit may further be operative to then identify the type of the container based upon one or more dimensional parameters of the baseline dimensional information from the initial scan.

In a further embodiment, the processing unit may operative to identify the type of the container and the baseline dimensional information by being further operative to cause the wireless communications interface to transmit a request for container type information to a second node device (such as external managing node 110 that operates as an access point for the scanning sensor node apparatus). The processing unit may then receive the requested container type information from the wireless communication interface after the wireless communication interface receives the requested container type information from the second node, where the requested container type information identifies the type of the container and provides the baseline dimensional information related to the space within the container.

The exemplary apparatus may take advantage of multiple depth sensor mappings to enhance its scanning operation. For example, in a further embodiment, the processing unit may be operative to cause the depth sensor to determine a plurality of dimensional measurements related to an interior region of the space within the container, where the plurality of dimensional measurements are determined from the scan data generated during the scan. In yet another embodiment, the depth sensor itself may be implemented by multiple scanning elements (e.g., different depth sensing cameras that collectively take depth measurements) disposed within the container to scan for the dimensional measurements from above the interior region of the container. In more detail, an embodiment of the depth sensor may operate to map a void within the space (such as the void within space 315 to be taken up by item 130*n* shown in FIG. 3D or the voids 400 detected by scanning sensor node 120*a* shown in FIG. 4A when an item has moved). Such an exemplary depth sensor may be implemented by, for example, one or more of a camera, an infrared source and sensor, and a laser scanner.

In an embodiment, the processing unit may be further operative to cause the wireless communication interface to transmit a container status update message to a second node element, such as external managing node 110. Such a container status update message may serve to notify the second node elements about the determined unoccupied amount of the space within the container and, thus, keep other components within a networked system of components (such as a scanning sensor node, an external managing node, and a server) informed relative to the ongoing loading operation of the container monitored by the apparatus.

When the scanned space within the container reflects a desired loading state of the container, the processing unit may further operative to identify this state and responsively cause the wireless communications interface to transmit a desired load message to the second node element. As such, the desired load message reflects whether the desired loading state of the container has been identified and, again, keeps other components (such as the second node element) aware and informed about the loading operation of the container monitored by the apparatus.

In another embodiment, the processing unit of the exemplary scanning sensor node apparatus may further be operative to determine the unoccupied space based upon an average of scan data generated over time when scanning the space within the container from above the space. Such averaging may allow for more accuracy and discount scans where unintended objects (such as loading personnel and/or loading equipment) are temporarily present within the storage space being scanned within the container.

In a further embodiment, detecting movement may factor into when to scan the storage space under the interior roof surface of the container. For example, a further embodiment may have the processing unit being operative to determine the unoccupied amount of the space based upon an average of scan data generated by the depth sensor over time when scanning the space within the container from above the space and also while the scanning sensor node detects movement within the container. This may help avoid scanning during long periods where nothing is changing within the space being loaded within the container. In another embodiment, the processing unit may cause the depth sensor to scan the space when the depth sensor detects there is no movement within the space within the container. This may help avoid scanning while unintended objects (such as loading personnel and/or loading equipment) are temporarily present within the storage space being scanned within the container. In another embodiment, the depth sensor may scan the space after first detecting no movement for a period of time (e.g., no loading going on) and then detecting movement (e.g., loading the next item has begun).

An embodiment of the apparatus may also use material dimension data stored within memory, which may be a type of container data 275 stored and maintained within memory 215. In such an embodiment, the processing unit is operative to determine the unoccupied amount of space by being further operative to access material dimension data stored within the memory. Such material dimension data may be generated by a source external to the removable scanning sensor node, such as a separate dimension scanning system that may scan or otherwise measure the dimension of items in a separate logistics operation, such as a shipping facility sorting operation involving scanners and conveyor systems that move and facilitate automated shipment management of such items. The material dimension data is associated with a shipping item loaded into the space within the container; and determine the unoccupied amount of the space within the container based upon the scan data, the baseline dimensional information, and the accessed material dimension data.

In more detail, the processing unit may be programmed to determine the unoccupied amount of the space based upon a first comparison and a second comparison. The first comparison may be of the accessed material dimension data and an average of scan data generated by the depth sensor over time when scanning the space within the container from above the space and while the scanning sensor node detects movement within the container. The second comparison may be of the results of the first comparison compared to the baseline dimensional information, which generally reflects an empty storage space within the container.

And finally, the processing unit may be further operative to dynamically determine the unoccupied amount of the space as one or more additional shipping items are loaded into the space within the container. For example, the apparatus may use an additional sensor 230, such as a motion detector or a wireless identification detector (e.g., an RFID reader), to detect when one or more additional shipping items are loaded into the space and then, in response, the processing unit may dynamically determine the unoccupied amount of the spaced based upon any such detections.

As described herein, an exemplary scanning sensor node (such as scanning sensor node 120*a*) may be used as part of a method for quantifying space within a container, as part of an apparatus that quantifies spaced within a container, as well as part of a system to quantify space within a container as the container is loaded. In an exemplary system embodiment, such an exemplary system for quantifying space within a container may comprise a portable scanning sensor apparatus as described above and an external node (such as external managing node 110) in communication with the portable scanning sensor apparatus. The processing unit of the portable scanning sensor apparatus in the system may operate as discussed above, while the external node may be operative to receive a container status update message from the wireless communication interface of the portable scanning sensor apparatus and provides an indication associated with the determined unoccupied amount of the space within the container. The external node may be further operative to operate as the second node described above, but now as part of the exemplary system when, for example, providing requested container type information.

The exemplary system may further comprise a server (such as server 100) in communication with at least the external node (such as external managing node 110), where the external node receives one or more requests from the portable scanning sensor apparatus and responds based upon a communication or information received from the server (e.g., requested container type information). The external node may further be operative to provide an indication message to the server associated with the determined unoccupied amount of the space within the container.

In a further embodiment, the external node may be a user access device, such as device 140, and notify an operator of the external node with the indication. The external node in such an embodiment may include a display (e.g., user interface, such as status lights, auditory display elements (such as a speaker), or a more complex display that may show alphanumeric information) that notifies the operator about the indication.

In summary, various embodiments of exemplary methods, apparatus, and systems are described above that leverage use of an exemplary scanning sensor node to help quantify space within a container as part technology that enhances and improves monitoring and managing of a loading operation for the container.

Efficiency of Quantifying of Space within a Container

As explained above in general, an exemplary scanning sensor node, such as node 120a, may be deployed and used within a container to enhance and improve a loading operation for the container. Further embodiments may enhance the efficiency of how to quantify the space within the container in order to, for example, optimize battery power used in the scanning sensor node, optimize processing requirements for the scanning sensor node, and/or making efficient use of memory available for generated scan data while monitoring how a container may be loaded. An exemplary scanning sensor node may take advantage of one or more of the onboard sensors to detect initiating and/or terminating conditions that help the scanning sensor node provide more efficient operations as the node quantifies space within the container from a perspective of above the storage space (such as being mounted to ceiling 305 of container 115a above space 315 used to store items being shipped).

FIG. 6 is a flow diagram illustrating an improved exemplary method for efficiently quantifying space within a container using a scanning sensor node disposed within the container and exposed to scan the space within the container from above the space in accordance with an embodiment of the invention. Referring now to FIG. 6, method 600 begins at decision step 605 by detecting an initiating condition from within the container using an activation sensor on the scanning sensor node. An exemplary activation sensor may be, for example, light sensor 225 and/or one or more of the additional sensors 230 as described in more detail above regarding FIG. 2. If an initiating condition is detected at step 605, method 600 proceeds to step 610. Otherwise, method 600 remains in a lower power state in step 605 until an initiating condition is detected. Such a lower power state may have one or more elements of scanning sensor node operating in a mode where they use less energy (e.g., unpowered mode, low energy mode, hibernate mode, or the like), thus conserving available electrical power from the scanning sensor node's power source.

The initiating condition in step 605 reflects at least an anticipated change within the container, such as an opening of the container (e.g., detection of the container door being open or light coming in from outside the container), a movement of contents maintained within the container (e.g., items being shipped, packaging for the items, support structure holding the items, and the like), a cessation of movement from within the container (e.g., no more detected movement of logistics personnel from with the container), a loading or unloading operation related to the container (e.g., a detected movement of logistics personnel from within the container), and a closing of the container.

In one embodiment, detecting the initiating condition from within the container using the activation sensor in step 605 may involve detecting movement within the container using a motion sensor as the activation sensor. In yet another embodiment, the step 605 of detecting the initiating condition from within the container using the activation sensor may involve detecting an environmental change related to the container as the initiating condition using at least one environmental sensor as the activation sensor. Such an environmental sensor, in more detailed embodiments, may operate to detect the environmental change as a detected threshold level of a measurable characteristic within or related to the container, such as light within the container, temperature within the container, humidity within the container, concussive force related to the container, atmospheric chemical composition change within the container, auditory level change related to the container, barometric pressure within the container, and smoke particle concentration within the container.

At step 610, in response to detecting the initiating condition using the activation sensor, the method 600 continues by using the scanning sensor node to capture a snapshot scan of the space within the container from above the space and within the container, such as space 315 within container 115a as seen by scanner 220 on exemplary scanning sensor node 120a mounted on ceiling 305. In general, a snapshot scan may be considered a scan that collectively captures a state of the storage space seen by scanning sensor node (e.g., scanner 220 or elements of scanner 220, such as different depth sensing scanner elements that may be respectively oriented and/or aimed to view and scan different portions of the storage space 315). In a further embodiment, step 610 may be implemented when the scanning sensor node captures the snapshot scan using a depth sensor, and the snapshot scan of the space indicates an approximate available volume left to be filled within a storage portion of the container.

Method 600 continues at step 615 with the scanning sensor node storing the snapshot scan within its memory. For example, exemplary scanning sensor node 120a may store scan data reflecting the snapshot scan within memory 215 as part of scan generated data 280.

At step 620, method 600 may continue with the scanning sensor node generating a notification when the snapshot scan reflects a desired load status of the container (e.g., a type of container data 275 that reflects how full the container being loaded should be when considered in the desired load state). Such a generated notification may, for example, be transmitted directly to another device, such as external managing node 110, or may be transmitted to yet another device (such as server 100 or user access device 140) through an intermediary access point type of node (such as external managing node 110). In this manner, elements outside of the scanning sensor node may be efficiently alerted to a state of the container being loaded.

At step 625, method 600 may have the scanning sensor node periodically capture one or more additional snapshot scans of the space within the container from above the space and within the container. In a more detailed embodiment, step 625 may have the scanning sensor node capturing the one or more additional snapshot scans until the scanning sensor node detects a terminating condition at step 630 from within the container using the activation sensor. For example, the terminating condition may be an environmental condition, such as a detected lack of movement within the container over a defined monitoring period or a detected closed container door. Thus, an exemplary scanning sensor node may capture snapshot scans until the detected terminating condition.

At step 635, method 600 may proceed with the scanning sensor node detecting a second initiating condition from within the container using the activation sensor. Such a second initiating condition may be similar or different than other initiating conditions (such as the initiating condition of step 605) and reflects at least a further anticipated change within the container after detecting the terminating condition. If the second initiating condition is detected at step 635, method 600 may proceeds to step 640. Otherwise, method 600 may remain in a lower power state in step 635 until the second initiating condition is detected.

However, once the second initiating condition is detected in step 635, method 600 may proceed to step 640 where the scanning sensor node may periodically capture further additional snapshot scans of the space within the container until the scanning sensor node detects a second terminating condition from within the container using the activation sensor. For example, the action of beginning to load a first item into storage space 315 of container 115a may cause a first initiating condition where the scanning sensor node may capture one or more snapshot scans of space 315 from above space 315 until the scanning sensor node detects a terminating condition, such as when the logistics personnel doing the loading leaves the storage space 315. Detecting the second initiating condition, capturing of additional snapshot scan(s), and then detecting the second terminating condition may occur when, for example, the logistics personnel comes back into the container 115a to place another item within space 315 as loading continues.

Method 600 may also include step 645 (similar to step 620) where the scanning sensor node generates a notification when a current of the snapshot scans reflects a desired load status of the container. As such, the scanning sensor node may itself indicate the desired load stat, and/or transmit a message on the status through its wireless communication interface to an external device, such as external managing node 110, or may have the message transmitted to yet another device (such as server 100 or user access device 140) through an intermediary access point type of node (such as external managing node 110). In this manner, the scanning sensor node as well as elements outside of the scanning sensor node may be efficiently alerted to a state of the container being loaded and, in more detail, that the container being loaded is at its desired load state.

Those skilled in the art will appreciate that method 600 as disclosed and explained above in various embodiments may be implemented with an apparatus, such as exemplary scanning sensor node 120a illustrated in FIGS. 1, 2, and 3A-3E, running one or more parts of scanning operation program code 260. Such code may be stored on a non-transitory computer-readable medium such as memory storage 215 on scanning sensor node 120a. Thus, when executing code 260, the processing unit 210 of scanning sensor node 120a may be operative to perform operations or steps from the exemplary methods disclosed above, including method 600 and variations of that method.

In another embodiment, an improved scanning sensor apparatus may be disposed within a container to efficiently quantify space within the container. In this embodiment, the structural elements of the apparatus, which may be implemented with exemplary scanning sensor node 120a illustrated in FIG. 2, may include at least a housing, a processing unit, a memory, a depth sensor, and an activation sensor. The housing of the apparatus is configured to mount to within the container above the space within the container. In a more detailed embodiment, the housing may be configured to be removed or detach from the container after being mounted within the container, as described with respect to the exemplary embodiment and components illustrated in FIG. 2.

The processing unit is disposed within the housing along with the memory (such as memory 215), which is operatively coupled to the processing unit and maintains at least a scanning program code section (such as exemplary scanning program code 260) for execution by the processing unit. Those skilled in the art will appreciate that an embodiment with exemplary scanning program code 260 as described above with reference to FIG. 6 may include additional or alternative programming instructions than that reflected in different embodiment of scanning program code 260 defining the functionality called out with respect to FIG. 5.

The depth sensor is also operatively coupled to the processing unit (such as how scanner 220 is shown connected to processing unit 210 of scanning sensor node 120a in FIG. 2). The depth sensor of the apparatus (such as scanner 220) is exposed to the space within the container from above the space, and operates to capture a snapshot scan relative to the space within the container from above the space. In a more detailed embodiment, the depth sensor may be implemented with a plurality of depth sensors that each may be disposed and oriented to scan at least a respective portion of the space within the container from above the space.

The activation sensor is also operatively coupled to the processing unit (such as how light sensor 225 and/or additional sensors 230 are respectively connected to processing unit 210 shown in FIG. 2). In general, the activation sensor is a type of sensor or detector that functions to monitor an environmental condition of the space within the container. For example, the activation sensor may include one or more of a motion sensor that detects movement within the container as the environmental condition; a light sensor that detects a threshold level of light within the container as the environmental condition; a temperature sensor that detects a threshold level of temperature within the container as the environmental condition; a humidity sensor that detects a threshold level of humidity within the container as the environmental condition; a kinetic force sensor that detects a concussive force related to the container as the environmental condition; a chemical sensor that detects an atmospheric chemical composition change within the container as the environmental change; a microphone that detects an auditory level change related to the container as the environmental change; a pressure sensor that detects a barometric pressure within the container as the environmental change; and a smoke sensor that detects a smoke particle concentration within the container as the environmental change.

The apparatus' processing unit, when executing this embodiment of the scanning program code section, specially adapts the apparatus beyond a general computer given the unconventional nature of the collective steps and operative functionality imparted by the program code as described herein. As such, the processing unit in this embodiment is operative to at least receive an initiating condition signal from the activation sensor, where the initiating condition signal reflects at least an anticipated change to the monitored environmental condition of the space within the container; in response to receiving the initiating condition signal, cause the depth sensor to capture the snapshot scan of the space within the container from above the space and within the container; and access the memory to store the captured snapshot scan data within the memory.

In more detail, the snapshot scan data may indicate an approximate available volume left to be filled of the space within a storage portion of the container captured by the depth sensor. Additionally, the anticipated change to the monitored environmental condition (within or otherwise related to the container) may include, for example, at least one of an opening of the container (e.g., detected with a scanner, a motion sensor and/or light sensor as the activation sensor), a movement of contents maintained within the container (e.g., detected with the scanner and/or motion sensor as the activation sensor), ceased movement within the container (e.g., detected with the scanner and/or motion sensor as the activation sensor), a loading and/or unloading operation related to the container (e.g., detected with the scanner and/or motion sensor as the activation sensor), and a closing of the container (e.g., detected with a scanner, a motion sensor and/or light sensor as the activation sensor).

In a further embodiment, the processing unit may cause the depth sensor to periodically capture one or more additional snapshot scans of the space within the container from above the space and within the container. In more detail, this may be accomplished when the processing unit causes the depth sensor to periodically capture the additional snapshot scan(s) until receiving a terminating condition signal from the activation sensor. Further still, another embodiment may have the processing unit being able to access the memory to store in the memory at least a most recent of the one or more additional snapshot scans.

In yet another embodiment, the processing unit of the apparatus may be operative to receive a second initiating condition from the activation sensor after receiving the terminating condition signal from the activation sensor, where the second initiating condition reflects at least a further anticipated change to the monitored environmental condition of the space within the container. In response to receiving the second initiating condition signal, the processing unit may also cause the depth sensor to periodically capture further additional snapshot scans of the space within the container, and then cause the depth sensor to cease capturing the further additional snapshot scans of the space within the container upon receiving a second terminating condition signal from the activation sensor. The processing unit may then be operative to access the memory to store in the memory at least a most recent of the one or more additional snapshot scans.

In still further embodiments, the apparatus may include a wireless communications interface, such as one or both of wireless interfaces 240 and 245 shown in FIG. 2. Such a wireless communication interface may be disposed within the housing, be operatively coupled to the processing unit, and may transmit one or more messages over a wireless communication path to other devices (such as external managing node 110) as part of an improved logistics process and apparatus used in such a process. As such, an embodiment of the processing unit may generate a notification message when one or more of the snapshot scans reflects a desired load status of the container and cause the wireless communication interface to transmit the notification message. In more detail, the wireless communication interface may transmit the notification message to at least one of a server system (such as server 100) or an operator node device (such as user access device 140). A more detailed example of such an operator node device may include, but is not limited to, a smartphone, a tablet computing device, a laptop computer, and a terminal computing device. Such devices may be used by logistics personnel (generally referred to as an operator) to receive such notification messages relevant to the loading operation involving the scanning sensor apparatus.

Managing Load Operations with a Scanning Sensor Node

Additional embodiments may enhance how an exemplary scanning sensor node may be deployed and used in a logistics operation regarding how to manage load operations via, for example, having the scanning sensor node that can automatically identify an item to be shipped as the item is loaded in the container as well as monitor the occupied capacity within the container during the load operations. As explained in more detail below, automatically identifying the item to be shipped may be accomplished via use of an identification scanner used on the scanning sensor node. Such an identification scanner may be implemented using, for example, a type of additional sensor 230 or wireless interface 240, 245 that may detect or otherwise communicate with an identification element by scanning for or listening for the identification element associated with or related to one or more of the items being shipped. Such an identification element may, for example, be implemented by a barcode, a radio, a cellular radio device, a wireless network device, a wireless data communications device operating under a lower power communication protocol and a wireless data communications device operating under a higher power communication protocol, an RFID device, an NFC device, a Bluetooth device, a ZigBee device, and/or a Wi-Fi device where the element is capable of providing information that identifies the related item being shipped.

Figure 7A:
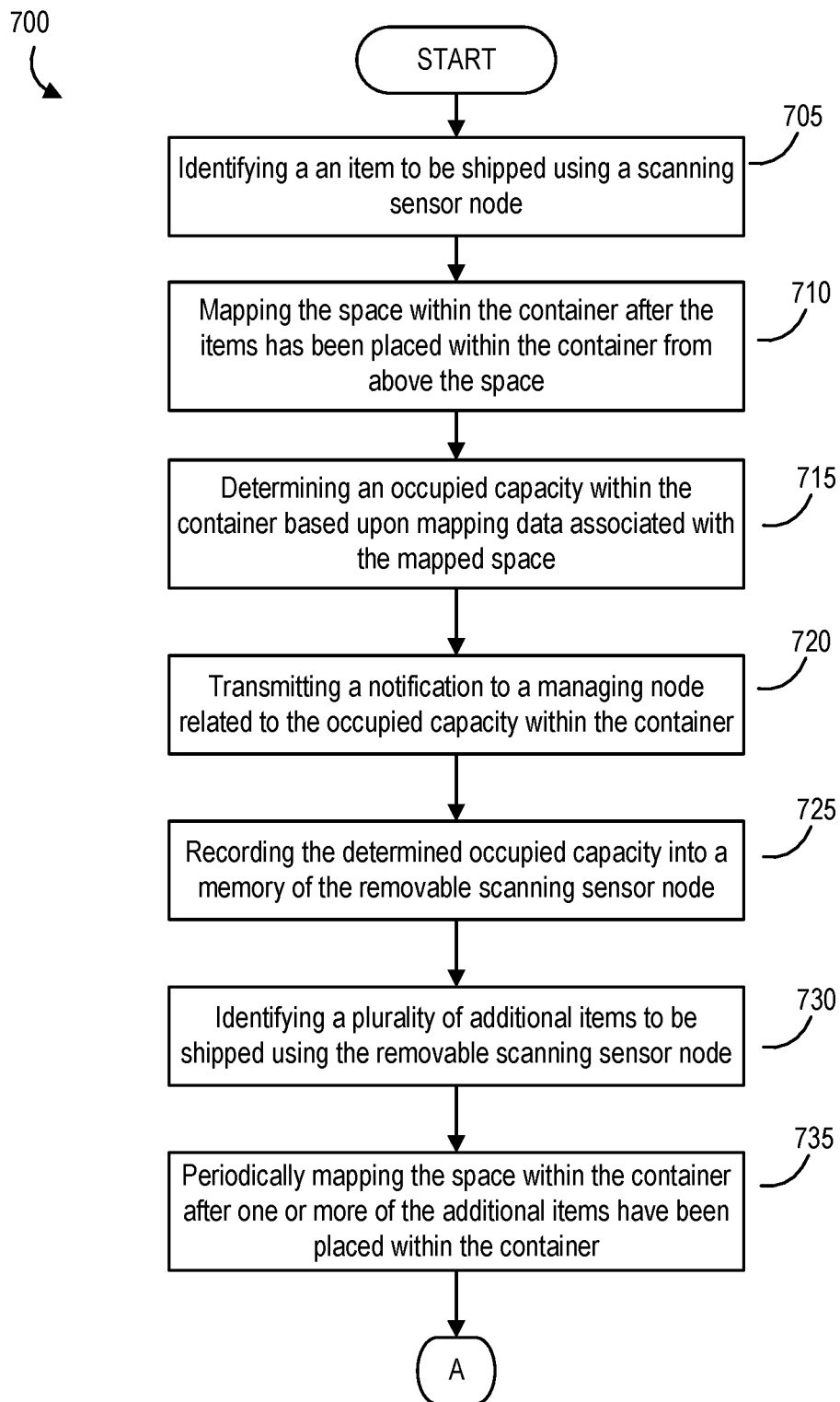
FIGS. 7A and 7B are, collectively, a flow diagram illustrating an improved exemplary method for managing a load operation related to a container using an exemplary removable scanning sensor node in accordance with an embodiment of the invention.
Figure 7B:
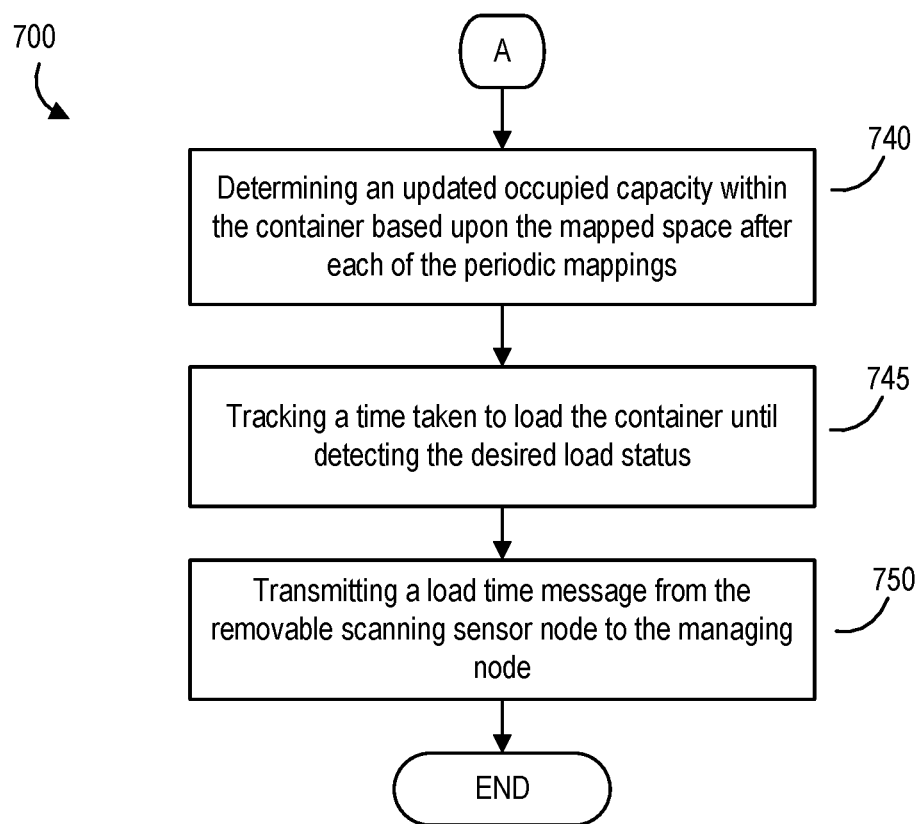

FIGS. 7A and 7B collectively illustrated parts of an exemplary flow diagram that describes several aspects of an improved exemplary method for managing a load operation related to a container using an exemplary removable scanning sensor node in accordance with an embodiment of the invention. Referring now to FIG. 7A, method 700 begins at step 705 with the removable scanning sensor node identifying an item to be shipped within the container. For example, the removable scanning sensor node (such as scanning sensor node 120a) may identify the item when the item is loaded and placed within the container. Thus, as the item is being loaded and/or after the item has been placed within storage space within the container, scanning sensor node may scan (i.e., actively send out a signal and/or listen for a signal) for information related to the item that is being loaded or that is already placed within the storage space. In other words, an embodiment may have the scanning sensor node identifying the item by conducting an identification scan of an item to be shipped within the container (whether during loading or after placement) and identifying the item to be shipped based upon scan data associated with the identification scan.

For example, the identification scan may be performed by a barcode scanning element (e.g., a type of additional sensor 230) on scanning sensor node to identify the item via a detected barcode identification element (such as label) on packaging of the item. In another example, the scanning sensor node may conduct the identification scan to detect a wireless identification element related to the item with one or more scanning elements of the scanning sensor node, such as a radio, a radio frequency identification (RFID) reader, a near field communications (NFC) interface, Bluetooth® radio, or other wireless network data communications device, and the like. Examples of such a wireless identification element may generally be a communications device that wirelessly broadcasts information associated with the item. More specifically, an example of the wireless identification element may include but is not limited to a radio, a cellular radio device, a wireless network device, a wireless data communications device operating under a lower power communication protocol and a wireless data communications device operating under a higher power communication protocol, an RFID device, an NFC device, a Bluetooth device, a ZigBee device, and a Wi-Fi device. And examples of such scanning elements may operate to read or receive identification information related to an identification element, such as an RFID tag, an NFC device, another Bluetooth® device, or another wireless network data communications device operating under a similar communications format, such as IEEE communication protocols in its various forms. As such, an embodiment of one or more scanning elements of the scanning sensor node may be implemented as a type of additional sensor 230 and/or a wireless interface (such as interfaces 240 and 245) as explained in more detail above regarding FIG. 2.

At step 710, method 700 proceeds with the removable scanning sensor node mapping the space within the container. In this step, the mapping is conducted after the item has been placed within the container and while the removable scanning sensor node is temporarily disposed within the container and oriented to map the space within the container from above the space. For example, as shown in FIG. 2, exemplary scanning sensor node 120 may be temporarily mounted to ceiling 305 of container 115a, and oriented so that its scanner 220 has a view and exposure to sufficiently map at least the relevant storage space 315 within container 115a from above the space 315 (e.g., looking down or downward onto the storage space 315 to provide an advantageous perspective of what is loaded and occupying the volume making up space 315).

At step 715, method 700 proceeds with the removable scanning sensor node determining an occupied capacity within the container based upon mapping data associated with the mapped space. This may, for example, involve a comparison of the mapping data related to what occupies the storage space of the container to baseline information on the available capacity within the container (e.g., the available volume of the storage space for item placement within the container).

At step 720, exemplary method 700 proceeds with the removable scanning sensor node transmitting a notification to a managing node (such as external managing node 110) that is in communication with the removable scanning sensor node. The notification is related to the occupied capacity within the container (i.e., the portion of the storage space within container that is occupied). Those skilled in the art will appreciate that such a notification related to the occupied capacity may indicate a filled or unfilled amount of the storage space within the container as such a notification provides an update related to a loading operation relative to the container. In a more detailed embodiment, the transmitting step may have the removable scanning sensor node detecting if the determined occupied capacity meets a desired load status for the container (e.g., a threshold percentage of filled or unfilled) and transmitting the notification to the managing node when the determined occupied capacity at least meets the desired load status for the container. In other words, the notification may indicate a status of the container associated with the determined occupied capacity of the container.

In a further embodiment, the notification may indicate a requested change to the load operation related to the container. For example, the removable scanning sensor node may generate and transmit such a notification to request that additional personnel become involved in loading the container. Loading may be at an undesirably low amount relative to the desire load status, and thus the notification may be provided by the removable scanning sensor node as a suggestive notification to enhance and improve the existing loading operation as part of managing the loading operation of the container.

Additionally, an embodiment may have the notification indicating a summary of what has been loaded into the container associated with the determined occupied capacity of the container. This may be helpful in providing information to other elements within a logistics system (such as the system illustrated in FIG. 1 involving at least an external managing node 110 and server 100).

Further steps illustrated in FIGS. 7A and 7B provide further enhancements in additional embodiments of method 700. For example, at step 725, method 700 may further proceed by recording the determined occupied capacity into a memory of the removable scanning sensor node. Such information may be recorded as part of, for example, scan generated data 280 within memory 215 of scanning sensor node 120a.

And as additional items to be shipped may be loaded in the container, steps 730-740 may be performed to help monitor the occupied capacity of the container. In more detail, step 730 may have the removable scanning sensor identifying a plurality of additional items to be shipped within the container. Such an identifying step may be accomplished similar to step 705 as described above as the items are loaded. In some instances, step 730 may identify the additional items as a group (e.g., items in a multi-piece shipment that may be packaged together or kept on common packaging structure, such as a pallet).

At step 735, method 700 may further proceed with the removable scanning sensor node periodically mapping the space within the container after one or more of the additional items have been placed within the container. For example, scanning sensor node may engage a scanner, such as scanner 220, to further map storage space 315 once one or more additional items are within space 315.

After step 735, method 700 may proceed through transition A shown in FIG. 7A to transition A shown in FIG. 7B. Referring now to FIG. 7B, method 700 may then proceed to step 740 where the removable scanning sensor node may determine an updated occupied capacity within the container based upon the mapped space after each of the periodic mapping steps. Such periodic mapping (an determining as indicated in step 740) may be performed by the removable scanning sensor node until a desired load status for the container is detected, which indicates the container has been loaded to a desired capacity and may be closed and prepared for shipment by logistics personnel.

At step 745, method 700 may have the removable scanning sensor node tracking a time taken to load the container until detecting the desired load status. For example, removable scanning sensor node may use an onboard sensor (such as scanner 220, light sensor 225, or one of the additional sensors 230) to cause the processing unit on removable scanning sensor node to start a timer (which may be part of interface circuitry 235) to track loading time for the container.

At step 750, method 700 may then proceed by transmitting a load time message to the managing node from the removable scanning sensor node. The load time message reflects the tracked time taken to load the container. In an embodiment, the tracked time may be the time from initially detecting the beginning of loading the container (e.g., starting of the timer noted with step 745) until detecting the desired load status to reflect a sufficiently loaded container that may then be closed and prepared for shipment.

Those skilled in the art will appreciate that method 700 as disclosed and explained above in various embodiments may be implemented with an apparatus, such as exemplary scanning sensor node 120a illustrated in FIGS. 1, 2, and 3A-3E, running load operation program code 265 (which may be used to at least facilitate identifying an item) and scanning operation program code 260 (when may be used to at least facilitate mapping the spaced within the container, determining the occupied capacity of the mapped space, and transmitting information about the same to other devices). Such code modules may be stored on a non-transitory computer-readable medium such as memory storage 215 on scanning sensor node 120a. Thus, when executing code 260 and 265, the processing unit 210 of scanning sensor node 120a may be operative to perform operations or steps from the exemplary methods disclosed above, including method 700 and variations of that method.

In an embodiment, such an exemplary scanning sensor apparatus (such as exemplary scanning sensor node 120a) may be disposed within a container to quantify space within the container. In general, the apparatus may include a housing, a processing unit, a depth sensor, an identification scanner, and a wireless communication interface. In more detail, the housing is configured to mount within the container in a position located above storage space within the container, such as on the container's ceiling, interior roof surface, or other structure disposed above the storage space within the container (such as a structural beam). The processing unit is disposed within the housing as a processing core of the apparatus, such as processing unit 210 of scanning sensor apparatus 120a. The memory is disposed within the housing, and is operatively coupled to the processing unit. The memory is available for data generated during operation and maintains at least a load operation program code section and a scanning program code section for execution by the processing unit.

The depth sensor is operatively coupled to the processing unit and disposed and oriented to map the storage space within the container from above the storage space, such as the scanner 220 shown in FIG. 2 that is oriented to map the storage space from above that space within the container. Those skilled in the art will appreciate that above the space may contemplate having the depth sensor or scanning sensor node at an elevation higher than the space, albeit to one side of the space (such as on a wall but elevated on the wall so as to provide a downward view of part or all of the storage space in a container).

The identification scanner is operatively coupled to the processing unit and configured to identify an item to be shipped within the container. For example, the identification scanner may identify the item to be shipped by receiving a signal broadcast from a device associated with the item to be shipped, where the signal includes data sufficient to identify the item to be shipped. In a further example, the device broadcasting the signal to the identification scanner may generally be implemented as a radio transmitter operative to generate and transmit the signal to be received by the identification scanner. In another example, the device broadcasting the signal to the identification scanner may include at least one of a radio, a cellular radio device, a wireless network device, a wireless data communications device operating under a lower power communication protocol and a wireless data communications device operating under a higher power communication protocol, an RFID device, an NFC device, a Bluetooth device, a ZigBee device, and a Wi-Fi device. However, the identification scanner may also be implemented as a barcode reader configured to identify the item to be shipped by capturing information about the item to be shipped from an encoded barcode label on an exposed surface of the item.

The processing unit, when executing the load operation program code section and scanning program code, is operative to receive an identification of the item to be shipped within the container from the identification scanner (e.g., as the item is being loaded and placed within the storage space of the container); cause the depth sensor to map the storage space within the container after the item has been placed within the container; receive mapping data generated by the depth sensor associated with the mapped storage space within the container; determine an occupied capacity within the container based upon the mapping data associated with the mapped storage space; and instruct the wireless communication interface to transmit a notification to a managing node in communication with the improved scanning sensor apparatus over the wireless communication interface, where the notification is related to the occupied capacity within the container. Thus, the above-described exemplary scanning sensor apparatus may operate as described with respect to FIG. 7.

In still another embodiment, an improved system for managing load operations related to a plurality of containers leverages the functionality of multiple scanning sensor nodes (such as scanning sensor nodes 120a and 120b) along with a managing node (such as external managing node 110). Such an exemplary system generally comprises a managing node device and a plurality of scanning sensor nodes where each of the scanning sensor nodes is in operative wireless communication with the managing node device.

Each of the scanning sensor nodes in the system is disposed within a respective one of the containers above a storage space within the respective container, such as attached to a ceiling, overhead beam, or other structure of the container that is located over the storage space. As such, each of the scanning sensor nodes mounted in respective containers is operative to identify one or more items as the items are loaded into the storage space within the respective one of the containers using an identification scanner on the scanning sensor node; map the storage space from above the storage space using a sensor on the scanning sensor node while the items are loaded into the storage space; determine an occupied capacity within the respective one of the containers based upon mapping data generated by the sensor related to the mapped storage space; and transmit a notification to the managing node device. Such a notification is related to the occupied capacity within the respective one of the containers (e.g., how full the container is or how much space is left within the container that may be used to ship additional items).

The managing node device in this system embodiment is associated with at least one operator and has at least a wireless communication interface and a display interface that generates information to be provided to the operator. For example, a managing node device may be implemented with external managing node 110 that has a display interface and is associated with an operator (such as logistics personnel involved in loading and/or managing the loading of the containers). Another example may implement such a managing node device with a user access device 140 (having a display interface and wireless interface) that may utilize external managing node 110 merely as a communication intermediary or conduit type of device between user access device 140 (operating as a managing node device in this system embodiment) and each of the scanning sensor nodes 120a and 120b.

The managing node device in this system embodiment is in operative wireless communication with each of the scanning sensor nodes via the wireless communication interface. As such, the managing node device in this system embodiment operates and functions to receive one or more notifications over the wireless communication interface from each of the scanning sensor nodes; assess the notification received from each of the scanning sensor nodes relative to at least one loading characteristic; generate a loading change message related to a change in the load operations related to the containers; and provide the loading change message on the display interface.

In a further embodiment of the system, the change in load operations related to the containers may comprise a workload adjustment in the load operations. For example, the notification may request for additional logistics personnel to be added to the loading operation of a particular container. This may be because the time it is taking to load the container, as tracked by a respective one of the scanning sensor node devices, may be longer than anticipated, which may prompt generation of the notification. The managing node device may then provide a relevant loading change message reflecting the workload adjustment to logistics personnel involved (including, for example, personnel currently involved and/or personnel not yet involved in the loading operation). In more detail, the loading change message may identify one or more of the containers where assistance is needed to more efficiently load the one or more of the items associated with the identified container.

In another further embodiment, the change in load operations related to the containers may comprise an indication that loading is complete regarding at least one of the containers. For example, the scanning sensor node device installed within a particular container may detect a desired load status reflecting a sufficiently full storage space, and transmit the notification to the managing node device, which then provides the loading change message viewable to logistics personnel involved in the loading operation so that the personnel are quickly and efficiently informed about the full state of the particular container, and may then close up the container and ready it for shipment.

In another embodiment of the system, each of the scanning sensor nodes mounted in the respective one of the containers may be further operative track and report load time information. For example, each of the scanning scan nodes may determine a load time taken to load the respective one of the containers to the desired load status level and then transmit a load time message to the managing node device. Such a load time message may reflect the load time taken to load the respective container to the desired load status level. Additionally, the transmitted load time message may enable the managing node device to present load time information to relevant logistics personnel operating the managing node device, pass along such load time information to other system devices or nodes, and/or record and archive such load time information for purposes of recordkeeping, auditing, and/or analytics tracking of load times based on different shipment parameters associated with the load times (e.g., different types of containers, different logistics personnel, number of personnel used to load the container, particular loading patterns used to place the items within the storage space of the container, time of day, weather, type of items being loaded into the container, and the like).

While an embodiment of the system may have the managing node device taking on such responsible for providing data to scanning sensor node devices as well as management, recordkeeping, auditing, and/or analytics tracking related to the different load operations associated with the different scanning sensor node devices, a further embodiment may include a server device in operative communication with the managing node device over the wireless communication interface of the managing node device. In more detail, the managing node device may then be operative to provide the loading change message on the display interface by transmitting a request to the server device for authorization to provide the loading change message on the display interface; receive the authorization from the server device; and provide the loading change message on the display interface based on the received authorization. Thus, the server device may play an exemplary type of management role with respect to the loading operations being managed and monitored by the system.

Further still, an embodiment of the system may have a notification from a scanning sensor node device including information on the items loaded into at least one of the containers (e.g., stored as exemplary container data 275 in memory 215 of an exemplary scanning sensor node 120a that may be deployed in such a system). As such, the managing node device may generate a container content message related to the notification received from each of the scanning sensor node devices, and transmit the container content message to the server device.

Detecting Safety Conditions with a Scanning Sensor Node

As noted above with respect to FIGS. 4A and 4B, further embodiments may deploy an exemplary scanning sensor node (such as node 120a) mounted within a container after the container is closed. In such a configuration, use of the exemplary scanning sensor node may further enhance the technical field of logistics operations involved in loading and shipment management by operating to detect an operational safety condition within the container. For example, an operational safety condition may generally be a condition that may pose a safety issue to equipment (such as the container or structure supporting items being shipped within the container), the actual items being shipped, and/or personnel involved in the logistics operation of loading or unloading the container. The ability to leverage the unconventional monitoring capabilities of an exemplary scanning sensor node (such as scanning sensor node 120a shown in FIGS. 1, 2, 4A and 4B) in such an embodiment that detects an operational safety condition advantageously enhances the safety of logistics operations.

As described above, FIGS. 4A-4B are diagrams illustrating various exemplary configurations of elements where an operational safety condition may be detected within exemplary container 115a using exemplary scanning sensor node apparatus 120a in accordance with one or more embodiments of the invention. FIG. 8 is a flow diagram provides further details of such an embodiment, and illustrates an improved exemplary method for detecting an operational safety condition within a container using an exemplary scanning sensor node, such as exemplary scanning sensor node apparatus 120a, deployed within the container in accordance with an embodiment of the invention.

Figure 8:
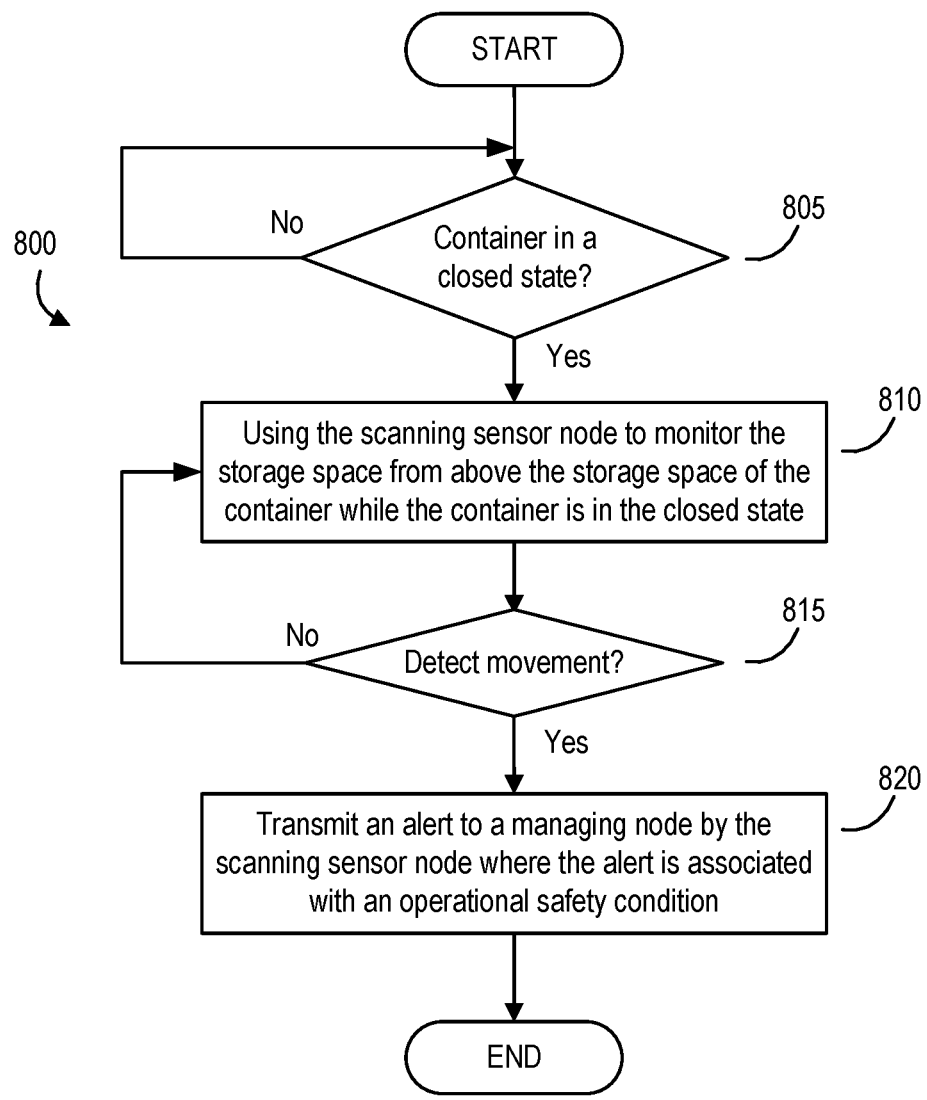
FIG. 8 is a flow diagram illustrating an improved exemplary method for detecting an operational safety condition within a container using an exemplary scanning sensor node deployed within the container in accordance with an embodiment of the invention.

Referring now to FIG. 8, method 800 begins at step 805 with the scanning sensor node sensing if the container is in a closed state. An exemplary scanning sensor node may have one or more sensors that may be able to detect and/or monitor whether the container is closed. For example, in a further embodiment, step 805 may have the scanning sensor node sensing if the container is in a closed state by receiving light originating from outside the container on a sensor on the scanning sensor node (such as light sensor 225 on exemplary node 120a shown in FIG. 2). As such, sensing a closed container may, for example, be when the received amount of the light is below a threshold level and, as a result, indicative of the closed state of the container.

In a more detailed example, the sensing involved in step 805 may be accomplished by detecting light on a light sensitive sensor disposed on the scanning sensor node, where the light sensitive sensor may be oriented towards an opening in the container and configured to detect the light as originating from outside the container. Thus, the container is in the closed state when the light sensitive sensor detects the light from the opening at less than a threshold level.

In another embodiment, the sensing involved in step 805 may be accomplished while the scanning sensor node is aware of the container type. For example, the sensing in step 805 may involve identifying a type of the container by the scanning sensor node (e.g., from an initial scan or from requested information provided by another node device, such as external managing node 110 or server 100); mapping a perceived footprint of the identified container by a scanner disposed on the scanning sensor node where the scanner (e.g., one or more depth scanning elements that may make up scanner 220) oriented within the container to at least map the storage space from above the storage space; and sensing the container is in the closed state when the scanning sensor node determines the perceived footprint of the container mapped by the scanner and reflected by the scan generated data exceeds a known footprint of the identified type of the container. As such, the scan generated data may reflect that the perceived footprint of the container's storage space contains more than what is known to be the storage footprint for that type of container, thus indicating the scanner is "seeing" outside the container and that the container may not be in the closed state.

In still another example, the container may have a dedicated container opening sensor (e.g., a magnetic switch type of sensor on the container and its door that establishes a magnetic state when the door is closed, or a plunger type of mechanical sensor that depresses when a closed door actuates the mechanical sensor to detect a closed state, or a conventional contact sensor that establishes an electrical connection once the door is closed to indicate a closed state) to detect an open or closed state of the container. Such a dedicated container opening sensor may be integrated as part of the container or be a physically separate sensor, and may be plugged into or otherwise operatively connected to scanning sensor node 120a through interface circuitry 235.

Thus, when the scanning sensor node senses the container is in a closed state in step 805, method 800 proceeds to step 810. Otherwise, method 800 remains at step 805 sensing whether the container remains open and when it has closed.

At step 810, method 800 proceeds by monitoring, by the scanning sensor node, the storage space from above the storage space while the container is in the closed state. In more detail, such monitoring may use a scanner on the scanning sensor node (such as scanner 220 as explained with respect to FIG. 2) to periodically map a change in the storage space of the container over time.

At step 815, method 800 proceeds with the scanning sensor node detecting a movement within the container based upon the monitored readings, mapping, and/or scan data generated associated with the storage space while the container is in the closed state. Such movement is indicative of the operational safety condition. In a more detailed example, the movement may relate to a changed location of one or more items loaded within the storage space while the container is in the closed state. As such, the operational safety condition may be a safety warning related to the changed position of the one or more items and may also, for example, indicate that the container should be reopened prior to shipment and/or that care and caution is advised when reopening the container.

In a further embodiment, the monitoring in step 810 and detecting in step 815 may use a motion sensor or detector on the scanning sensor node (such as an additional sensor 230 as explained with respect to FIG. 2) to detect the movement. Such detected movement within the container using the motion sensor may indicate that one or more packages may have significantly shifted, and may be putting weight on the container door. This may cause a safety issue for logistics personnel who may be unloading the container. As such, the operational safety condition may be a safety warning related to the changed position of the one or more items and may also, for example, indicate that the container should be reopened prior to shipment, that the shipment shown to be shipped, and/or that care and caution is advised when reopening the container (before, during, or after shipment—depending on when the movement may be detected and when logistics personnel may be able to reopen the container to address the detected movement).

In still another embodiment, the movement (regardless of how detected) may indicate that a person is located within the storage space while the container is in the closed state. This may occur when repeated or frequent movement is detected while closed; as opposed to a single or less frequent movement that may be more indicative of a shipped item shifting. For example, during a loading operation, multiple logistics personnel may be assigned to load the container but the container may have been close before one or more personnel have left the container. The may occur if, for example, some personnel are busy within a relatively large container (e.g., a tractor trailer) in a role of stacking the items into appropriate positions within the container's storage space and different personnel are operating handcarts or forklift type of equipment to transfer items to be shipped within the container. One of the personnel may be unintentionally locked within the container when the container is closed by other personnel involved in the loading operation.

Thus, if the movement is detected in step 815, method 800 proceeds to step 820. Otherwise, method 800 remains at step 815 detecting movement within the container while in the closed state.

At step 820, method 800 proceeds with the scanning sensor node transmitting an alert to a managing node where the alert is associated with the operational safety condition within the container. As such, the alert may provide a type of safety warning as explained above and may be passed to logistics personnel (via a display or via a user access device associated with the logistics personnel) or provided further to a server.

Those skilled in the art will appreciate that method 800 as disclosed and explained above in various embodiments may be implemented with an apparatus, such as exemplary scanning sensor node 120a illustrated in FIGS. 1, 2, and 3A-3E, executing scanning program code 260 and running safety condition program code 270. Such code modules may be stored on a non-transitory computer-readable medium such as memory storage 215 on scanning sensor node 120a. Thus, when executing code 260 and/or 270, the processing unit 210 of scanning sensor node 120a may be operative to perform operations or steps from the exemplary methods disclosed above, including method 800 and variations of that method.

Thus, a further embodiment may focus on a scanning sensor apparatus (as described above with reference to method 800 and variations of that method and exemplary scanning sensor node 120a described above with reference to FIG. 2). The scanning sensor apparatus in this embodiment is disposed above a storage space within a container that detects an operational safety condition within the container. In a more detailed example, such an apparatus may include a housing, a processing unit, a memory, a scanner, and a sensor that detects if the container is in a closed state. In particular, the housing of the apparatus is configured to mount within the container and above the storage space within the container. The processing unit is disposed within the housing and may be implemented, for example, by processing unit 210 of exemplary scanning sensor node 120a shown in FIG. 2. The memory is disposed within the housing, and is operatively coupled to the processing unit. The memory maintaining at least a safety condition program code section for execution by the processing unit, but may also include scanning program code (such as code 260). The scanner (such as scanner 220 operating as, for example, a depth sensor with one or more scanning elements) of the apparatus is operatively coupled to the processing unit, wherein the scanner is exposed to the storage space within the container from above the storage space, such that the scanner is oriented and configured to monitor the storage space from above the storage space.

In this embodiment, the sensor is operatively coupled to the processing unit and detects if the container is in a closed state. Such an exemplary sensor, as described above with reference to FIG. 8, may be implemented with a light sensor (such as light sensor 225 on exemplary node 120a shown in FIG. 2), a light sensitive sensor oriented towards an opening in the container and configured to detect the light as originating from outside the container, or a dedicated container opening sensor (e.g., a magnetic switch type of sensor, a plunger type of mechanical sensor, or a contact sensor that establishes an electrical connection once the door is closed to indicate a closed state) that may be used to detect a condition that indicates an open or closed state of the container.

The wireless communication interface of the apparatus operatively couples to the processing unit and allows, for example, the apparatus to communicate with other devices, such as external managing node 110, server 100, and/or user access device 140.

In this apparatus embodiment, the processing unit, when executing at least the safety condition program code section, is operative to receive an indication from the sensor on whether the container is in the closed state; cause the scanner to monitor the storage space while the container is in the closed state; receive information from the scanner related to monitoring of the storage space while the container is in the closed state; detect a movement within the container based upon the received information from the scanner, the movement being indicative of the operational safety condition; and provide the wireless communication interface with an alert to be transmitted to a managing node (such as external managing node 110) where the alert is associated with the operational safety condition within the container.

In a more detailed embodiment, the sensor may be implemented with a light sensitive sensor oriented towards an opening in the container (such as a door or other access port or opening) and be configured to detect the light as originating from outside the container. In such a configuration, the light sensitive sensor may detect light from the opening at less than a threshold level when the container is in the closed state. In even more detail, the processing unit may be further operative to receive a signal from the light sensitive sensor indicating an amount of light detected, and the assess the indicated amount of light detected relative to the threshold level to determine whether the container is in the closed state.

Thus, such an apparatus as described above and with components further described above and with reference to FIG. 8, an embodiment of an exemplary scanning sensor apparatus disposed above a storage space within a container may enhance and improve shipment management technology in how it may detect an operational safety condition within the container.

Transforming Dimensional Data with a Scanning Sensor Node

In a further set of embodiments, an exemplary scanning sensor node may be deployed as a type of check/balance against a shipped item's dimension data that may previously exist prior to loading into a container. For example, an item to be shipped in a container may have material dimension data available from a prior logistics operation, such as when the item may have been scanned and sorted in a shipping distribution facility. If available, the material dimension data for the item being shipped may act as a baseline of information on the item, and generally may be transformed based upon a further scanning operation conducted by the exemplary scanning sensor node to better reflect the dimensions of the item as shipped. Thus, a successful further scanning operation may allow the scanning sensor node to adjust and refine what may exist as far as dimensional information related to the item and transform that representation into data that more accurately reflects the item.

This may be useful, for example, where the pre-existing available material dimension data reflects a group of items packaged together. But, further processing of the packaged items may cause the packaged items to change shape, become damaged, or perhaps lose one of the items from the packaged group (e.g., an item that was originally packaged on top of a pallet with other items, but during processing fell off). In such an example scenario, an embodiment may deploy an exemplary scanning sensor node as a check on expected dimensions or a confirmation of dimensional information in order to detect early shipping issues when loading the container, as opposed to when the container may be unloaded and the issue may not be caught until much later when rectifying the issue becomes more costly or complicated. Thus, further embodiments may allow for transforming dimensional data to reflect and represent the most current state of the item, to more quickly recognize a potential logistics issue related to the shipping item, and allow for an improved process of rectifying the logistics issue (e.g., obtaining a replacement item if the item is damaged, notifying a shipping customer if the item is damages or not all of the items are present within a packaged group of items, and the like).

Figure 9:
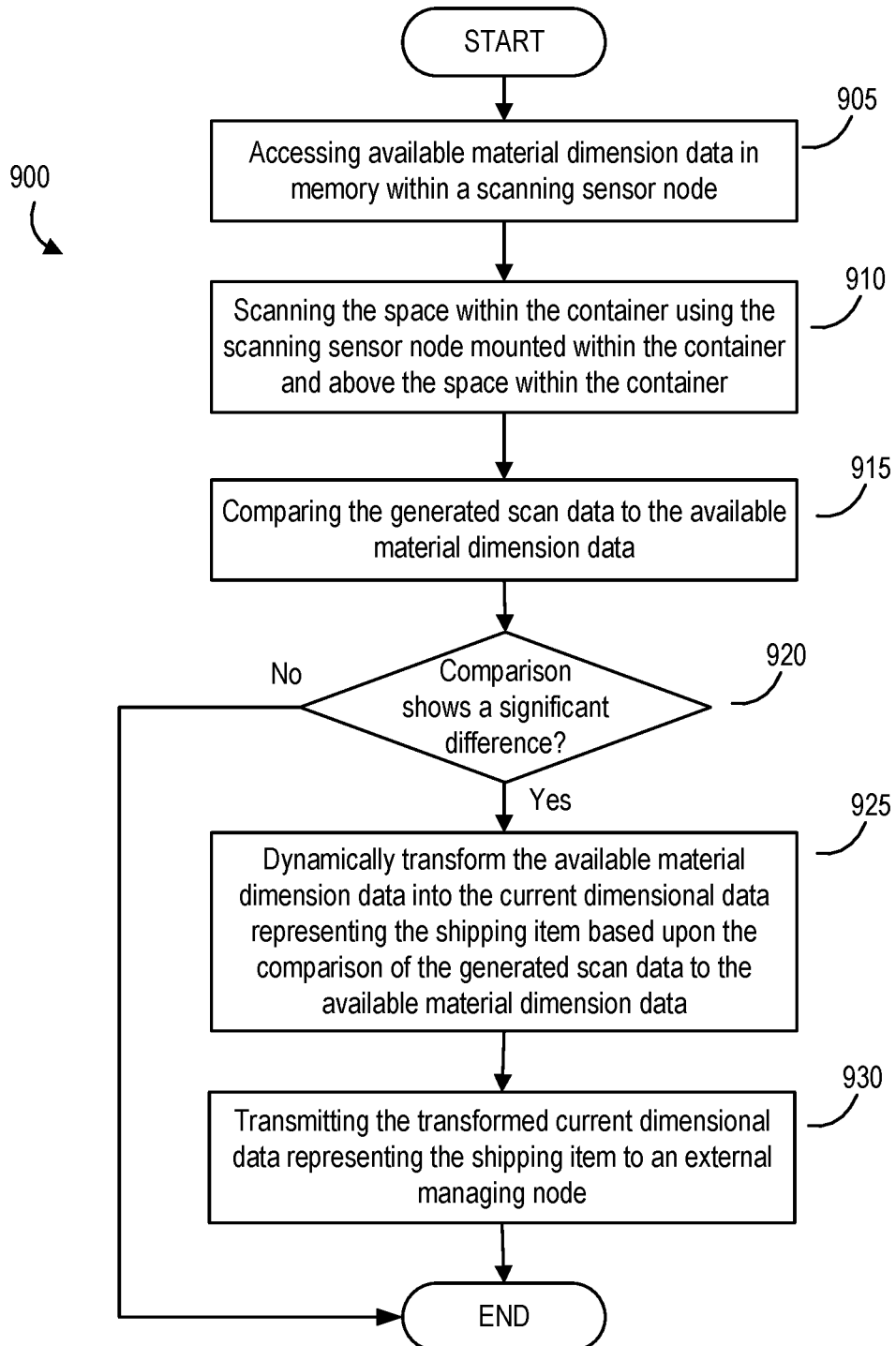
FIG. 9 is a flow diagram illustrating an exemplary method for dynamically transforming dimensional data representing a shipping item being loaded within a container using an exemplary scanning sensor node in accordance with an embodiment of the invention.

FIG. 9 is a flow diagram illustrating an exemplary method for dynamically transforming dimensional data representing a shipping item being loaded within a container using an exemplary scanning sensor node in accordance with an embodiment of the invention. In more detail, method 900 deploys an exemplary scanning sensor node (such as node 120a shown and explained in more detail in FIG. 2) having at least a memory, a depth sensor, and a communications interface to an external managing node.

Referring now to FIG. 9, method 900 begins at step 905 with the scanning sensor node accessing available material dimension data in the memory within the scanning sensor node. The material dimension data, if available, is related to the shipping item. For example, the available material dimension data may be information (such as default dimension data associated with packaging used for the item, or standard physical dimension data for the item itself (or a group of items packaged together) and may be maintained by server 100 and/or external managing node 110, and further provided to scanning sensor node to be kept in its memory. Further still, an example of material dimension data may be generated by other shipment processing systems (such as laser scanning dimensioning type of systems used in a shipment facility while processing an item being shipped).

In a further embodiment, the scanning sensor node may first identify the shipping item as the shipping item is being loaded within the container. For example, the scanning sensor node may employ an identification scanner (e.g., a barcode reader, a signal reader, or interactive radio device as previously discussed with respect to FIGS. 2 and 6) to help identify the shipping item.

At step 910, method 900 continues with the depth sensor on the scanning sensor node scanning the space within the container to generate scan data related to the shipping item once the shipping item is placed within the container. As part of such scanning, the scanning sensor node is mounted within the container and above the space within the container. In this way, the depth sensor (such as scanner 220 on node 120a and which may have one or more depth sensing elements) may be deployed and oriented to scan the space within the container from above the space and within the container.

At step 915, method 900 continues with the scanning sensor node comparing the generated scan data from step 910 to the available material dimension data. Thus, if the comparison shows a significant difference in step 920, method 900 proceeds to step 925 where the available material dimension data for the item may be transformed. Otherwise, method 900 terminates. As noted above, the comparison of step 920 may yield a difference that may indicate a missing part of the item being shipped, damage to the item, and the like.

In a more detailed embodiment, the comparison of step 920 may be accomplished with the scanning sensor node comparing (a) an average of a plurality of scan data for the shipping item generated over a period of time and (b) the available material dimension data so that dynamically transforming the available material dimension data (as explained below regarding step 925) involves adjusting the current dimensional data representing the shipping item based upon results of comparing (a) and (b).

At step 925, method 900 continues with the scanning sensor node dynamically transforming the available material dimension data into the current dimensional data representing the shipping item based upon the comparison of the generated scan data to the available material dimension data performed in step 920. In a further embodiment, such transforming of data may be accomplished by storing the generated scan data as the current dimensional data representing the shipping item if the material dimension data for the shipping item is unavailable or inaccessible. In still another embodiment, such transforming may be accomplished by the scanning sensor node updating the current dimensional data representing the shipping item to reflect the difference between the averaged scan data over the period of time and the available material dimension data. Thus, the transformed current dimensional data more accurately represents the item being shipped and characteristics about the item, and may be used to determine whether the item has changes, has a missing part or parts, or is damaged prior to closing the container and shipping the contents of the container to its intended destination.

At step 930, method 900 may also continue in a further embodiment where the scanning sensor node sends a message to the external managing node to transmit the transformed current dimensional data representing the shipping item. As such, the external managing node may detect a shipping issue based on the transmitted transformed data, and direct one or more further messages to other devices (e.g., to server 100, to a user access device 140, or back to scanning sensor node 120a) to address the detected shipping issue.

Those skilled in the art will appreciate that method 900 as disclosed and explained above in various embodiments may be implemented with an apparatus, such as exemplary scanning sensor node 120a illustrated in FIGS. 1, 2, and 3A-3E, running scanning program code 260. Such scanning sensor apparatus disposed within a container may dynamically transforms dimensional data representing a shipping item being loaded within the container as described above. Such code may be stored on a non-transitory computer-readable medium such as memory storage 215 on scanning sensor node 120a. Thus, when executing code 260, the processing unit 210 of scanning sensor node 120a may be operative to perform operations or steps from the exemplary methods disclosed above, including method 900 and variations of that method.

Furthermore, another embodiment may include a system that leverages such a scanning sensor apparatus as programmed and operating as described with respect to method 900 and variations of that method. In more detail, such an exemplary system for quantifying space within a container may comprise a scanning sensor apparatus and an external managing node. The scanning sensor apparatus in this embodiment includes at least a housing, a processing unit, a memory, a depth sensor, and a wireless communication interface. The housing is configured to be mounted to an interior roof surface within the container. The processing unit is disposed within the housing along with the memory, which is operatively coupled to the processing unit and maintains at least exemplary scanning program code section for execution by the processing unit and available material dimension data related to a shipping item. The depth sensor is also operatively coupled to the processing unit and disposed below the interior roof surface and oriented to advantageously scan the space within the container below the interior roof surface. The wireless communication interface is disposed within the housing and operatively coupled to the processing unit.

The external managing node is disposed outside the container and in operative wireless communication with the scanning sensor apparatus via the wireless communication interface of the scanning sensor apparatus. Incoming information may be transmitted to the scanning sensor apparatus from the external managing node (such as the available material dimension data), as well as outgoing information may be transmitted from the scanning sensor apparatus to the external managing node (such as any newly transformed dimension data related to an item loaded into the container). External managing node may also communication with other devices, such as a user access device (e.g., smartphone, laptop, tablet, desktop, or other computing device allowing for logistics personnel interaction) and/or a server.

In the exemplary system, the processing unit of the scanning sensor apparatus, when executing the scanning program code section, is operative to access the available material dimension data in the memory related to the shipping item; cause the depth sensor to scan the space within the container below the interior roof surface once the shipping item is loaded in the space within the container; receive, from the depth sensor, scan data generated during the scan; compare the scan data to the available material dimension data; dynamically transform the available material dimension data into the current dimensional data representing the shipping item based upon the comparison of the generated scan data to the available material dimension data; and then cause the wireless communication interface to transmit a dimensional data update message to the external managing node. Such a dimensional data update message reflects the current dimensional data representing the shipping item.

Furthermore, the external managing node in the system is operative to at least receive the dimensional data update message from the wireless communication interface of the scanning sensor apparatus, and store the transformed current dimensional data as communicated in the dimensional data update message. In a further embodiment, the external managing node in the system may also include a server (e.g., server 100 as shown in FIG. 1) in direct communication with the external managing node but incapable of direct communication with the scanning sensor node. The external managing node may then transmit a dimensional update message to the server, where the dimensional update message informs the server at least about the dynamic transform operation.

In yet another embodiment, the external the external managing node may detect a logistics issue based upon the dimensional update message and may transmit an alert to the server, where the alert identifies the logistics issue associated with the item being shipped as reflected in the dimensional update message. Such a logistics issue may include a defect with the item being shipped. For example, the defect may relate to the transformed dimensional information indicating part, or all, of the item may be damaged. In another example, the defect may relate to a missing part of the item (e.g., a missing item from a multi-item packaged shipment on a pallet or an item that has multiple parts that may be separately packaged but shipped together).

In response, the server may respond to the alert by generating a logistics rectifying message that facilitates addressing the logistics issue prior to shipment of the container. Such a logistics rectifying message may notify the external managing node or, for example, may cause the external managing node to receive the message and forward the message to the scanning sensor node or a user access device in communication with the external managing node and being operated by logistics personnel involved in loading the container. In this way, the system may allow for transforming dimensional data representing a shipping item to become more quickly known within such a shipment managing system, and allow for an improved process of rectifying the logistics issue (e.g., obtaining a replacement item if the item is damaged, notifying a shipping customer or supplier if the item is damaged or not all of the items are present within a packaged group of items, and the like).

Transforming Scan Data with a Scanning Sensor Node

In a further set of embodiments, an exemplary scanning sensor node may be deployed to enhanced and improve determining the loaded volume of a container, even when an item may be loaded into a location within the container's storage space that is at least partially not visible to the scanning sensor node. The manner in which items are loaded within the storage space of an exemplary container may inadvertently create one or more locations that may be invisible to a depth sensor on the scanning sensor node. As such, when an item is loaded into the container in such a location, the scan data generated by an exemplary scanning sensor node may not change at all or may only change a relatively small bit because the depth sensor is unable to view all or part of the item. This "hiding in the shadows" issue may lead to a less than accurate determination of the loaded state of the container.

To address this type of issue, an embodiment may monitor a loading operation with knowledge of information about the particular item being loaded, such as material dimension data related to the item, in addition to scan data generated as the item is loaded. Armed with such additional information, the logistics operation of loading the container may be further enhanced and improved as the scanning sensor node relies on more than one source of data when determining the state of the container's storage space (i.e., the loaded volume of the container or remaining volume within the container's storage space for additional items).

As with the example described above, material dimension data may be available from a prior logistics operation, such as when the item may have been scanned and sorted in a shipping distribution facility. In another embodiment, material dimension data may be available as default type of dimension information related to the item, such as the size of packaging used with the item or the standard measurements of the item itself. Such material dimension data may be preloaded on the scanning sensor node or may be dynamically obtained from a device outside the scanning sensor node (such as external managing node 110) as items are loaded.

With such information about the item being loaded into the container, an exemplary scanning sensor node may be able to refine or transform information representing the state of the container's storage space to more accurately account for the actual items loaded into the storage space.

Figure 10A:
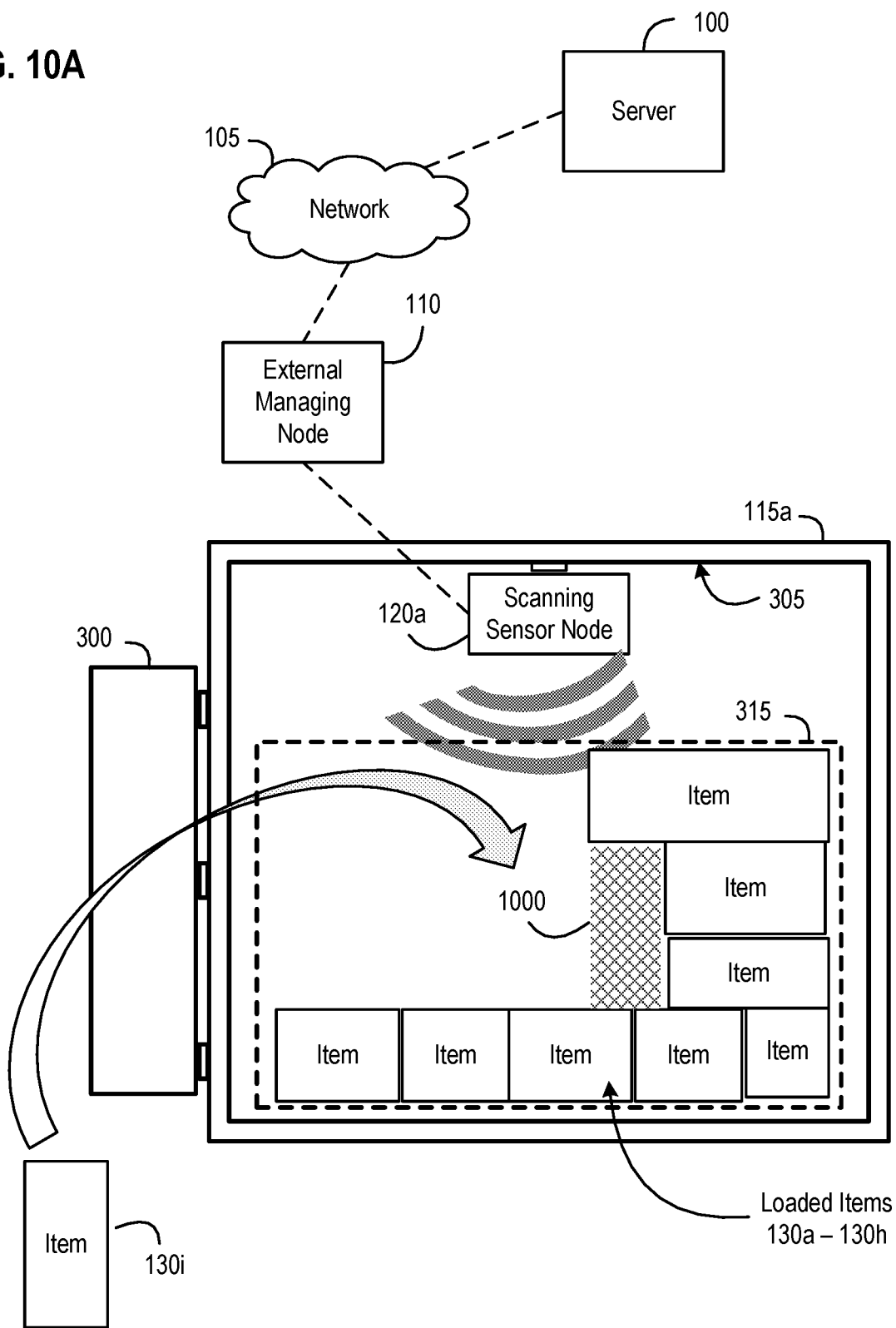
FIGS. 10A and 10B are diagrams illustrating an exemplary system and various exemplary operations involving an exemplary scanning sensor node apparatus deployed within a container as an item is loaded within a location that is not visible or only partially visible to the scanning sensor node apparatus in accordance with one or more embodiments of the invention.
Figure 10B:
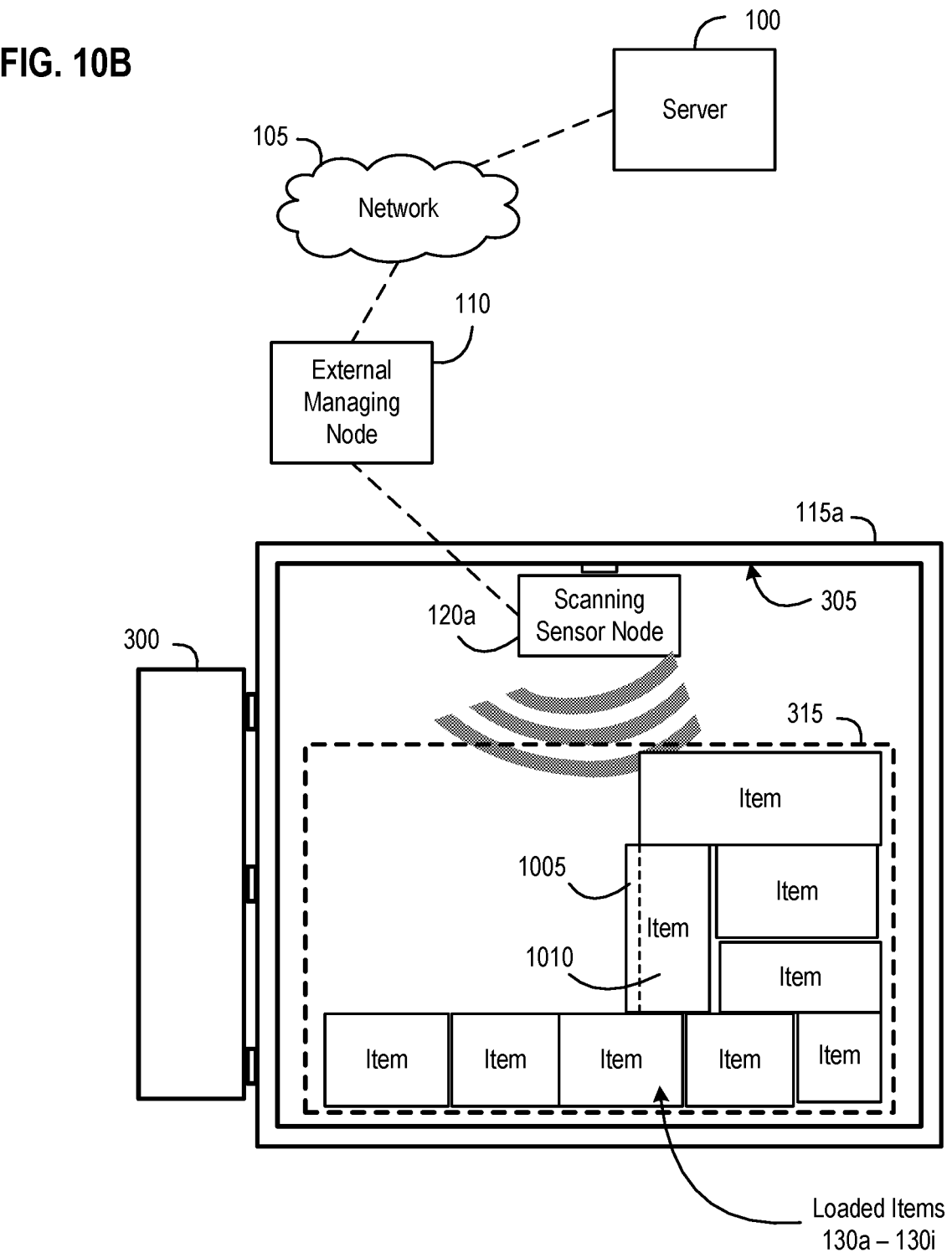

FIGS. 10A, 10B, 11A, and 11B are exemplary diagrams showing various configurations of mounting an exemplary scanning sensor node where an item loaded into the storage space is at least partially not visible to the depth sensor on the node. In particular, FIGS. 10A and 10B are diagrams illustrating an exemplary system and various exemplary operations involving an exemplary scanning sensor node apparatus deployed within a container as an item is loaded within a location that is at least partially not visible to the scanning sensor node apparatus in accordance with one or more embodiments of the invention. Referring now to FIG. 10A, container 115a is shown having scanning sensor node 120a mounted above storage space 315 to an interior surface of container 115a. In this example, scanning sensor node 120a is shown as having been attached to ceiling 315 in a configuration that has node 120a generally over the storage space 315. As will be shown in FIGS. 11A and 11B, another embodiment may have scanning sensor node 120a mounted more to one side of the storage space 315 while still being above the storage space 315. Further still, other embodiments may deploy and mount scanning sensor node 120a on other structure (e.g., beams) or on upper parts of interior wall surfaces and still be considered as being mounted above the storage space given that the node 120a may peer downward (albeit with an angle) towards the storage space.

As depicted in FIG. 10A, storage space 315 has been previously loaded with items 130a-130h. However, in the depicted configuration of items 130a-130h, a location 1000 may exist within storage space 315 that may not be visible to depth sensing elements (such as scanner 220) of the deployed scanning sensor node 120a. Those skilled in the art will appreciate such a location may be minimized by using multiple depth sensing elements to implement scanner 220, and if such multiple depth sensing elements are physically disposed at different points above space 315. Location 1000, which may be considered a shadow or void from a scanning perspective, may be filled with one or more items (such as item 130i) as the container 115a is further loaded. For example, as shown in FIG. 10B, item 130i is loaded into location 1000 so that at least part of item 130i is not visible to the scanning sensor node's scanner elements. In other words, in the example shown in FIG. 10B, a first portion 1005 of item 130i may be visible to depth sensing scanner 220 of scanning sensor node 120a while a second portion 1010 of item 130i may not be visible as it now occupies location 1000. As will be explained in more detail below, exemplary scanning sensor node 120a may identify item 130i as it is being loaded into space 315 and determine if the item 130i is at least partially not visible based on generated scan data and material dimension data related to the item 130i. Here, such generated scan data may only indicate an incremental increase to a previously determined loaded volume of the container (i.e., the volume before item 130i was loaded) and the incremental increase is less than a threshold amount. Such a threshold amount may be a particular volume, or may depend upon an expected volume for item 130i (related to the dimensions of item 130i). Thus, scanning sensor node 120a may dynamically transforming the generated scan data after item 130i is loaded into space 315 because the item 130i is at least partially not visible to the depth sensor scanning elements 220 of scanning sensor node 120a. The transformed scan data may be refined based at least upon material dimension data associated with the item 130i so that the transformed scan data (also referred to as refined scan data) more accurately accounts for the volume of item 130i loaded into space 130 even if not visible or just partially visible to the depth sensor scanning elements 220 of scanning sensor node 120a.

Figure 11A:
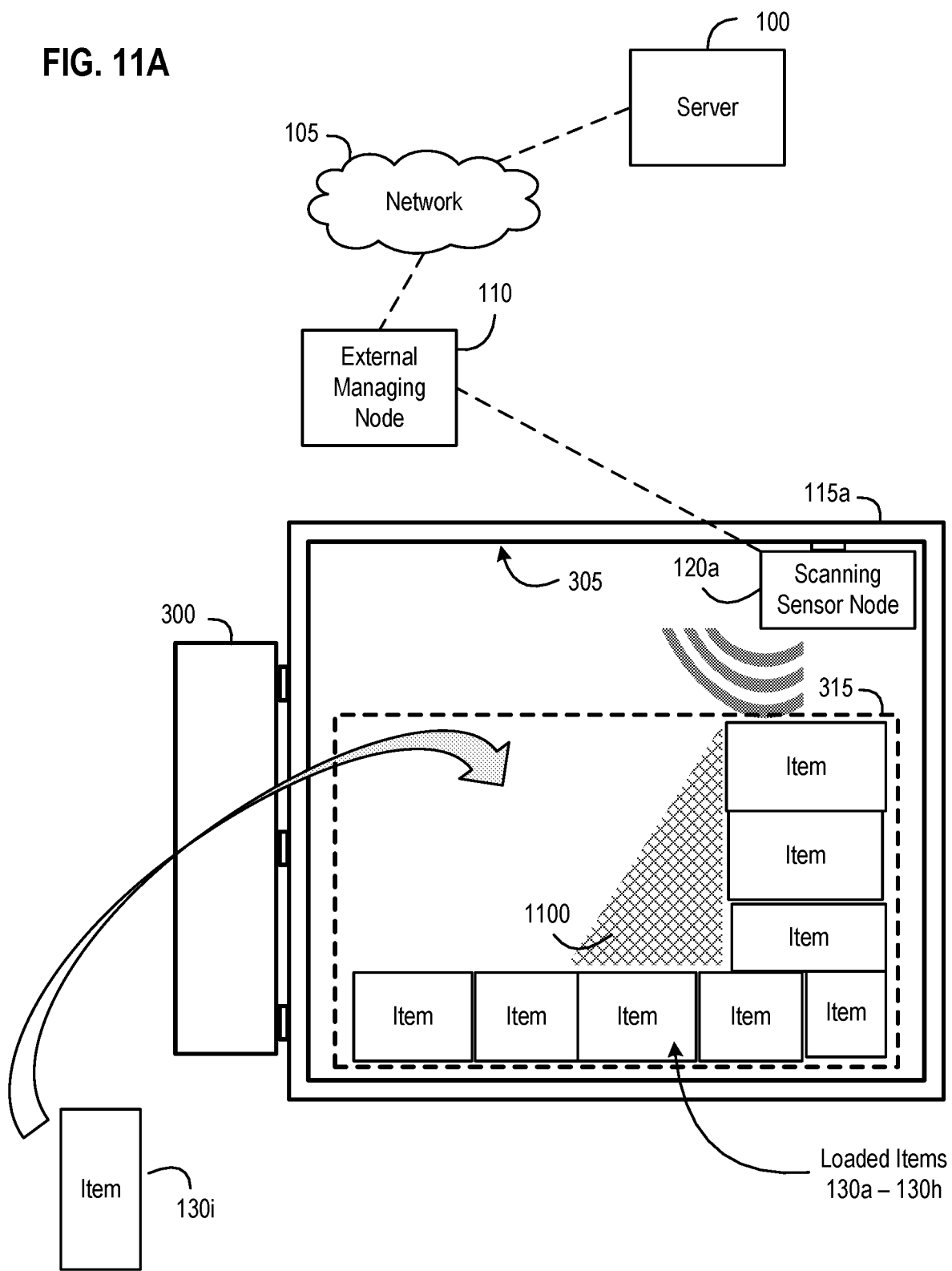
FIGS. 11A and 11B are diagrams illustrating another exemplary embodiment where an item is loaded within a container location that is not visible or only partially visible to an exemplary scanning sensor node apparatus in accordance with one or more embodiments of the invention.
Figure 11B:
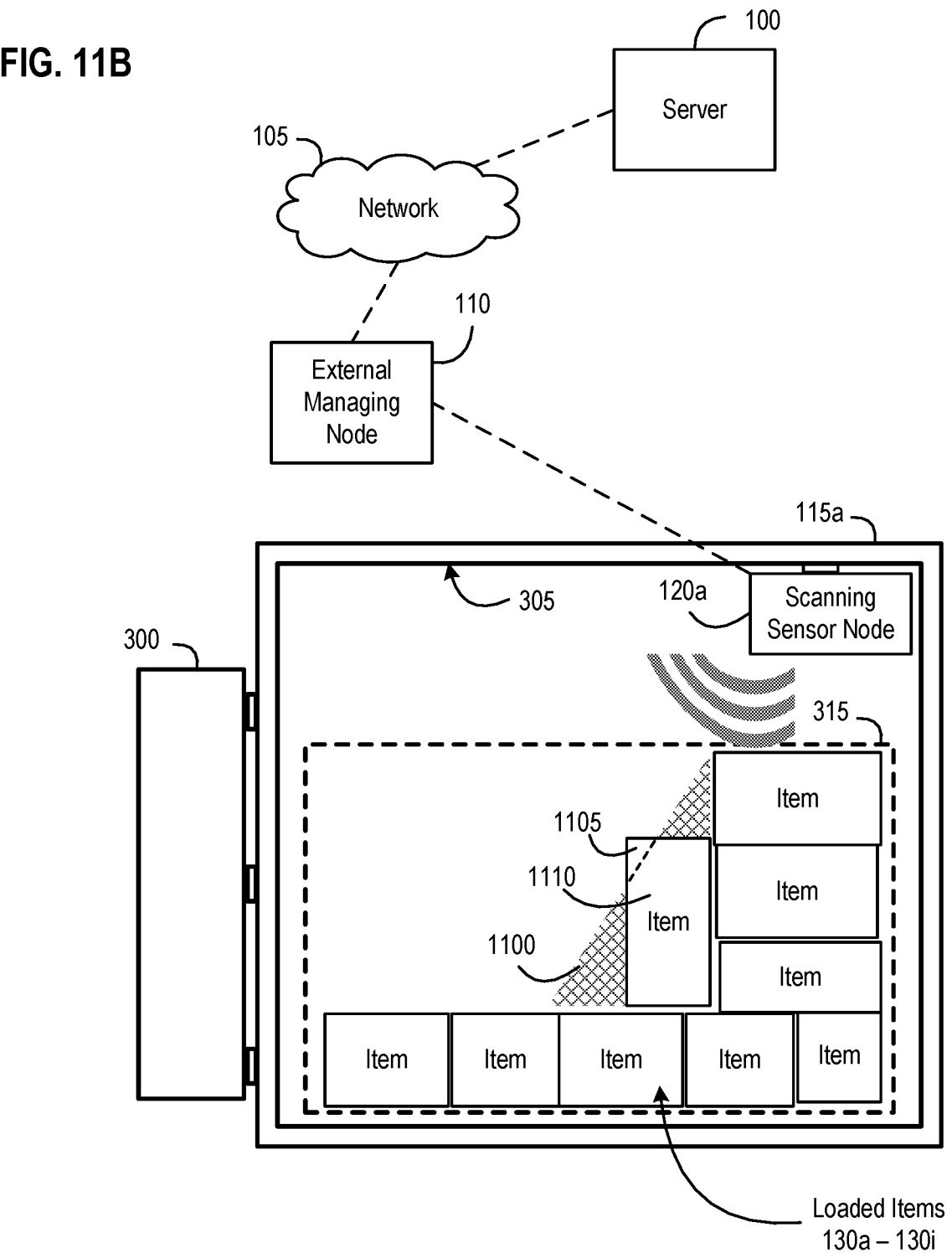

FIGS. 11A and 11B are diagrams illustrating another exemplary embodiment where an item is loaded within a container location that is at least partially not visible to an exemplary scanning sensor node apparatus in accordance with one or more embodiments of the invention. Referring now to FIG. 11A, the scanning sensor node 120a is mounted and configured within container 115a more to one side of the storage space 315 while still being above the storage space 315. As shown, scanning sensor node 120a remains above storage space 315. However, as some of the items are placed within storage space 315, the loaded items may shield a portion 1100 of the storage space 315 from view and exposure to scanning elements of the scanning sensor node 120. For example, a wall of items may be created within the storage space 315. This may occur during loading of the container 115a to, for example, accommodate items that are stackable (such as those making up the created wall of stacked items) and for other items to be loaded that are not easily stackable (such as bags that may not retain their shape, irregularly shaped items, and the like). As such, the wall of items may create portion 1100 as part of storage space 315 that is no longer visible to depth sensing scanner elements of scanning sensor node 120a. Thus, when item 130i is loaded into portion 1100, the item may be entirely invisible to depth sensor or, as shown in FIG. 11B, item 130i is partially not visible to the depth sensor on scanning sensor node 120a. As such, one part 1105 of item 130i may be visible to depth sensing scanner 220 of scanning sensor node 120a while a second part 1110 of item 130i may not be visible as it now occupies portion 1100. And similar to the example shown in FIG. 10B, the exemplary scanning sensor node 120a of FIG. 11B may dynamically transforming the generated scan data after item 130i is loaded into space 315 because the item 130i is at least partially not visible to the depth sensor scanning elements 220 of scanning sensor node 120a. And similarly, the transformed scan data may be refined based at least upon material dimension data associated with the item 130i so that the transformed scan data (also referred to as refined scan data) more accurately accounts for the volume of item 130i loaded into space 130 even if not visible or just partially visible to the depth sensor scanning elements 220 of scanning sensor node 120a.

Figure 12:
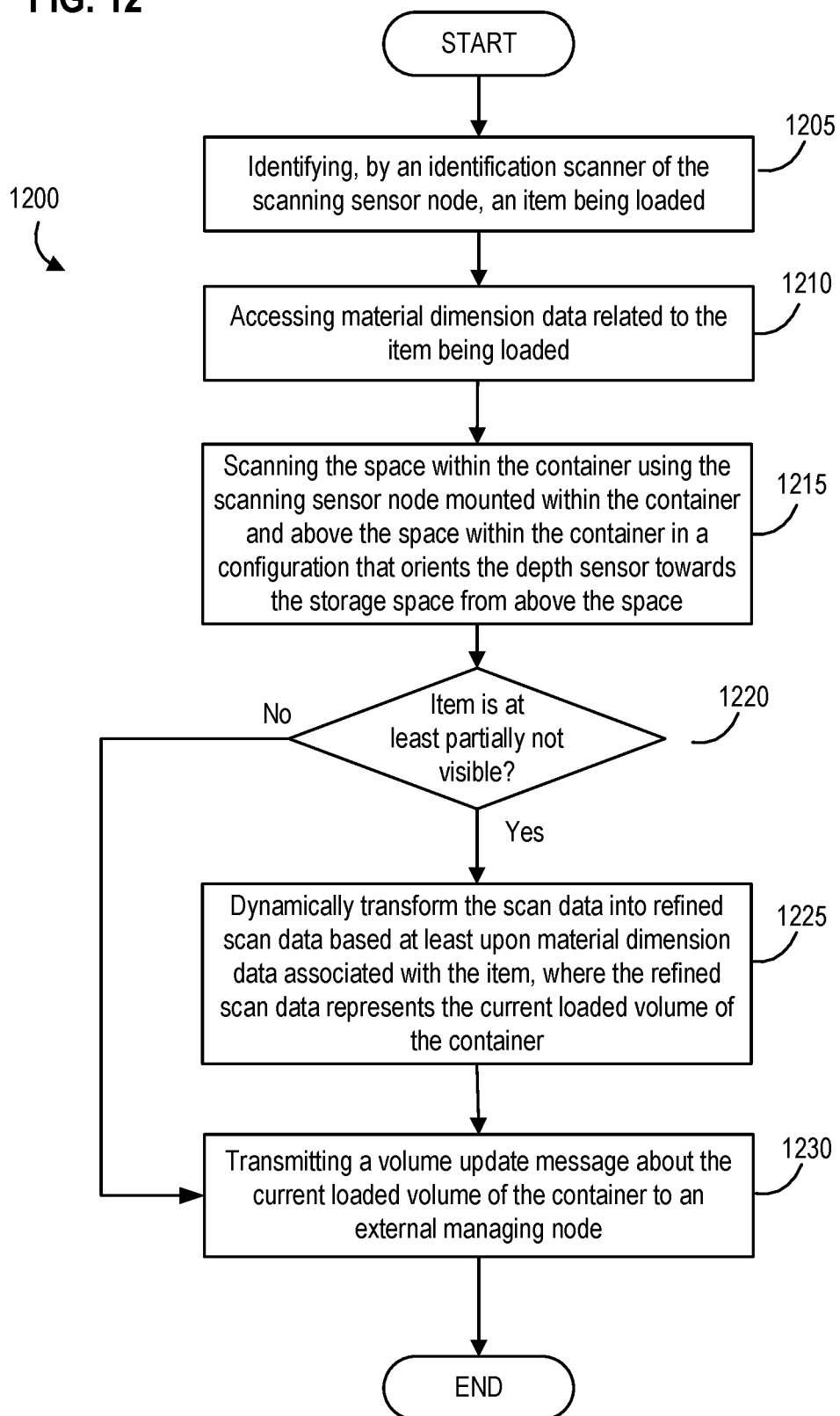
FIG. 12 is a flow diagram illustrating an exemplary method for dynamically transforming scan data representing a loaded volume of a container in accordance with an embodiment of the invention.

FIG. 12 is a flow diagram illustrating an exemplary method for dynamically transforming scan data representing a loaded volume of a container in accordance with an embodiment of the invention. In more detail, this exemplary method may be implemented with an exemplary scanning sensor node (such as node 120a) having at least a memory, a depth sensor, an identification scanner, and a communications interface to an external managing node.

Referring now to FIG. 12, method 1200 begins at step 1205 with the scanning sensor node using the identification sensor to identify an item being loaded into a storage space within the container. For example, scanning sensor node 120a shown in FIG. 10A may use scanner 220 to conduct an identification scan to identify item 130i as the item is being loaded into storage space 315 of container 115a.

In a further embodiment, step 1205 may identify the item loaded by having the identification scanner receive a signal representing identification information associated with the item, and then identifying the item based upon the identification information received by the identification scanner. For example, the signal may be a reflected signal applied to a barcode label on the item where the reflected signal includes barcode information that identifies the item. In another example, the signal may be a signal broadcast by a wireless identification element, such as an RFID tag, an NFC device, another Bluetooth® device, a ZigBee device, or another wireless network data communications device operating under a similar communications format as the scanning element. As such, an embodiment of the identification scanner may identify the item by receiving a signal broadcast from a device (such as the above described wireless identification element) associated with the item to be shipped, where the signal includes data sufficient to identify the item to be shipped (e.g., header information in the broadcast signal that identifies the item associated with the wireless identification element, and the like).

After step 1205, method 1200 proceeds to step 1210 where the scanning sensor node accesses material dimension data related to the identified item. For example, the material dimension data may be maintained as a type of container data 275 within memory 215 on scanning sensor node 120*a*. For example, the material dimension data may be information (such as default or standard dimension data associated with the item or packaging used for the item or a group of items packaged together) and may be maintained by server 100 and/or external managing node 110, and further provided to scanning sensor node to be kept in its memory. Further still, an example of material dimension data may be generated by a previous logistics scan performed by other shipment processing systems (such as laser scanning dimensioning type of systems used in a shipment facility while processing an item being shipped).

In still another embodiment, the material dimension data may be information received from the external managing node. In more detail, an embodiment of method 1200 may have the communications interface of the scanning sensor node transmitting a request to the external managing node, where the request identifies the item and asks for the external managing node to reply with the material dimension data for the identified item (which may originate with a server in communication with the external managing node). The communication interface may then receive the material dimension data from the external managing node, and the scanning sensor node then may store the material dimension data for the identified item into the memory of the scanning sensor node so that the material dimension data may be accessible for use by the node during operations.

At step 1215, method 1200 proceeds with the depth sensor on the scanning sensor node scanning the storage space within the container to generate the scan data after identifying the item. In order to accomplish such scanning, the scanning sensor node is mounted within the container and above the space within the container in a configuration that orients the depth sensor towards the storage space from above the storage space. As noted above, the depth sensor may be implemented with one or more elements that are collectively used to conduct a scan or mapping of the storage space from above the space.

At step 1220, method 1200 determines if the item loaded into the storage space is at least partially not visible to the depth sensor based upon the generated scan data. For example, the generated scan data may not show any increase in the loaded volume after the item has been loaded indicating the item loaded is not visible to the depth sensor. Or the generated scan data may indicate, as shown in FIGS. 10B and 11B, that a portion of the loaded item is not visible.

In a more detailed embodiment, the determination in step 1220 may include comparing (a) the scan data generated after the item is loaded into the storage space to (b) prior scan data representing a previously loaded volume of the container before the item is loaded into the storage space. As such, the comparison indicates what, if any, incremental volume has been detected as occupied within the storage space as a result of loading the item. Accordingly, step 1220 may determine the item is at least partially not visible to the depth sensor when the difference between (a) and (b) represents an incremental increase to a previously determined loaded volume of the container and the incremental increase is less than a threshold amount, such as threshold amount that depends on parameter for an expected volume of the item loaded. Such an expected volume parameter of the item may be, for example, related to the material dimension data associated with the item. Thus, an example may have step 1220 determining the loaded item 130*i* being at least partially not visible because a comparison of the current scan data to a previously loaded volume of the container may indicate an incremental increase in volume that is smaller than a set amount or smaller than a set percentage of the volume of item 130*i* per the material dimension data for item 130*i*.

Thus, if the item loaded into the storage space is at least partially not visible to the depth sensor based upon the generated scan data, step 1220 of method 1200 proceeds to step 1225 because the generated scan data will not accurately reflect the current loaded volume of the container. However, if not, then the generated scan data indicates the item loaded is sufficient visible to the depth sensor and the generated scan data may be reasonably relied upon to indicate the loading status of the storage space within the container and step 1220 may proceed to step 1230.

At step 1225, method 1200 proceeds with the scanning sensor node dynamically transforming the scan data into refined scan data because the item is at least partially not visible to the depth sensor. The transformation of the scan data into the refined scan data is based at least upon material dimension data associated with the item. In more detail, the generated scan data may only indicate a small incremental increase in volume when the expected volume of the item was actually added. Thus, the scan data is refined to more accurately indicate the current fullness of the container being loaded.

Method 1200 may, in some embodiments, continue to step 1230 where the scanning sensor node's communication interface may transmit a volume update message to the external managing node. The volume update message may include the refined scan data representing the current loaded volume of the container. In a further embodiment, the external managing node may then inform a server, such as server 100, about the updated and current volume of the container being loaded so that the server may perform as a backend manager and may be advantageously kept abreast of the loading operation.

Those skilled in the art will appreciate that method 1200 as disclosed and explained above in various embodiments may be implemented with an apparatus, such as exemplary scanning sensor node 120*a* illustrated in FIGS. 1, 2, 3A-3E, 10A, 10B, 11A, and 11B, running an embodiment of scanning program code 260. Such a scanning sensor apparatus disposed within a container may dynamically transform scan data into refined scan data that more accurately represents a loaded volume of a container as described above. Such code may be stored on a non-transitory computer-readable medium such as memory storage 215 on scanning sensor node 120*a*. Thus, when executing code 260, the processing unit 210 of scanning sensor node 120*a* may be operative to perform operations or steps from the exemplary methods disclosed above, including method 1200 and variations of that method.

Furthermore, another embodiment may include a system that leverages such a scanning sensor apparatus as programmed and operating as described above with respect to method 1200 and variations of that method. Such a system level embodiment that dynamically transforms scan data representing a loaded volume of a container as the container is loaded comprises a scanning sensor apparatus (such as exemplary scanning sensor node 120a) and an external managing node (such as exemplary external managing node 110). The scanning sensor apparatus is disposed within the container, and further comprises a housing (such as housing 200), a processing unit (such as processing unit 210), a memory (such as memory 215), a depth sensor (such as scanner 220), an identification scanner (e.g., an additional sensor 230 implemented as a barcode scanner, an RFID reader, an NFC interface, a Bluetooth® radio, or other wireless network data communications device, and the like that may operate to read or receive identification information related to an identification element), and a wireless communication interface (such as long range wireless communication interface 240 and/or short/close range wireless communication interface 245).

In more detail, the housing of the system's scanning sensor apparatus is configured to mount to an interior surface within the container in a position above a storage space within the container. For example, the interior surface may be a wall, a ceiling, or the surface of structure held or suspended within the container and above the storage space. At least the processing unit and memory of the system's scanning sensor apparatus are disposed within the housing. The memory is operatively coupled to the processing unit and maintains at least a scanning program code section (such as an embodiment of scanning program code 260 as described above with respect to FIG. 12) for execution by the processing unit. The memory also maintains material dimension data (as described above with FIG. 12) related to an item being loaded into the storage space. The depth sensor may have one or more scanning elements and is operatively coupled to the processing unit. The depth sensor is disposed and oriented towards the storage space within the container and from above the storage space. The identification scanner is also operatively coupled to the processing unit is operative to conduct an identification scan as part of identifying the item being loaded. The wireless communication interface is disposed within the housing and is also operatively coupled to the processing unit.

The external managing node in the system is disposed outside the container, but other embodiments may have the external managing node being a mobile type of node capable of being inside or outside the container at different times. The system's external managing node is in operative communication with the scanning sensor apparatus via the wireless communication interface.

The processing unit of the system's scanning sensor apparatus, when executing the scanning program code section, is modified to operate as a specially adapted and configured computing-based apparatus that performs unconventional steps to dynamically transform scan data representing a loaded volume of a container as the container is loaded. In more detail, the processing unit, when executing the scanning program code section, is operative to cause or otherwise instruct the identification scanner to conduct an identification scan and gather information that identifies the item being loaded into the storage space within the container; cause the depth sensor to scan or map the storage space within the container from above the storage space and generate the scan data representing the loaded volume of the container; store the generated scan data in the memory; determine if the item loaded into the storage space is at least partially not visible to the depth sensor based upon the generated scan data; dynamically transform the scan data into refined scan data if the processing unit determines the item is at least partially not visible to the depth sensor, where the scan data is transformed into the refined scan data based at least upon the material dimension data associated with the item; and cause the wireless communication interface to transmit a volume update message to the external managing node. Such a volume update message reflects the current loaded volume of the container as indicated by the refined scan data.

The system's external managing node receives the volume update message from the wireless communication interface of the scanning sensor apparatus and stores the refined scan data. In a further embodiment, the system may also include a server in direct communication with the external managing node but incapable of direct communication with the system's scanning sensor apparatus. The external managing node may also be operative to transmit a container status update message to the server, where the container status update message informs the server at least about the current loaded volume of the container as reflected by the refined scan data.

The system's external managing node may also operate, as part of the system, to provide the material dimension data to the scanning sensor apparatus through the wireless communication interface. As such, the processing unit of the scanning sensor apparatus may then store the received material dimension data in the memory of the scanning sensor apparatus for use during system operations of the apparatus. For example, this may be part of a pre-loading operation where the scanning sensor apparatus is provided material dimension data as a proactive measure prior to the onset of loading operations.

However, in yet another embodiment, the provision of material dimension data may occur more dynamically during loading operations. For example, once an item being loaded has been identified by the identification scanner on the scanning sensor apparatus, the wireless communication interface of the scanning sensor apparatus may transmit a request to the external managing node for the material dimension data associated with the identified item. The system's external managing node may receive the request and transmit a response to the scanning sensor apparatus, where the response includes the requested material dimension data. This, for example, may be done incrementally and dynamically as each of the items to be shipped within the container is loaded into the container.

FURTHER PARTICULAR EMBODIMENTS

What follows below is a listing of exemplary sets of particular embodiments focusing on one or more aspects of the different embodiments described above. Each of the different sets of particular embodiments respectively effect improvements to logistics-related technology that employs an exemplary scanning sensor node as part of enhanced loading operations that are electronically monitored and managed via sensor-based operations. As such, within each further embodiment heading are numbered aspects describing a specific technological application of one or more scanning sensor nodes that improve or otherwise enhance these technical fields, as explained and supported by the disclosure above. Each numbered aspect appearing below the different headings may make reference to other numbered aspects that appear below that particular heading.

Further Embodiment 1—Improved Method, Computer-Readable Media, and Apparatus for Efficiently Quantifying Space within a Container 1. An improved method for efficiently quantifying space within a container using a scanning sensor node disposed within the container and exposed to scan the space within the container from above the space, the method comprising: detecting an initiating condition from within the container using an activation sensor on the scanning sensor node, the initiating condition reflecting at least an anticipated change within the container; in response to detecting the initiating condition using the activation sensor, capturing a snapshot scan of the space within the container from above the space and within the container using the scanning sensor node; and storing the snapshot scan within a memory of the scanning sensor node.

2. The method of embodiment 1, wherein step of capturing the snapshot scan further comprises capturing the snapshot scan using a depth sensor on the scanning sensor node, wherein the snapshot scan of the space indicates an approximate available volume left to be filled within a storage portion of the container.

3. The method of embodiment 1, wherein the anticipated change within the container further comprises at least one from the group consisting of an opening of the container, a movement of contents maintained within the container, ceased movement within the container, a loading operation related to the container, an unloading operation related to the container, and a closing of the container.

4. The method of embodiment 1, wherein the step of detecting the initiating condition from within the container using the activation sensor further comprises detecting movement within the container using a motion sensor as the activation sensor.

5. The method of embodiment 1, wherein the step of detecting the initiating condition from within the container using the activation sensor further comprises detecting an environmental change related to the container as the initiating condition using at least one environmental sensor as the activation sensor.

6. The method of embodiment 5, wherein detecting the environmental change further comprises detecting a threshold level of at least one from the group comprising light within the container, temperature within the container, humidity within the container, concussive force related to the container, atmospheric chemical composition change within the container, auditory level change related to the container, barometric pressure within the container, and smoke particle concentration within the container.

7. The method of embodiment 1 further comprising periodically capturing, using the scanning sensor node, one or more additional snapshot scans of the space within the container from above the space and within the container.

8. The method of embodiment 7, wherein the step of periodically capturing further comprises periodically capturing, using the scanning sensor node, the one or more additional snapshot scans until the scanning sensor node detects a terminating condition from within the container using the activation sensor.

9. The method of embodiment 8, wherein the terminating condition comprises a lack of movement detected within the container over a defined monitoring period.

10. The method of embodiment 8 further comprising the steps of: detecting a second initiating condition from within the container using the activation sensor on the scanning sensor node, the second initiating condition reflecting at least a further anticipated change within the container after detecting the terminating condition; and periodically capturing, using the scanning sensor node, further additional snapshot scans of the space within the container until the scanning sensor node detects a second terminating condition from within the container using the activation sensor.

11. The method of embodiment 1 further comprising generating, by the scanning sensor node, a notification when the snapshot scan reflects a desired load status of the container.

12. The method of embodiment 8 further comprising generating, by the scanning sensor node, a notification when a current of the one or more additional snapshot scans reflects a desired load status of the container.

13. The method of embodiment 10 further comprising generating, by the scanning sensor node, a notification when a current of the further additional snapshot scans reflects a desired load status of the container.

14. A non-transitory computer-readable medium containing instructions which when executed on a processor of a scanning sensor node performs an improved method for efficiently quantifying space within a container using the scanning sensor node disposed within the container and exposed to scan the space within the container from above the space, the method comprising: detecting an initiating condition from within the container using an activation sensor on the scanning sensor node, the initiating condition reflecting at least an anticipated change within the container; in response to detecting the initiating condition using the activation sensor, capturing a snapshot scan of the space within the container from above the space and within the container using the scanning sensor node; and storing the snapshot scan within a memory of the scanning sensor node.

15. The non-transitory computer-readable medium of embodiment 14, wherein step of capturing the snapshot scan further comprises capturing the snapshot scan using a depth sensor on the scanning sensor node, wherein the snapshot scan of the space indicates an approximate available volume left to be filled within a storage portion of the container.

16. The non-transitory computer-readable medium of embodiment 14, wherein the anticipated change within the container further comprises at least one from the group consisting of an opening of the container, a movement of contents maintained within the container, ceased movement within the container, a loading operation related to the container, an unloading operation related to the container, and a closing of the container.

17. The non-transitory computer-readable medium of embodiment 14, wherein the step of detecting the initiating condition from within the container using the activation sensor further comprises detecting movement within the container using a motion sensor as the activation sensor.

18. The non-transitory computer-readable medium of embodiment 14, wherein the step of detecting the initiating condition from within the container using the activation sensor further comprises detecting an environmental change within the container as the initiating condition using at least one environmental sensor as the activation sensor.

19. The non-transitory computer-readable medium of embodiment 18, wherein detecting the environmental change further comprises detecting a threshold level of at least one from the group comprising light within the container, temperature within the container, humidity within the container, concussive force related to the container, atmospheric chemical composition change within the container, auditory level change related to the container, barometric pressure within the container, and smoke particle concentration within the container.

20. The non-transitory computer-readable medium of embodiment 14, further comprising periodically capturing, using the scanning sensor node, one or more additional snapshot scans of the space within the container from above the space and within the container.

21. The non-transitory computer-readable medium of embodiment 20, wherein the step of periodically capturing further comprises periodically capturing, using the scanning sensor node, the one or more additional snapshot scans until the scanning sensor node detects a terminating condition from within the container using the activation sensor.

22. The method of embodiment 21, wherein the terminating condition comprises a detected lack of movement within the container over a defined monitoring period.

23. The non-transitory computer-readable medium of embodiment 21 further comprising the steps of: detecting a second initiating condition from within the container using the activation sensor on the scanning sensor node, the second initiating condition reflecting at least a further anticipated change within the container after detecting the terminating condition; periodically capturing, using the scanning sensor node, further additional snapshot scans of the space within the container until the scanning sensor node detects a second terminating condition from within the container using the activation sensor.

24. The non-transitory computer-readable medium of embodiment 14 further comprising generating, by the scanning sensor node, a notification when the snapshot scan reflects a desired load status of the container.

25. The non-transitory computer-readable medium of embodiment 21 further comprising generating, by the scanning sensor node, a notification when a current of the one or more additional snapshot scans reflects a desired load status of the container.

26. The non-transitory computer-readable medium of embodiment 23 further comprising generating, by the scanning sensor node, a notification when a current of the further additional snapshot scans reflects a desired load status of the container.

27. A scanning sensor apparatus disposed within a container to efficiently quantify space within the container, the apparatus comprising: a housing configured to mount within the container above the space within the container; a processing unit disposed within the housing; a memory disposed within the housing, the memory being operatively coupled to the processing unit and maintaining at least a scanning program code section for execution by the processing unit; a depth sensor operatively coupled to the processing unit, wherein the depth sensor is exposed to the space within the container from above the space, wherein the depth sensor operates to capture a snapshot scan relative to the space within the container from above the space; an activation sensor operatively coupled to the processing unit, wherein the activation sensor monitors an environmental condition of the space within the container; and wherein the processing unit, when executing the scanning program code section, is operative to receive an initiating condition signal from the activation sensor, wherein the initiating condition signal reflects at least an anticipated change to the monitored environmental condition of the space within the container, in response to receiving the initiating condition signal, causing the depth sensor to capture the snapshot scan of the space within the container from above the space and within the container; and access the memory to store the captured snapshot scan data within the memory.

28. The scanning sensor apparatus of embodiment 27, wherein the housing is further configured to removably detach from the container after being mounted within the container.

29. The scanning sensor apparatus of embodiment 27, wherein the snapshot scan data indicates an approximate available volume left to be filled of the space within a storage portion of the container captured by the depth sensor.

30. The scanning sensor apparatus of embodiment 27, wherein the anticipated change within the container further comprises at least one from the group consisting of an opening of the container, a movement of contents maintained within the container, ceased movement within the container, a loading operation related to the container, an unloading operation related to the container, and a closing of the container.

31. The scanning sensor apparatus of embodiment 27, wherein the activation sensor comprises at least one from the group comprising a motion sensor that detects movement within the container as the environmental condition, a light sensor that detects a threshold level of light within the container as the environmental condition, a temperature sensor that detects a threshold level of temperature within the container as the environmental condition, a humidity sensor that detects a threshold level of humidity within the container as the environmental condition, a kinetic force sensor that detects a concussive force related to the container as the environmental condition, a chemical sensor that detects an atmospheric chemical composition change within the container as the environmental change, a microphone that detects an auditory level change related to the container as the environmental change, a pressure sensor that detects a barometric pressure within the container as the environmental change, and a smoke sensor that detects a smoke particle concentration within the container as the environmental change.

32. The scanning sensor apparatus of embodiment 27, wherein the processing unit is further operative to cause the depth sensor to periodically capture one or more additional snapshot scans of the space within the container from above the space and within the container.

33. The scanning sensor apparatus of embodiment 32, wherein the processing unit is further operative to cause the depth sensor to periodically capture the one or more additional snapshot scans until receiving a terminating condition signal from the activation sensor.

34. The scanning sensor apparatus of embodiment 33, wherein the processing unit is further operative to access the memory to store in the memory at least a most recent of the one or more additional snapshot scans.

35. The scanning sensor apparatus of embodiment 33, wherein the processing unit is further operative to: receive a second initiating condition from the activation sensor after receiving the terminating condition signal from the activation sensor, the second initiating condition reflecting at least a further anticipated change to the monitored environmental condition of the space within the container; in response to receiving the second initiating condition signal, cause the depth sensor to periodically capture further additional snapshot scans of the space within the container; cause the depth sensor to cease capturing the further additional snapshot scans of the space within the container upon receiving a second terminating condition signal from the activation sensor; and access the memory to store in the memory at least a most recent of the one or more additional snapshot scans.

36. The scanning sensor apparatus of embodiment 27 further comprising a wireless communication interface disposed within the housing and operatively coupled to the processing unit; and wherein the processing unit is further operative to generate a notification message when the snapshot scan reflects a desired load status of the container and cause the wireless communication interface to transmit the notification message.

37. The scanning sensor apparatus of embodiment 36, wherein the wireless communication interface is operative to transmit the notification message to at least one of a server system or an operator node device.

38. The scanning sensor apparatus of embodiment 37, wherein the operator node device comprises one from a group consisting of a smartphone, a tablet computing device, a laptop computer, and a terminal computing device.

39. The scanning sensor apparatus of embodiment 32 further comprising a wireless communication interface disposed within the housing and operatively coupled to the processing unit; and wherein the processing unit is further operative to generate a notification message when a current of the one or more additional snapshot scans reflects a desired load status of the container.

40. The scanning sensor apparatus of embodiment 35 further comprising a wireless communication interface disposed within the housing and operatively coupled to the processing unit; and wherein the processing unit is further operative to generate a notification message when a current of the further additional snapshot scans reflects a desired load status of the container, and cause the wireless communication interface to transmit the notification message.

Further Embodiment 2—Methods,
Computer-Readable Media, Apparatus, and System
for Managing Load Operations 1. An improved method for managing a load operation related to a container using a removable scanning sensor node, the method comprising: identifying, by the removable scanning sensor node, an item to be shipped within the container; mapping, by the removable scanning sensor node, the space within the container after the item has been placed within the container, wherein the removable scanning sensor node being temporarily disposed within the container and oriented to map the space within the container from above the space; determining, by the removable scanning sensor node, an occupied capacity within the container based upon mapping data associated with the mapped space; and transmitting, by the removable scanning sensor node, a notification to a managing node in communication with the removable scanning sensor node, wherein the notification is related to the occupied capacity within the container.

2. The method of embodiment 1, wherein the step of identifying the item further comprises identifying, by the removable scanning sensor node, the item when the item is loaded and placed within the container.

3. The method of embodiment 1, wherein the step of identifying the item further comprises: conducting, by the removable scanning sensor node, an identification scan of an item to be shipped within the container; and identifying the item to be shipped based upon scan data associated with the identification scan.

4. The method of embodiment 3, wherein conducting the identification scan further comprises detecting a wireless identification element related to the item.

5. The method of embodiment 4, wherein the wireless identification element comprises a communications device that wirelessly broadcasts information associated with the item.

6. The method of embodiment 4, wherein the wireless identification element comprises one from the group comprising a radio, a cellular radio device, a wireless network device, a wireless data communications device operating under a lower power communication protocol and a wireless data communications device operating under a higher power communication protocol, an RFID device, an NFC device, a Bluetooth device, a ZigBee device, and a Wi-Fi device.

7. The method of embodiment 3, wherein conducting the identification scan further comprises detecting a barcode element related to the item.

8. The method of embodiment 1 further comprising the step of recording the determined occupied capacity into a memory of the removable scanning sensor node.

9. The method of embodiment 1 further comprising the steps of: identifying, by the removable scanning sensor node, a plurality of additional items to be shipped within the container; periodically mapping, by the removable scanning sensor node, the space within the container after one or more of the additional items have been placed within the container; and determining, by the removable scanning sensor node, an updated occupied capacity within the container based upon the mapped space after each of the periodic mapping steps.

10. The method of embodiment 9, wherein the periodically mapping step is performed by the removable scanning sensor node until a desired load status for the container is detected.

11. The method of embodiment 10 further comprising the steps of: tracking, by the removable scanning sensor node, a time taken to load the container until detecting the desired load status; and transmitting, by the removable scanning sensor node, a load time message to the managing node, wherein the load time message reflects the tracked time taken to load the container.

12. The method of embodiment 1, wherein the notification indicates a status of the container associated with the determined occupied capacity of the container.

13. The method of embodiment 1, wherein the transmitting step comprises: detecting if the determined occupied capacity meets a desired load status for the container; and transmitting, by the removable scanning sensor node, the notification to the managing node when the determined occupied capacity at least meets the desired load status for the container.

14. The method of embodiment 1, wherein the notification indicates a requested change to the load operation related to the container.

15. The method of embodiment 14, wherein the requested change comprises a request for additional personnel to be involved in loading the container.

16. The method of embodiment 1, wherein the notification indicates a summary of what has been loaded into the container associated with the determined occupied capacity of the container.

17. A non-transitory computer-readable medium containing instructions which when executed on a processor of a removable scanning sensor node performs an improved method for managing a load operation related to a container using the removable scanning sensor node, the method comprising: identifying, by the removable scanning sensor node, an item to be shipped within the container; mapping, by the removable scanning sensor node, the space within the container after the item has been placed within the container, wherein the removable scanning sensor node being temporarily disposed within the container and oriented to map the space within the container from above the space; determining, by the removable scanning sensor node, an occupied capacity within the container based upon mapping data associated with the mapped space; and transmitting, by the removable scanning sensor node, a notification to a managing node in communication with the removable scanning sensor node, wherein the notification is related to the occupied capacity within the container.

18. The non-transitory computer-readable medium of embodiment 17, wherein the step of identifying the item further comprises identifying, by the removable scanning sensor node, the item when the item is loaded and placed within the container.

19. The non-transitory computer-readable medium of embodiment 17, wherein the step of identifying the item further comprises: conducting, by the removable scanning sensor node, an identification scan of an item to be shipped within the container; and identifying the item to be shipped based upon scan data associated with the identification scan.

20. The non-transitory computer-readable medium of embodiment 19, wherein conducting the identification scan further comprises detecting a wireless identification element related to the item.

21. The non-transitory computer-readable medium of embodiment 20, wherein the wireless identification element comprises a communications device that wirelessly broadcasts information associated with the item.

22. The non-transitory computer-readable medium of embodiment 20, wherein the wireless identification element comprises one from the group comprising a radio, a cellular radio device, a wireless network device, a wireless data communications device operating under a lower power communication protocol and a wireless data communications device operating under a higher power communication protocol, an RFID device, an NFC device, a Bluetooth device, a ZigBee device, and a Wi-Fi device.

23. The non-transitory computer-readable medium of embodiment 19, wherein conducting the identification scan further comprises detecting a barcode element related to the item.

24. The non-transitory computer-readable medium of embodiment 17 further comprising the step of recording the determined occupied capacity into a memory of the removable scanning sensor node.

25. The non-transitory computer-readable medium of embodiment 17 further comprising the steps of: identifying, by the removable scanning sensor node, a plurality of additional items to be shipped within the container; periodically mapping, by the removable scanning sensor node, the space within the container after one or more of the additional items have been placed within the container; and determining, by the removable scanning sensor node, an updated occupied capacity within the container based upon the mapped space after each of the periodic mapping steps.

26. The non-transitory computer-readable medium of embodiment 25, wherein the periodically mapping step is performed by the removable scanning sensor node until a desired load status for the container is detected.

27. The non-transitory computer-readable medium of embodiment 26 further comprising the steps of: tracking, by the removable scanning sensor node, a time taken to load the container until detecting the desired load status; and transmitting, by the removable scanning sensor node, a load time message to the managing node, wherein the load time message reflects the tracked time taken to load the container.

28. The non-transitory computer-readable medium of embodiment 17, wherein the notification indicates a status of the container associated with the determined occupied capacity of the container.

29. The non-transitory computer-readable medium of embodiment 17, wherein the transmitting step comprises: detecting if the determined occupied capacity meets a desired load status for the container; and transmitting, by the removable scanning sensor node, the notification to the managing node when the determined occupied capacity at least meets the desired load status for the container.

30. The non-transitory computer-readable medium of embodiment 17, wherein the notification indicates a requested change to the load operation related to the container.

31. The non-transitory computer-readable medium of embodiment 30, wherein the requested change comprises a request for additional personnel to be involved in loading the container.

32. The non-transitory computer-readable medium of embodiment 17, wherein the notification indicates a summary of what has been loaded into the container associated with the determined occupied capacity of the container.

33. An improved scanning sensor apparatus for managing a load operation related to a container; the apparatus comprising: a housing configured to mount within the container in a position located above storage space within the container; a processing unit disposed within the housing; a memory disposed within the housing, the memory being operatively coupled to the processing unit and maintaining at least a load operation program code section and a scanning program code section for execution by the processing unit; a depth sensor operatively coupled to the processing unit, wherein the depth sensor is disposed and oriented to map the storage space within the container from above the storage space; an identification scanner operatively coupled to the processing unit, wherein the identification scanner is configured to identify an item to be shipped within the container; and a wireless communication interface disposed within the housing and operatively coupled to the processing unit; and wherein the processing unit, when executing the load operation program code section and the scanning program code section, is operative to receive an identification of the item to be shipped within the container from the identification scanner, cause the depth sensor to map the storage space within the container after the item has been placed within the container, receive mapping data generated by the depth sensor associated with the mapped storage space within the container, determine an occupied capacity within the container based upon the mapping data associated with the mapped storage space, and instruct the wireless communication interface to transmit a notification to a managing node in communication with the improved scanning sensor apparatus over the wireless communication interface, wherein the notification is related to the occupied capacity within the container.

34. The apparatus of embodiment 33, wherein the identification scanner identifies the item to be shipped by receiving a signal broadcast from a device associated with the item to be shipped, wherein the signal includes data sufficient to identify the item to be shipped.

35. The apparatus of embodiment 34, wherein the device broadcasting the signal to the identification scanner comprises a radio transmitter operative to generate and transmit the signal to be received by the identification scanner.

36. The apparatus of embodiment 34, wherein the device broadcasting the signal to the identification scanner comprises at least one from the group comprising a radio, a cellular radio device, a wireless network device, a wireless data communications device operating under a lower power communication protocol and a wireless data communications device operating under a higher power communication protocol, an RFID device, an NFC device, a Bluetooth device, a ZigBee device, and a Wi-Fi device.

37. The apparatus of embodiment 35, wherein the identification scanner comprises an RFID reader and the device broadcasting the signal comprises an RFID tag.

38. The apparatus of embodiment 35, wherein the identification scanner comprises a first Bluetooth device related to the apparatus and the device broadcasting the signal comprises a second Bluetooth device related to the item.

39. The apparatus of embodiment 33, wherein the identification scanner comprises a barcode reader configured to identify the item to be shipped by capturing information about the item to be shipped from an encoded label on an exterior surface of the item.

40. The apparatus of embodiment 33, wherein the processing unit is operative to receive the identification of the item as the item is being loaded and placed within the storage space of the container.

41. The apparatus of embodiment 33, wherein the processing unit is further operative to record the determined occupied capacity into the memory.

42. The apparatus of embodiment 33, wherein the identification scanner is further operative to identify a plurality of additional items to be shipped within the container; and wherein the processing unit is further operative to: cause the depth sensor to periodically map the storage space within the container from above the storage space after one or more of the additional items have been placed within the container, and determine an updated occupied capacity within the container based upon the mapped space after each of the periodic mapping.

43. The apparatus of embodiment 42, wherein the processing unit is further operative to cause the depth sensor to periodically map the storage space until a desired load status for the container is achieved, the desired load status being related to the updated occupied capacity within the container.

44. The apparatus of embodiment 43, wherein the processing unit is further operative to: determine a load time taken to load the container to the desired load status level based upon the mapping data associated with the mapped storage space over time; and instruct the wireless communication interface to transmit a load time message to the managing node, wherein the load time message reflects the load time taken to load the container to the desired load status level.

45. The apparatus of embodiment 33, wherein the notification indicates a status of the container associated with the determined occupied capacity of the container.

46. The apparatus of embodiment 33, wherein the processing unit is further operative to: detect if the determined occupied capacity meets a desired load status for the container; and instruct the wireless communication interface to transmit the notification to the managing node when the determined occupied capacity at least meets the desired load status for the container.

47. The apparatus of embodiment 33, wherein the notification indicates a requested change to the load operation related to the container.

48. The apparatus of embodiment 47, wherein the requested change comprises a request for additional personnel to be involved in loading the container.

49. The apparatus of embodiment 33, wherein the notification indicates a summary of what has been loaded into the container associated with the determined occupied capacity of the container.

50. An improved system for managing load operations related to a plurality of containers, the system comprising: a managing node device associated with at least one operator, the managing node device further comprising at least a wireless communication interface; and a display interface that generates information to be provided to the at least one operator; and a plurality of scanning sensor nodes, wherein each of the scanning sensor nodes are in operative wireless communication with the managing node device, wherein each of the scanning sensor nodes is disposed within a respective one of the containers above a storage space within the respective container; wherein each of the scanning sensor nodes mounted in the respective one of the containers is operative to identify one or more items as the items are loaded into the storage space within the respective one of the containers using an identification scanner on the scanning sensor node, map the storage space from above the storage space using a sensor on the scanning sensor node while the items are loaded into the storage space, determine an occupied capacity within the respective one of the containers based upon mapping data generated by the sensor related to the mapped storage space, and transmit a notification to the managing node device, wherein the notification is related to the occupied capacity within the respective one of the containers; and wherein the managing node device is operative to receive the notification over the wireless communication interface from each of the scanning sensor nodes, assess the notification received from each of the scanning sensor nodes relative to at least one loading characteristic, generate a loading change message related to a change in the load operations related to the containers, and provide the loading change message on the display interface.

51. The system of embodiment 50, wherein the identification scanner identifies the one or more items by receiving a signal from a device associated with each of the one or more items, wherein the signal includes data that identifies the respective one of the one or more items.

52. The system of embodiment 50, wherein the identification scanner comprises at least one of an RFID reader, a low energy Bluetooth device, and a barcode reader.

53. The system of embodiment 50, wherein each of the scanning sensor nodes mounted in the respective one of the containers is operative to map the storage space of the respective one of the containers while the items are loaded into the storage space until detecting a desired load status for the container based upon the mapping of the storage space.

54. The system of embodiment 53, wherein each of the scanning sensor nodes mounted in the respective one of the containers is further operative to: determine a load time taken to load the respective one of the containers to the desired load status level; and transmit a load time message to the managing node device, wherein the load time message reflects the load time taken to load the respective one of the containers to the desired load status level.

55. The system of embodiment 50 further comprising a server device in operative communication with the managing node device over the wireless communication interface of the managing node device.

56. The system of embodiment 55, wherein the managing node device is operative to provide the loading change message on the display interface by being further operative to: transmit a request to the server device for an authorization to provide the loading change message on the display interface; receive the authorization from the server device; and provide the loading change message on the display interface based on the received authorization.

57. The system of embodiment 55, wherein the notification further comprises information on the items loaded into at least one of the containers; and wherein the managing node device is further operative to generate a container content message related to the notification received from each of the scanning sensor node devices, and transmit the container content message to the server device.

58. The system of embodiment 50, wherein the change in load operations related to the containers comprises a workload adjustment in the load operations.

59. The system of embodiment 50, wherein the change in load operations related to the containers comprises an indication that loading is complete regarding at least one of the containers.

60. The system of embodiment 50, wherein the loading change message identifies which of the containers where assistance is needed to more efficiently load the one or more of the items associated with the identified container.

Further Embodiment 3—Methods, Computer-Readable Media, and Apparatus for Detecting an Operational Safety Condition within a Container 1. An improved method for detecting an operational safety condition within a container using a scanning sensor node deployed within the container and above a storage space defined within the container, the method comprising: sensing, by the scanning sensor node, if the container is in a closed state; monitoring, by the scanning sensor node, the storage space from above the storage space while the container is in the closed state; detecting, by the scanning sensor node, a movement within the container based upon the monitoring of the storage space while the container is in the closed state, the movement being indicative of the operational safety condition; and transmitting an alert to a managing node over a wireless communication interface of the scanning sensor node, the alert associated with the operational safety condition within the container.

2. The method of embodiment 1, wherein the sensing step further comprises receiving light on a sensor on the scanning sensor node, the light originating from outside the container and the received amount of the light below a threshold level being indicative of the closed state of the container.

3. The method of embodiment 1, wherein the sensing step further comprises detecting light on a light sensitive sensor disposed on the scanning sensor node, the light sensitive sensor being oriented towards an opening in the container and configured to detect the light as originating from outside the container, wherein the container is in the closed state when the light sensitive sensor detects the light from the opening at less than a threshold level.

4. The method of embodiment 1, wherein the sensing step further comprises: identifying a type of the container by the scanning sensor node; mapping a perceived footprint of the identified container by a scanner disposed on the scanning sensor node, the scanner being oriented within the container to at least map the storage space from above the storage space; and sensing the container is in the closed state by the scanning sensor node when the perceived footprint of the container mapped by the scanner exceeds a known footprint of the identified type of the container.

5. The method of embodiment 1, wherein the monitoring step further comprises using a scanner on the scanning sensor node to periodically map a change in the storage space of the container over time.

6. The method of embodiment 1, wherein the movement further comprises a changed location of one or more items loaded within the storage space while the container is in the closed state.

7. The method of embodiment 6, wherein the operational safety condition comprises a safety warning related to the changed position of the one or more items.

8. The method of embodiment 7, wherein the operational safety condition indicates that the container should be reopened prior to shipment.

9. The method of embodiment 1, wherein the movement indicates that a person is located within the storage space while the container is in the closed state.

10. The method of embodiment 9, wherein the operational safety condition comprises a safety warning not to ship the container.

11. The method of embodiment 10, wherein the operational safety condition indicates that the container should be reopened prior to shipment.

12. A non-transitory computer-readable medium containing instructions which when executed on a processor of a scanning sensor node performs an improved method for detecting an operational safety condition within a container using a scanning sensor node deployed within the container and above a storage space defined within the container, the method comprising: sensing, by the scanning sensor node, if the container is in a closed state; monitoring, by the scanning sensor node, the storage space from above the storage space while the container is in the closed state; detecting, by the scanning sensor node, a movement within the container based upon the monitoring of the storage space while the container is in the closed state, the movement being indicative of the operational safety condition; and transmitting an alert to a managing node over a wireless communication interface of the scanning sensor node, the alert associated with the operational safety condition within the container.

13. The non-transitory computer-readable medium of embodiment 12, wherein the sensing step further comprises receiving light on a sensor on the scanning sensor node, the light originating from outside the container and the received amount of the light below a threshold level being indicative of the closed state of the container.

14. The non-transitory computer-readable medium of embodiment 12, wherein the sensing step further comprises detecting light on a light sensitive sensor disposed on the scanning sensor node, the light sensitive sensor being oriented towards an opening in the container and configured to detect the light as originating from outside the container, wherein the container is in the closed state when the light sensitive sensor detects the light from the opening at less than a threshold level.

15. The non-transitory computer-readable medium of embodiment 12, wherein the sensing step further comprises: identifying a type of the container by the scanning sensor node; mapping a perceived footprint of the identified container by a scanner disposed on the scanning sensor node, the scanner being oriented within the container to at least map the storage space from above the storage space; and sensing the container is in the closed state by the scanning sensor node when the perceived footprint of the container mapped by the scanner exceeds a known footprint of the identified type of the container.

16. The non-transitory computer-readable medium of embodiment 12, wherein the monitoring step further comprises using a scanner on the scanning sensor node to periodically map a change in the storage space of the container over time.

17. The non-transitory computer-readable medium of embodiment 12, wherein the movement further comprises a changed location of one or more items loaded within the storage space while the container is in the closed state.

18. The non-transitory computer-readable medium of embodiment 17, wherein the operational safety condition comprises a safety warning related to the changed position of the one or more items.

19. The non-transitory computer-readable medium of embodiment 18, wherein the operational safety condition indicates that the container should be reopened prior to shipment.

20. The non-transitory computer-readable medium of embodiment 12, wherein the movement indicates that a person is located within the storage space while the container is in the closed state.

21. The non-transitory computer-readable medium of embodiment 20, wherein the operational safety condition comprises a safety warning not to ship the container.

22. The non-transitory computer-readable medium of embodiment 21, wherein the operational safety condition indicates that the container should be reopened prior to shipment.

23. A scanning sensor apparatus disposed above a storage space within a container that detects an operational safety condition within the container, the apparatus comprising: a housing configured to mount within the container and above the storage space within the container; a processing unit disposed within the housing; a memory disposed within the housing, the memory being operatively coupled to the processing unit and maintaining at least a safety condition program code section for execution by the processing unit; a scanner operatively coupled to the processing unit, wherein the scanner is exposed to the storage space within the container from above the storage space, wherein the scanner is configured to monitor the storage space from above the storage space; a sensor operatively coupled to the processing unit, wherein the sensor detects if the container is in a closed state; a wireless communication interface operatively coupled to the processing unit; and wherein the processing unit, when executing the safety condition program code section, is operative to receive an indication from the sensor on whether the container is in the closed state, cause the scanner to monitor the storage space while the container is in the closed state, receive information from the scanner related to monitoring of the storage space while the container is in the closed state, detect a movement within the container based upon the received information from the scanner, the movement being indicative of the operational safety condition, and provide the wireless communication interface with an alert to be transmitted to a managing node, the alert being associated with the operational safety condition within the container.

24. The apparatus of embodiment 23, wherein the scanner further comprises a plurality of scanning elements configured to monitor the storage space from above the storage space.

25. The apparatus of embodiment 23, wherein the sensor further comprises a light sensitive sensor oriented towards an opening in the container and configured to detect the light as originating from outside the container, wherein the container is in the closed state when the light sensitive sensor detects the light from the opening at less than a threshold level.

26. The apparatus of embodiment 25, wherein processing unit is operative to receive a signal from the sensor as the indication whether the container is in the closed state.

27. The apparatus of embodiment 25, wherein the processing unit is operative to receive a signal from the sensor indicating an amount of light detected; and assess the indicated amount of light detected relative to the threshold level to determine whether the container is in the closed state.

28. The apparatus of embodiment 23, wherein the processing unit is further operative to: identify a type of the container; cause the scanner to map a perceived footprint of the identified container; receive mapping data from the scanner, wherein the mapping data represents the perceived footprint; and determine the container is in the closed state when the perceived footprint of the container mapped by the scanner exceeds a known footprint associated with the identified type of the container.

29. The apparatus of embodiment 23, wherein the processing unit is operative to cause the scanner to monitor the storage space the monitoring step by being further operative to cause the scanner to periodically map a change in the storage space of the container over time.

30. The apparatus of embodiment 23, wherein the movement further comprises a changed location of one or more items loaded within the storage space while the container is in the closed state.

31. The apparatus of embodiment 30, wherein the operational safety condition comprises a safety warning related to the changed position of the one or more items.

32. The apparatus of embodiment 31, wherein the operational safety condition indicates that the container should be reopened prior to shipment.

33. The apparatus of embodiment 23, wherein the movement indicates that a person is located within the storage space while the container is in the closed state.

34. The apparatus of embodiment 33, wherein the operational safety condition comprises a safety warning not to ship the container.

35. The apparatus of embodiment 34, wherein the operational safety condition indicates that the container should be reopened prior to shipment.

Further Embodiment 5—Methods, Apparatus, and Systems for Dynamically Transforming Scan Data Using a Scanning Sensor Node 1. A method for dynamically transforming scan data representing a loaded volume of a container using a scanning sensor node having at least a memory, a depth sensor, an identification scanner, and a communications interface to an external managing node, the method comprising: identifying, by the identification scanner of the scanning sensor node, an item being loaded into a storage space within the container; scanning, by the depth sensor on the scanning sensor node, the storage space within the container to generate the scan data after identifying the item, wherein the scanning sensor node is mounted within the container and above the space within the container in a configuration that orients the depth sensor towards the storage space from above the storage space; determining, by the scanning sensor node, if the item loaded into the storage space is at least partially not visible to the depth sensor based upon the generated scan data; and dynamically transforming the scan data into refined scan data if the item is at least partially not visible to the depth sensor, wherein the scan data is transformed into the refined scan data based at least upon material dimension data associated with the item.

2. The method of embodiment 1, wherein the determining step further comprises: comparing (a) the scan data generated after the item is loaded into the storage space to (b) prior scan data representing a previously loaded volume of the container before the item is loaded into the storage space; and determining that the item is at least partially not visible to the depth sensor when the difference between (a) and (b) represents an incremental increase to a previously determined loaded volume of the container and the incremental increase is less than a threshold amount.

3. The method of embodiment 2, wherein the threshold amount depends upon an expected volume parameter associated with the item.

4. The method of embodiment 3, wherein the expected volume parameter of the item is related to the material dimension data associated with the item.

5. The method of embodiment 4, wherein the material dimension data comprises dimension information from a previous logistics scan of the item.

6. The method of embodiment 4, wherein the material dimension data comprises default dimension information for the item.

7. The method of embodiment 4, wherein the material dimension data comprises information received from the external managing node.

8. The method of embodiment 7, wherein the identifying step further comprises: receiving, by the identification scanner, a signal representing identification information associated with the item; and identifying the item based upon the identification information received by the identification scanner.

9. The method of embodiment 8 further comprising the steps of: transmitting, by the communications interface of the scanning sensor node, a request to the external managing node, the request identifying the item and requesting the material dimension data for the identified item; receiving, by the communication interface of the scanning sensor node, the material dimension data from the external managing node; and storing the material dimension data for the identified item into the memory.

10. A scanning sensor apparatus disposed within a container that dynamically transforms scan data representing a loaded volume of a container, the apparatus comprising: a housing configured to mount to an interior surface within the container in a position above a storage space within the container; a processing unit disposed within the housing; a memory disposed within the housing, the memory being operatively coupled to the processing unit and maintaining at least a scanning program code section for execution by the processing unit and material dimension data related to an item being loaded into the storage space; a depth sensor operatively coupled to the processing unit, wherein the depth sensor is disposed and oriented towards the storage space within the container and from above the storage space; an identification scanner operatively coupled to the processing unit, wherein the identification scanner is operative to conduct an identification scan; a wireless communication interface disposed within the housing and operatively coupled to the processing unit; and wherein the processing unit, when executing the scanning program code section, is operative to cause the identification scanner to conduct the identification scan and gather information that identifies the item being loaded into the storage space within the container, cause the depth sensor to scan the storage space within the container from above the storage space and generate the scan data representing the loaded volume of the container, store the generated scan data in the memory, determine if the item loaded into the storage space is at least partially not visible to the depth sensor based upon the generated scan data, and dynamically transform the scan data into refined scan data if the processing unit determines the item is at least partially not visible to the depth sensor, wherein the scan data is transformed into the refined scan data based at least upon the material dimension data associated with the item.

11. The scanning sensor apparatus of embodiment 10, wherein the processing unit is operative to determine if the item loaded into the storage space is substantially not visible to the depth sensor by being further operative to: compare (a) the scan data generated after the item is loaded into the storage space to (b) prior scan data representing a previously loaded volume of the container before the item is loaded into the storage space; and determine that the item is at least partially not visible to the depth sensor when the difference between (a) and (b) represents an incremental increase to a previously determined loaded volume of the container and the incremental increase is less than a threshold amount.

12. The scanning sensor apparatus of embodiment 11, wherein the threshold amount depends upon an expected volume parameter associated with the item.

13. The scanning sensor apparatus of embodiment 12, wherein the expected volume parameter of the item is related to the material dimension data associated with the item.

14. The scanning sensor apparatus of embodiment 13, wherein the material dimension data comprises dimension information from a previous logistics scan of the item.

15. The scanning sensor apparatus of embodiment 13, wherein the material dimension data comprises default dimension information for the item.

16. The scanning sensor apparatus of embodiment 13, wherein the material dimension data comprises information received from an external managing node in communication with the scanning sensor apparatus through the wireless communication interface.

17. The scanning sensor apparatus of embodiment 10, wherein the identification scanner is operative to conduct the identification scan by being further operative to receive a signal that identifies the item and provide information from the signal to the processing unit, wherein the provided information identifies the item being loaded into the storage space.

18. The scanning sensor apparatus of embodiment 10, wherein the identification scanner identifies the item by receiving a signal broadcast from a device associated with the item to be shipped, wherein the signal includes data sufficient to identify the item to be shipped.

19. The scanning sensor apparatus of embodiment 10, wherein the wireless communication interface is further operative to transmit a request to an external managing node for the material dimension data associated with the identified item, receive the material dimension data from the external managing node, and provide the received material dimension data to the processing unit; and wherein the processing unit is further operative to store the received material dimension data into the memory.

20. A system for dynamically transforming scan data representing a loaded volume of a container as the container is loaded, the system comprising: a scanning sensor apparatus disposed within the container, the scanning sensor apparatus further comprising a housing configured to mount to an interior surface within the container in a position above a storage space within the container; a processing unit disposed within the housing; a memory disposed within the housing, the memory being operatively coupled to the processing unit and maintaining at least a scanning program code section for execution by the processing unit and material dimension data related to an item being loaded into the storage space; a depth sensor operatively coupled to the processing unit, wherein the depth sensor is disposed and oriented towards the storage space within the container and from above the storage space; an identification scanner operatively coupled to the processing unit, wherein the identification scanner is operative to conduct an identification scan; a wireless communication interface disposed within the housing and operatively coupled to the processing unit; and an external managing node disposed outside the container and in operative communication with the scanning sensor apparatus via the wireless communication interface; wherein the processing unit of the scanning sensor apparatus, when executing the scanning program code section, is operative to cause the identification scanner to conduct the identification scan and gather information that identifies the item being loaded into the storage space within the container, cause the depth sensor to scan the storage space within the container from above the storage space and generate the scan data representing the loaded volume of the container, store the generated scan data in the memory, determine if the item loaded into the storage space is at least partially not visible to the depth sensor based upon the generated scan data, dynamically transform the scan data into refined scan data if the processing unit determines the item is at least partially not visible to the depth sensor, wherein the scan data is transformed into the refined scan data based at least upon the material dimension data associated with the item, and cause the wireless communication interface to transmit a volume update message to the external managing node, wherein the volume update message includes the refined scan data representing the current loaded volume of the container; and wherein the external managing node receives the volume update message from the wireless communication interface of the scanning sensor apparatus and stores the refined scan data.

21. The system of embodiment 20 further comprising a server in direct communication with the external managing node but incapable of direct communication with the scanning sensor apparatus; and wherein the external managing node is further operative to transmit a container status update message to the server, the container status update message informing the server at least about the current loaded volume of the container as reflected by the refined scan data.

22. The system of embodiment 20, wherein the processing unit of the scanning sensor apparatus is operative to determine if the item loaded into the storage space is at least partially not visible to the depth sensor when the generated scan data is indicative of an incremental increase to the loaded volume of the container and the incremental increase is less than a threshold amount.

23. The system of embodiment 22, wherein the threshold amount depends upon an expected volume parameter associated with the item.

24. The system of embodiment 23, wherein the expected volume parameter of the item is related to the material dimension data associated with the item.

25. The system of embodiment 24, wherein the material dimension data comprises dimension information from a previous logistics scan of the item.

26. The system of embodiment 24, wherein the material dimension data comprises default dimension information for the item.

27. The system of embodiment 24, wherein the external managing node provides the material dimension data to the scanning sensor apparatus through the wireless communication interface; and wherein the processing unit of the scanning sensor apparatus stores the received material dimension data in the memory.

28. The system of embodiment 20, wherein the identification scanner of the scanning sensor apparatus is operative to conduct the identification scan by being further operative to receive a signal that identifies the item and provide information from the signal to the processing unit, wherein the provided information identifies the item being loaded into the storage space within the container.

29. The system of embodiment 20 further comprising a wireless identification device associated with the item being loaded into the storage space; and wherein the identification scanner of the scanning sensor apparatus identifies the item by receiving a signal broadcast from the wireless identification device, wherein the signal includes data sufficient to identify the item.

30. The system of embodiment 20, wherein the wireless communication interface of the scanning sensor apparatus is further operative to transmit a request to the external managing node for the material dimension data associated with the identified item; and wherein the external managing node is operative to receive the request and transmit a response to the scanning sensor apparatus, the response including the requested material dimension data.

Further Embodiment 6—Systems, Apparatus, and Methods for Quantifying Space within a Container Using a Removable Scanning Sensor Node 1. A method for quantifying space within a container using a removable scanning sensor node, the method comprising: identifying, by the removable scanning sensor node, a type of the container; scanning, by at least one depth sensor on the removable scanning sensor node, the space within the container to generate scan data, wherein the removable scanning sensor node is temporarily mounted within the container and above the space within the container, and wherein the at least one depth sensor on the removable scanning sensor node is oriented to scan the space within the container from above the space and within the container; and determining, by the removable scanning sensor node, an unoccupied amount of the space within the container based upon the scan data.

2. The method of embodiment 1, wherein the identifying step further comprises:
conducting, by the removable scanning sensor node, an initial scan of the space within the container from the perspective of the removable scanning sensor node oriented to look down from the ceiling within the container, wherein the initial scan provides initial scan data that includes baseline dimensional information related to the space within the container; and identifying the type of the container based upon one or more dimensional parameters of the baseline dimensional information from the initial scan data.

3. The method of embodiment 1, wherein the identifying step further comprises: transmitting, by the removable scanning sensor node to a second node device, a request for container type information related to the container; and receiving, by the removable scanning sensor node from the second node device, the requested container type information, wherein the requested container type information identifies the type of the container and provides baseline dimensional information related to the space within the container.

4. The method of embodiment 1, wherein the scanning step further comprises generating the scan data by taking a plurality of dimensional measurements related to an interior region of the container using the at least one depth sensor on the removable scanning sensor node, wherein the at least one depth sensor part of the removable scanning sensor node is disposed on or substantially near the ceiling of the container and aligned to scan for the dimensional measurements from above the interior region of the container.

5. The method of embodiment 4, wherein the at least one depth sensor comprises a plurality of scanning elements disposed within the container to scan for the dimensional measurements from above the interior region of the container.

6. The method of embodiment 1, wherein the step of determining the unoccupied amount of the space within the container further comprises assessing the scanned space within the container relative to baseline dimensional information according to the identified type of the container.

7. The method of embodiment 1 further comprising the step of transmitting, by the removable scanning sensor node, a container status update message to a second node element, wherein the container status update message reflects the determined unoccupied amount of the space within the container.

8. The method of embodiment 7 further comprising the steps of: identifying, by the removable scanning sensor node, when the scanned space within the container reflects a desired loading state of the container; and transmitting, by the removable scanning sensor node, a desired load message to the second node element, wherein the desired load message reflects whether the desired loading state of the container has been identified.

9. The method of embodiment 1, wherein the unoccupied amount of the space further comprises an approximate available volume left to be filled in a designated storage portion within the container.

10. The method of embodiment 1, wherein the step of determining the unoccupied amount of the space further comprises determining, by the removable scanning sensor node, the unoccupied amount of the space within the container based upon an average of the scan data generated over time when scanning the space within the container from above the space.

11. The method of embodiment 1, wherein the step of determining the unoccupied amount of the space further comprises determining, by the removable scanning sensor node, the unoccupied amount of the space within the container based upon an average of scan data generated over time when scanning the space within the container from above the space and while the removable scanning sensor node detects movement within the container.

12. The method of embodiment 1, wherein the step of scanning the space within the container is performed by the removable scanning sensor node only while the removable scanning sensor node detects there is no movement within the space within the container.

13. The method of embodiment 1, wherein the step of determining the unoccupied amount of space further comprises: accessing material dimension data from a source external to the removable scanning sensor node, the material dimension data being associated with a shipping item loaded into the space within the container; and determining the unoccupied amount of the space within the container based upon the scan data and the accessed material dimension data, wherein the determined unoccupied amount of the space represents a current status of the space within the container below the interior roof surface.

14. The method of embodiment 13, wherein determining step further comprises determining the unoccupied amount of the space based upon a comparison of the accessed material dimension data and an average of scan data generated by the at least one depth sensor over time when scanning the space within the container from above the space and while the scanning sensor node detects movement within the container.

15. The method of embodiment 14, wherein determining step further comprises dynamically determining the unoccupied amount of the space as one or more additional shipping items are loaded into the space within the container.

16. A removable scanning sensor apparatus disposed within a container to quantify space within the container, the apparatus comprising: a housing configured to mount to an interior roof surface within the container; a processing unit disposed within the housing; a memory disposed within the housing, the memory being operatively coupled to the processing unit and maintaining at least a scanning program code section for execution by the processing unit; a depth sensor operatively coupled to the processing unit, wherein the depth sensor is disposed and oriented to scan the space within the container below the interior roof surface; a wireless communication interface disposed within the housing and operatively coupled to the processing unit; and a power source that provides electrical power to at least the processing unit, the memory, the depth sensor, and the wireless communication interface;

wherein the processing unit, when executing the scanning program code section, is operative to identify a type of the container and baseline dimensional information related to the space within the identified type of the container, store the baseline dimensional information in the memory, cause the depth sensor to scan the space within the container below the interior roof surface, receive, from the depth sensor, scan data generated during the scan, and determine an unoccupied amount of the space within the container as the container is being loaded with material occupying the space within the container, the determination of the unoccupied space depending on the baseline dimensional information and the scan data representing a current status of the space within the container below the interior roof surface.

17. The apparatus of embodiment 16, wherein the processing unit is operative to identify the type of the container and the baseline dimensional information by being further operative to: cause the depth sensor to conduct an initial scan of the space within the container with the depth sensor oriented with a field of view down from the interior roof surface within the container, wherein the initial scan provides the baseline dimensional information related to the space within the container; and identify the type of the container based upon one or more dimensional parameters of the baseline dimensional information from the initial scan.

18. The apparatus of embodiment 16, wherein the processing unit is operative to identify the type of the container and the baseline dimensional information by being further operative to: cause the wireless communications interface to transmit a request to a second node device, the request being for container type information related to the container; and receive the requested container type information from the wireless communication interface after the wireless communication interface receives the requested container type information from the second node, wherein the requested container type information identifies the type of the container and provides the baseline dimensional information related to the space within the container.

19. The apparatus of embodiment 16, wherein the processing unit is operative to cause the depth sensor to scan the space within the container below the interior roof surface by being further operative to cause the depth sensor to determine a plurality of dimensional measurements related to an interior region of the space within the container, the plurality of dimensional measurements determined from the scan data generated during the scan.

20. The apparatus of embodiment 19, wherein the depth sensor further comprises a plurality of scanning elements disposed within the container to scan for the dimensional measurements from above the interior region of the container.

21. The apparatus of embodiment 16, wherein the depth sensor is operative to map a void within the space and comprises at least one from the group consisting of a camera, an infrared source and sensor, and a laser scanner.

22. The apparatus of embodiment 16, wherein the processing unit is further operative to cause the wireless communication interface to transmit a container status update message to a second node element, wherein the container status update message reflects the determined unoccupied amount of the space within the container.

23. The apparatus of embodiment 22, wherein the processing unit is further operative to: identify when the scanned space within the container reflects a desired loading state of the container; and cause the wireless communications interface to transmit a desired load message to the second node element, wherein the desired load message reflects whether the desired loading state of the container has been identified.

24. The apparatus of embodiment 16, wherein the processing unit is further operative to determine the unoccupied space based upon an average of scan data generated over time when scanning the space within the container from above the space.

25. The apparatus of embodiment 16, wherein the processing unit is further operative to determine the unoccupied amount of the space based upon an average of scan data generated by the depth sensor over time when scanning the space within the container from above the space and while the scanning sensor node detects movement within the container.

26. The apparatus of embodiment 16, wherein the processing unit is operative to cause the depth sensor to scan the space within the container by being further operative to cause the depth sensor to scan the space only when the depth sensor detects there is no movement within the space within the container.

27. The apparatus of embodiment 16, wherein the power source is at least one of a rechargeable power unit or a replaceable power unit.

28. The apparatus of embodiment 16, wherein the housing is configured to be detachably mounted to the interior roof surface within the container.

29. The apparatus of embodiment 16, wherein the depth sensor comprises a plurality of depth sensors that each are disposed and oriented to scan at least a respective portion of the space within the container below the interior roof surface.

30. The apparatus of embodiment 16, wherein the processing unit is operative to determine the unoccupied amount of space by being further operative to access material dimension data stored within the memory, the material dimension data being generated by a source external to the removable scanning sensor node, the material dimension data being associated with a shipping item loaded into the space within the container; and determine the unoccupied amount of the space within the container based upon the scan data, the baseline dimensional information, and the accessed material dimension data.

31. The apparatus of embodiment 30, wherein the processing unit is operative to determine the unoccupied amount of the space based upon a first comparison and a second comparison, wherein the first comparison is of the accessed material dimension data and an average of scan data generated by the depth sensor over time when scanning the space within the container from above the space and while the scanning sensor node detects movement within the container, wherein the second comparison is of the results of the first comparison and the baseline dimensional information.

32. The apparatus of embodiment 31, wherein the processing unit is further operative to dynamically determine the unoccupied amount of the space as one or more additional shipping items are loaded into the space within the container.

33. A system to quantify space within a container as the container is loaded, the system comprising: a portable scanning sensor apparatus disposed within the container, the portable scanning sensor apparatus further comprising: a housing configured to be mounted to an interior roof surface within the container; a processing unit disposed within the housing; a memory disposed within the housing, the memory operatively coupled to the processing unit and maintaining at least a scanning program code section for execution by the processing unit; a depth sensor operatively coupled to the processing unit, wherein the depth sensor is disposed below the interior roof surface and oriented to scan the space within the container below the interior roof surface; a wireless communication interface disposed within the housing and operatively coupled to the processing unit; and a power source providing electrical power to at least the processing unit, the memory, the depth sensor, and the wireless communication interface; and an external node disposed outside the container and in communication with the portable scanning sensor apparatus via the wireless communication interface;

wherein the processing unit of the portable scanning sensor apparatus, when executing the scanning program code section, is operative to identify a type of the container and baseline dimensional information related to the space within the identified type of the container, store the baseline dimensional information in the memory, cause the depth sensor to scan the space within the container below the interior roof surface, receive, from the depth sensor, scan data generated during the scan, determine an unoccupied amount of the space within the container as the container is being loaded with material occupying the space within the container, the determination of the unoccupied amount of the space depending on the baseline dimensional information and the scan data representing a current status of the space within the container below the interior roof surface, and cause the wireless communication interface to transmit a container status update message to the external node, wherein the container status update message reflects the determined unoccupied amount of the space within the container; and wherein the external node receives the container status update message from the wireless communication interface and provides an indication associated with the determined unoccupied amount of the space within the container.

34. The system of embodiment 33, wherein the processing unit is operative to identify the type of the container and the baseline dimensional information by being further operative to: cause the depth sensor to conduct an initial scan of the space within the container with the depth sensor oriented with a field of view down from the interior roof surface within the container, wherein the initial scan provides the baseline dimensional information related to the space within the container; and identify the type of the container based upon one or more dimensional parameters of the baseline dimensional information from the initial scan.

35. The system of embodiment 33, wherein the processing unit is operative to identify the type of the container and the baseline dimensional information by being further operative to: cause the wireless communications interface to transmit a request to the second node device, the request being for container type information related to the container, and receive the requested container type information from the wireless communication interface after the wireless communication interface receives the requested container type information, wherein the requested container type information identifies the type of the container and provides the baseline dimensional information related to the space within the container; and wherein the external node receives the request and generates the requested container type information in response to the request.

36. The system of embodiment 35 further comprising a server in communication with at least the external node; and wherein the external node receives the request and generates the requested container type information based upon a communication received from the server.

37. The system of embodiment 33, wherein the processing unit is operative to cause the depth sensor to scan the space within the container below the interior roof surface by being further operative to cause the depth sensor to take a plurality of dimensional measurements related to an interior region of the space within the container.

38. The system of embodiment 37, wherein the depth sensor further comprises a plurality of scanning elements disposed within the container to scan for the dimensional measurements from above the interior region of the container.

39. The system of embodiment 33, wherein the depth sensor is configured to map a void within the space above the interior region of the container and further comprises at least one from the group consisting of a camera, an infrared source and sensor, and a laser scanner.

40. The system of embodiment 39, wherein the processing unit is further operative to: identify when the scanned space within the container reflects a desired loading state of the container; and cause the wireless communications interface to transmit a desired load message to the external node, wherein the desired load message reflects whether the desired loading state of the container has been identified.

41. The system of embodiment 33 further comprising a server in communication with the external node; and wherein the external node is operative to provide the indication associated with the determined unoccupied amount of the space within the container by being further operative to transmit an indication message to the server.

42. The system of embodiment 33, wherein the external node is operative to provide the indication associated with the determined unoccupied amount of the space within the container by notifying an operator of the external node with the indication.

43. The system of embodiment 42, wherein the external node further comprises a display that notifies the operator about the indication.

44. The system of embodiment 33, wherein the processing unit of the portable scanning sensor apparatus is further operative to determine the unoccupied amount of the space based upon an average of scan data generated over time when scanning the space within the container from above the space.

45. The system of embodiment 33, wherein the processing unit of the portable scanning sensor apparatus is further operative to determine the unoccupied amount of the space based upon an average of scan data generated by the depth sensor over time when scanning the space within the container from above the space and while the scanning sensor node detects movement within the container.

46. The system of embodiment 33, wherein processing unit of the portable scanning sensor apparatus is operative to cause the depth sensor to scan the space within the container by being further operative to cause the depth sensor to scan the space only when the depth sensor detects there is no movement within the space within the container.

47. The system of embodiment 33, wherein the housing of the portable scanning sensor apparatus is configured to be detachably mounted to the interior roof surface within the container.

48. The system of embodiment 33, wherein processing unit of the portable scanning sensor apparatus is operative to determine the unoccupied amount of space by being further operative to access material dimension data stored within the memory, the material dimension data being generated by a source external to the removable scanning sensor node, the material dimension data being associated with a shipping item loaded into the space within the container; and determine the unoccupied amount of the space within the container based upon the scan data, the baseline dimensional information, and the accessed material dimension data.

49. The system of embodiment 48, wherein processing unit of the portable scanning sensor apparatus is operative to determine the unoccupied amount of the space based upon a first comparison and a second comparison, wherein the first comparison is of the accessed material dimension data and an average of scan data generated by the depth sensor over time when scanning the space within the container from above the space and while the scanning sensor node detects movement within the container, wherein the second comparison is of the results of the first comparison and the baseline dimensional information.

50. The system of embodiment 49, wherein processing unit of the portable scanning sensor apparatus is further operative to dynamically determine the unoccupied amount of the space as one or more additional shipping items are loaded into the space within the container.

In summary, it should be emphasized that the sequence of operations to perform any of the methods and variations of the methods described in the embodiments herein are merely exemplary, and that a variety of sequences of operations may be followed while still being true and in accordance with the principles of the present invention as understood by one skilled in the art.

At least some portions of exemplary embodiments outlined above may be used in association with portions of other exemplary embodiments to enhance and improve logistics operations, such as loading a container, managing what is loaded in a container, increasing efficiency of loading operations, detecting relevant and potentially dangerous operational safety conditions relative to a container that is being loaded or that has been loaded, and transforming generated data that is representative of physical objects so as to more accurately represent an item loaded in the container and/or more accurately account for what has been loaded into the storage space of the container. Moreover, at least some of the exemplary embodiments disclosed herein may be used independently from one another and/or in combination with one another and may have applications to devices and methods not disclosed herein. However, those skilled in the art will appreciate that the exemplary scanning sensor node apparatus, systems using such an apparatus, and methods of how such an apparatus may operate as part of a logistics operation as described above provide enhancements and improvements to technology used in logistics and shipment managing.

Those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention, as recited in the claims below, is intended to cover modifications and variations.

What is claimed:

1. A system to quantify space within a container as the container is loaded, the system comprising:
    a scanning sensor apparatus disposed within the container, the scanning sensor apparatus further comprising:
        a housing configured to be mounted to an interior roof surface within the container;
        a processing unit disposed within the housing;
        a memory disposed within the housing, the memory operatively coupled to the processing unit and maintaining at least a scanning program code section for execution by the processing unit and an available material dimension data related to a shipping item;
        a depth sensor operatively coupled to the processing unit, wherein the depth sensor is disposed below the interior roof surface and oriented to scan the space within the container below the interior roof surface;
        a wireless communication interface disposed within the housing and operatively coupled to the processing unit; and
    an external managing node disposed outside the container and in operative communication with the scanning sensor apparatus via the wireless communication interface;
    wherein the processing unit of the scanning sensor apparatus, when executing the scanning program code section, is operative to
        access the available material dimension data in the memory related to the shipping item, the available material dimension data having been supplied to the scanning sensor apparatus from an apparatus external to the scanning sensor apparatus through the wireless communication interface,
        cause, over a period of time, the depth sensor to scan the space within the container below the interior roof surface once the shipping item is loaded in the space within the container,
        receive, from the depth sensor, a plurality of scan data generated during the scan over the period of time,
        determine an average of the plurality of scan data over the period of time,
        compare the average of the plurality of scan data to the available material dimension data,
        dynamically transform the available material dimension data into a current dimensional data representing the dimensions of the shipping item based upon a result of comparing the average of the plurality of scan data and the available material dimension data, and
        cause the wireless communication interface to transmit a dimensional data update message to the external managing node, wherein the dimensional data update message reflects the current dimensional data representing the shipping item; and
    wherein the external managing node is operative to receive the dimensional data update message from the wireless communication interface of the scanning sensor apparatus and store the transformed current dimensional data as communicated in the dimensional data update message.

2. The system of claim 1, wherein the processing unit of the scanning sensor apparatus is further operative to identify the shipping item as the shipping item is being loaded within the container.

3. The system of claim 1, wherein the apparatus external to the scanning sensor apparatus is the external managing node and the wireless communication interface of the scanning sensor apparatus is operative to receive at least the available material dimension data from the external managing node, wherein the available material dimension data is part of shipping data related to the shipping item; and
    wherein the processing unit of the scanning sensor node is further operative to store the available material dimension data in the memory within the scanning sensor apparatus.

4. The system of claim 1, wherein the processing unit of the scanning sensor apparatus is further operative to dynamically transform the available material dimension data into the current dimensional data representing the shipping item by being further operative to store the generated scan data as the current dimensional data representing the shipping item if the material dimension data for the shipping item is unavailable or inaccessible.

5. The system of claim 1, wherein the processing unit of the scanning sensor apparatus is operative to dynamically transform the available material dimension data into the current dimensional data representing the shipping item by being further operative to update the current dimensional data to reflect the difference between the average of the plurality of scan data and the available material dimension data.

6. The system of claim 1, wherein the depth sensor further comprises a plurality of scanning elements disposed within the container to scan for the dimensional measurements from above the space within the container.

7. The system of claim 1 further comprising a server in direct communication with the external managing node but incapable of direct communication with the scanning sensor apparatus; and wherein the external managing node is further operative to transmit a dimensional update message to the server, the dimensional update message informing the server at least about the dynamic transform operation.

8. The system of claim 7, wherein the external managing node is further operative to detect a logistics issue based upon the dimensional update message and transmits an alert to the server, wherein the alert identifies the logistics issue.

9. The system of claim 8, wherein the logistics issue comprises a defect with the item being shipped.

10. The system of claim 8, wherein the server responds to the alert by generating a logistics rectifying message that facilitates addressing the logistics issue prior to shipment of the container.

11. The system of claim 10, wherein the server transmits the logistics rectifying message to the external managing node.

12. The system of claim 11, wherein the external managing node is further operative to provide the logistics rectifying message to at least one of a user access device in communication with the external managing node or the scanning sensor apparatus.

13. A scanning sensor apparatus disposed within a container that dynamically transforms dimensional data representing a shipping item being loaded within the container, the apparatus comprising:

a housing configured to mount to an interior roof surface within the container;

a processing unit disposed within the housing;

a memory disposed within the housing, the memory being operatively coupled to the processing unit and maintaining at least a scanning program code section for execution by the processing unit and an available material dimension data related to a shipping item;

a depth sensor operatively coupled to the processing unit, wherein the depth sensor is disposed and oriented to scan the space within the container below the interior roof surface;

a wireless communication interface disposed within the housing and operatively coupled to the processing unit; and wherein the processing unit, when executing the scanning program code section, is operative to access available material dimension data in the memory related to the shipping item, the available material dimension data having been supplied to the scanning sensor apparatus from an apparatus external to the scanning sensor apparatus through the wireless communication interface, cause, over a period of time, the depth sensor to scan the space within the container below the interior roof surface once the shipping item is loaded in the space within the container, receive, from the depth sensor, a plurality of scan data generated during the scan over the period of time, determine an average of the plurality of scan data over the period of time, compare the average of the plurality of scan data to the available material dimension data, and dynamically transform the available material dimension data into a current dimensional data representing the dimensions of the shipping item based upon a result of comparing the average of the plurality of scan data and the available material dimension data.

14. The apparatus of claim 13, wherein the processing unit is further operative to identify the shipping item as the shipping item is being loaded within the container.

15. The apparatus of claim 13, wherein the apparatus external to the scanning sensor apparatus is an external managing node and the wireless communication interface is operative to receive the available material dimension data from the external managing node; and wherein the processing unit is further operative to store the available material dimension data in the memory within the scanning sensor apparatus.

16. The apparatus of claim 13, wherein the processing unit is further operative to dynamically transform the available material dimension data into the current dimensional data representing the shipping item by being further operative to store the generated scan data as the current dimensional data representing the shipping item if the material dimension data for the shipping item is unavailable or inaccessible.

17. The apparatus of claim 13, wherein the processing unit is operative to dynamically transform the available material dimension data into the current dimensional data representing the shipping item by being further operative to update the current dimensional data representing the shipping item to reflect the difference between the average of the plurality of scan data and the available material dimension data.

18. The apparatus of claim 13, wherein the processing unit is further operative to cause the wireless communication interface to transmit the transformed current dimensional data representing the shipping item to an external managing node.

19. The apparatus of claim 13, wherein the depth sensor further comprises a plurality of scanning elements disposed within the container to scan for the dimensional measurements from above the space within the container.

20. A method for dynamically transforming dimensional data representing a shipping item being loaded within a container using a scanning sensor node having at least a memory, a depth sensor, and a wireless communications interface to an external managing node, the method comprising:

accessing available material dimension data in the memory within the scanning sensor node, the material dimension data being related to the shipping item and having been supplied to the scanning sensor node from an apparatus external to the scanning sensor node through the wireless communications interface;

scanning, by the depth sensor on the scanning sensor node over a period of time, the space within the container to generate a plurality of scan data related to the shipping item once the shipping item is placed within the container, wherein the scanning sensor node is mounted within the container and above the space within the container, and wherein the at least one depth sensor is oriented to scan the space within the container from above the space and within the container;

comparing, by the scanning sensor node, (a) an average of a plurality of scan data for the shipping item generated over a period of time and (b) the available material dimension data; and dynamically transforming the available material dimension data into a current dimensional data representing the dimensions of the shipping item based upon the comparison of the generated plurality of scan data to the available material dimension data, wherein the step of dynamically transforming the available material dimension data further comprises adjusting the current dimensional data representing the shipping item based upon results of comparing (a) and (b).

21. The method of claim 20, further comprising identifying, by the scanning sensor node, the shipping item as the shipping item is being loaded within the container.

22. The method of claim 20, further comprising:
receiving, by the wireless communication interface, the available material dimension data from the apparatus external to the scanning sensor node, wherein the source external to the scanning sensor node is the external managing node; and
storing the available material dimension data received by the wireless communication interface into the memory.

23. The method of claim 20, wherein the transforming step further comprises storing the generated scan data as the current dimensional data representing the shipping item if the material dimension data for the shipping item is unavailable or inaccessible.

24. The method of claim 20, wherein the step of dynamically transforming the available material dimension data into the current dimensional data representing the shipping item further comprises updating the current dimensional data representing the shipping item to reflect the difference between the average of the plurality of scan data and the available material dimension data.

25. The method of claim 20 further comprising transmitting, by the scanning sensor node to the external managing node over the communications interface of the scanning sensor node, the transformed current dimensional data representing the shipping item.

* * * * *